US012587377B2

(12) United States Patent
Kandele et al.

(10) Patent No.: US 12,587,377 B2
(45) Date of Patent: Mar. 24, 2026

(54) LOOK UP TABLE (LUT) BASED ENCRYPTION WITH TAG-BASED VERIFICATION

(71) Applicant: Ceremorphic, Inc., San Jose, CA (US)

(72) Inventors: Suyash Kandele, Chhattisgarh (IN); Joydeep Kumar Devnath, Assam (IN); Mohammed Sumair, Uttarakhand (IN); Ananya Shrivastava, Chhattisgarh (IN); Govardhan Mattela, Telagana (IN)

(73) Assignee: Ceremorphic, Inc., San Jose, CA (US)

( * ) Notice: Subject to any disclaimer, the term of this patent is extended or adjusted under 35 U.S.C. 154(b) by 348 days.

(21) Appl. No.: 17/683,089

(22) Filed: Feb. 28, 2022

(65) Prior Publication Data

US 2023/0275761 A1     Aug. 31, 2023

(51) Int. Cl.
*H04L 9/32* (2006.01)

(52) U.S. Cl.
CPC ..................................... *H04L 9/32* (2013.01)

(58) Field of Classification Search
CPC ..... H04L 9/32; H04L 2209/34; H04L 9/0637; H04L 9/065; H04L 9/3242
USPC ........................................................ 713/168
See application file for complete search history.

(56) References Cited

U.S. PATENT DOCUMENTS

| | | | | |
|---|---|---|---|---|
| 6,069,954 A | * | 5/2000 | Moreau ................ | H04L 9/0668 |
| | | | | 380/46 |
| 7,949,129 B2 | * | 5/2011 | Rogaway ............. | H04L 9/0637 |
| | | | | 380/37 |
| 10,187,200 B1 | * | 1/2019 | Firestone ........... | H04L 63/0435 |
| 2007/0189524 A1 | * | 8/2007 | Rogaway ............. | H04L 9/3242 |
| | | | | 380/37 |
| 2012/0195426 A1 | * | 8/2012 | White ................. | G09G 3/2085 |
| | | | | 380/210 |
| 2019/0280858 A1 | * | 9/2019 | Cambou ............. | H04L 9/3278 |
| 2022/0309190 A1 | * | 9/2022 | Gopal ................ | H04L 9/0643 |
| 2023/0244821 A1 | * | 8/2023 | Driscoll .............. | H04L 9/0841 |
| | | | | 713/193 |
| 2023/0275742 A1 | * | 8/2023 | Kandele .............. | H04L 9/0618 |
| | | | | 713/189 |
| 2023/0275761 A1 | * | 8/2023 | Kandele .............. | H04L 9/3242 |
| | | | | 713/168 |

* cited by examiner

*Primary Examiner* — Catherine Thiaw
*Assistant Examiner* — Nega Woldemariam
(74) *Attorney, Agent, or Firm* — File-EE-Patents.com; Jay A. Chesavage

(57) ABSTRACT

A cryptographic method includes at least (1) receiving a message for encryption, (2) encrypting the message to obtain message ciphertext, the encryption including at least one or more operations that include at least one or more XOR operations, (3) computing a tag on a concatenation that includes at least a nonce, the message ciphertext, and other data, (4) encrypting the tag to obtain one or more ordered blocks of tag ciphertext, the encryption including at least one or more operations that include at least one or more XOR operations, (5) appending the one or more ordered blocks of tag ciphertext to the message ciphertext to obtain final ciphertext, and (6) transmitting the final ciphertext to a second chiplet.

16 Claims, 27 Drawing Sheets

Resource - Constrained Device
(Smart Camera)

Resource - Constrained Device
(Smart Camera)

TX and RX Circuits in a Chiplet.

Flowchart-Key Generation Function (Sender).

Flowchart-Key Generation Function (Receiver).

Flowchart - Encryption Function.

Flowchart - Decryption Function.

1300

Chiplet-1

1302

Chiplet Authentication

1312

1314

1304

Key Exchange

1. Compute $C_1$ encrypting $M_1$

2. Send $C_1$.  1306

Chiplet-2

3. Decrypt $C_1$ Compute $M_1$

4. Compute $C_2$ encrypting $M_2$

5. Send $C_2$.  1308

6. Decrypt $C_2$ Compute $M_2$

7. Compute $C_i$ encrypting $M_i$

8. Send $C_i$.  1310

9. Decrypt $C_i$ Compute $M_i$

Multiple Communications $M_1$, $M_2$, $\cdots$, $M_i$ Within One Session.

TX and RX Circuits For Basic Half-Duplex Mode.

Basic Half-Duplex Mode of Operation.

TX and RX Circuits For Full-Duplex Mode.

Full-Duplex Mode of Operation.

TX and RX Circuits For No-Delay Half-Duplex Mode.

No-Delay Half-Duplex Mode of Operation.

TX and RX Circuits For Space-Saver Mode.

TX and RX Circuits For Two-Key Encryption Mode.

TX and RX Circuits For Two-Key Space-Saver Encryption Mode.

TAG-then-Encrypt

Encrypt-and-TAG

Encrypt-then-TAG

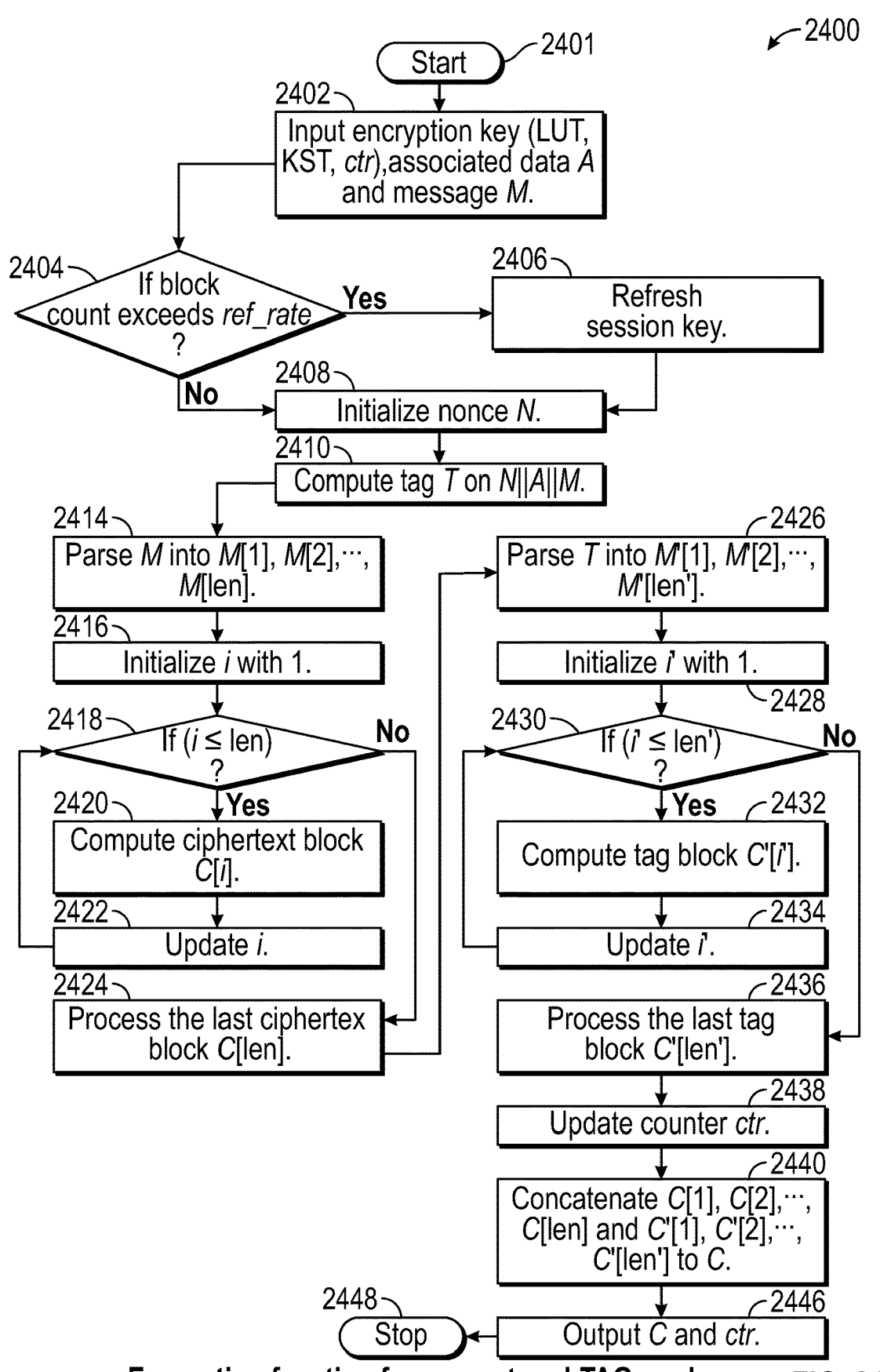
Encryption function for encrypt-and-TAG mode.    FIG. 24

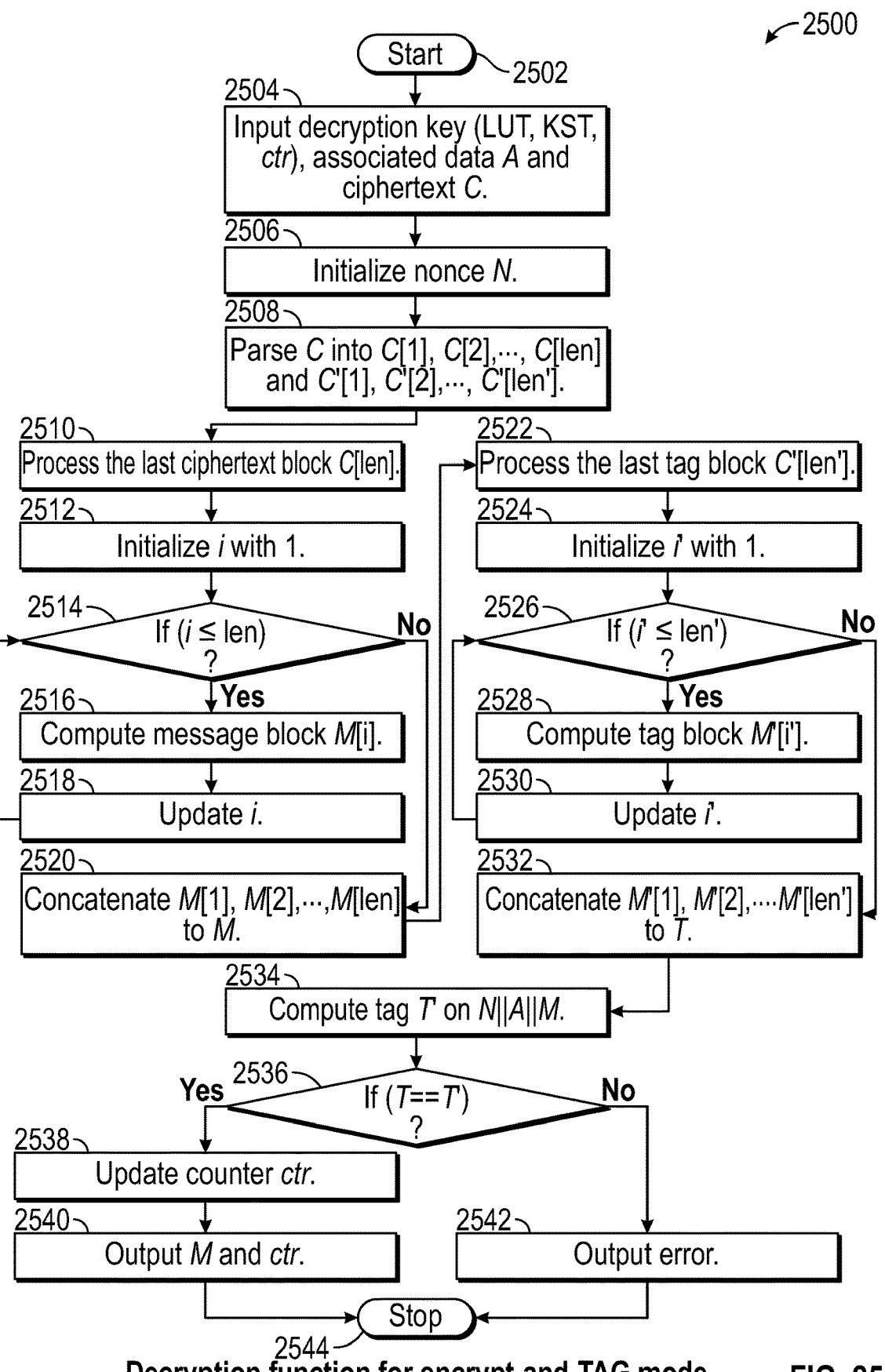
Decryption function for encrypt-and-TAG mode.       FIG. 25

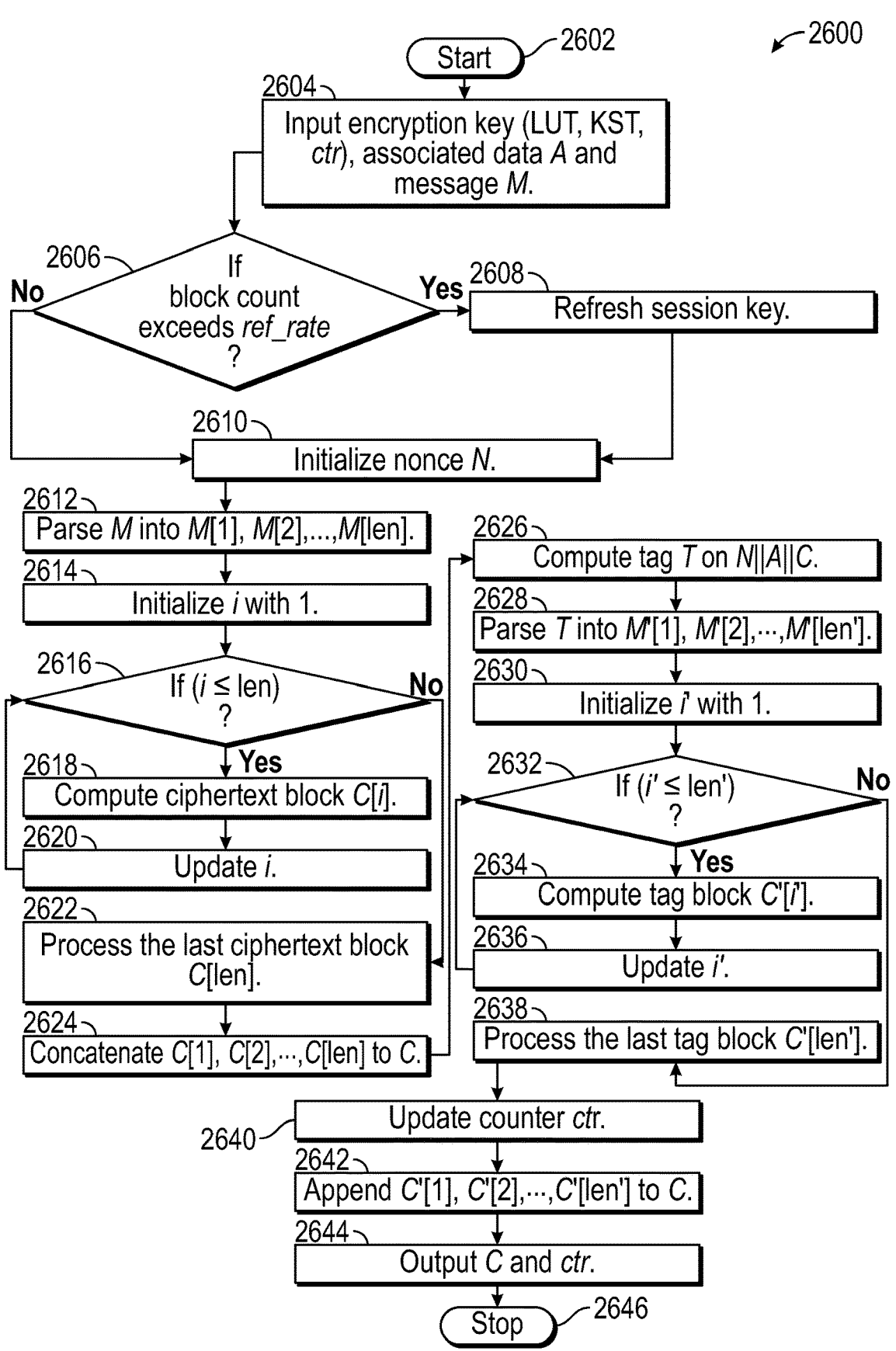
Encryption function for encrypt-then-TAG mode.     FIG. 26

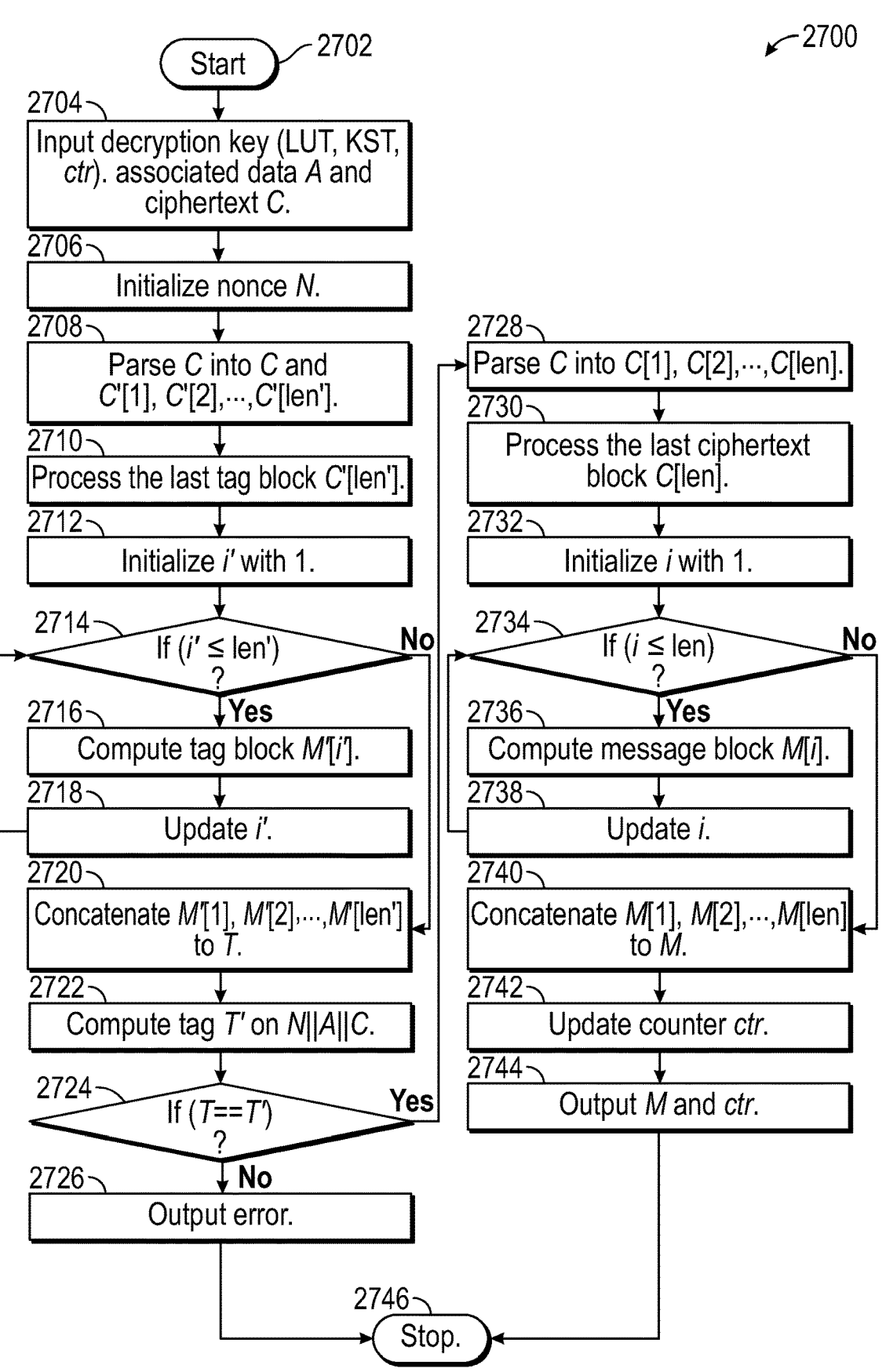
Decryption function for encrypt-then-TAG mode.    FIG. 27

LOOK UP TABLE (LUT) BASED ENCRYPTION WITH TAG-BASED VERIFICATION

FIELD OF TECHNOLOGY

Some embodiments pertain to systems and methods for lookup table based encryption with tagging for verification. In particular, some embodiments pertain to systems and methods for lookup table based encryption with tag-based verification for resource-constrained devices.

BACKGROUND

A chiplet is an integrated circuit that is designed to be part of a larger whole. In some implementations, a chiplet is an independent unit for processing and computing. A chiplet may be a part of a package. In some implementations, a package may contain multiple homogenous or identical chiplets. A package may contain multiple heterogenous chiplets. A chiplet may also contain one or more sub-chiplets. A sub-chiplet is a dedicated hardware for a specific purpose, such as for example, an artificial intelligence engine, a machine learning engine, a communication circuit, or other fixed purpose. A chiplet may also be part of a larger integrated circuit, such as a computer processor.

Recently chiplets are part of a trend toward modular design of processors and other large integrated circuits. One reason for this is reduced cost if there is a defect. If there is a defect in a monolithic computer processor, the entire computer processor may have to be discarded. In contrast if there is a defect is a chiplet that forms part of a modular computer processor, only that one defective chiplet need be discarded.

Chiplets communicate with other chiplets via communication channels. Traditionally the security of these chiplet-to-chiplet communication channels has been given minimal importance. Yet, it is often important that chiplet-to-chiplet communication be as stable and error-free as possible. Applications where this is true include applications for detecting abnormal behavior in other applications and for transmitting sensitive data. Therefore secure communication between chiplets is desirable.

One challenge for secure chiplet-to-chiplet communication has been secure communication in resource-constrained devices. Resource-constrained devices include devices that are constrained in at least one of computing power, memory resources, or power supply. Examples of resource-constrained devices include, without limitation, smart cameras, smart home devices, smart telephones, routers and switches, and automotive devices. Another example is Internet-of-things (IoT) devices.

The above examples of resource-constrained devices have a variety of practical applications. For example, smart cameras have application in surveillance. Smart home devices may be useful for saving energy, home automation, and for convenience and comfort. Smart devices, such as telephones, have practical applications for monitoring health and for customized user experiences. Improved routers and switches may provide safer and quicker communication. And automotive computing devices have practical applications for safer transportation and for reliable communication among automotive components.

Many resource-constrained devices include chiplets and packages composed of chiplets. Secure and reliable communication between these chiplets is desirable for realizing the maximum practical benefits of these resource-constrained devices. Because these devices are resource-constrained, they need to have secure communication provided via lightweight protocols and technologies. Lightweight protocols and technologies are those that require at least one of fewer computer power, fewer memory resources, or less electrical power compared to a device that is not resource-constrained, such as for example, a server, a cloud computer, or a desktop computer.

Verification of received messages is important to secure communication. In particular, verification ensures that a received message does not have errors and has not been tampered with. Methods for verification are provided by cryptography. A common verification method uses hash functions. However, hash functions can be computationally expensive for resource-constrained devices.

SUMMARY

Some embodiments include a cryptographic method that is performed in a first chiplet. The method includes at least (1) with one or more processing devices, computing a tag on a nonce, a message, and other data, (2) parsing the message into one or more message blocks to create one or more ordered message blocks, (3) encrypting the one or more ordered message blocks to obtain one or more ordered message ciphertext blocks, the encryption including at least one or more operations that include at least one or more XOR operations, (4) parsing the tag into one or more tag blocks to create one or more ordered tag blocks, (5) encrypting the one or more ordered tag blocks to obtain one or more ordered tag ciphertext blocks, the encryption including at least one or more operations that include at least one or more XOR operations, (6) concatenating the one or more ordered message ciphertext blocks with the one or more ordered tag ciphertext blocks to obtain final ciphertext, and (7) transmitting the final ciphertext to a second chiplet.

Some embodiments provide a cryptographic method that is performed in a first chiplet. The method includes at least (1) receiving a message for encryption, (2) encrypting the message to obtain message ciphertext, the encryption including at least one or more operations that include at least one or more XOR operations, (3) computing a tag on a concatenation that includes at least a nonce, the message ciphertext, and other data, (4) encrypting the tag to obtain one or more ordered blocks of tag ciphertext, the encryption including at least one or more operations that include at least one or more XOR operations, (5) appending the one or more ordered blocks of tag ciphertext to the message ciphertext to obtain final ciphertext, and (6) transmitting the final ciphertext to a second chiplet.

BRIEF DESCRIPTION OF THE DRAWINGS

Representative embodiments are illustrated by way of example and not by limitation in the accompanying figures, in which:

FIG. 24 is a process flow diagram, consistent with some embodiments, illustrating an exemplary method for encryption using encrypt-and-tag mode.

FIG. 25 is a process flow diagram, consistent with some embodiments, illustrating an exemplary method for decryption using encrypt-and-tag mode.

FIG. 26 is a process flow diagram, consistent with some embodiments, illustrating an exemplary method for encryption using encrypt-then-tag mode.

FIG. 27 is a process flow diagram, consistent with some embodiments, illustrating an exemplary method for decryption using encrypt-then-tag mode.

DETAILED DESCRIPTION

Figure 1:
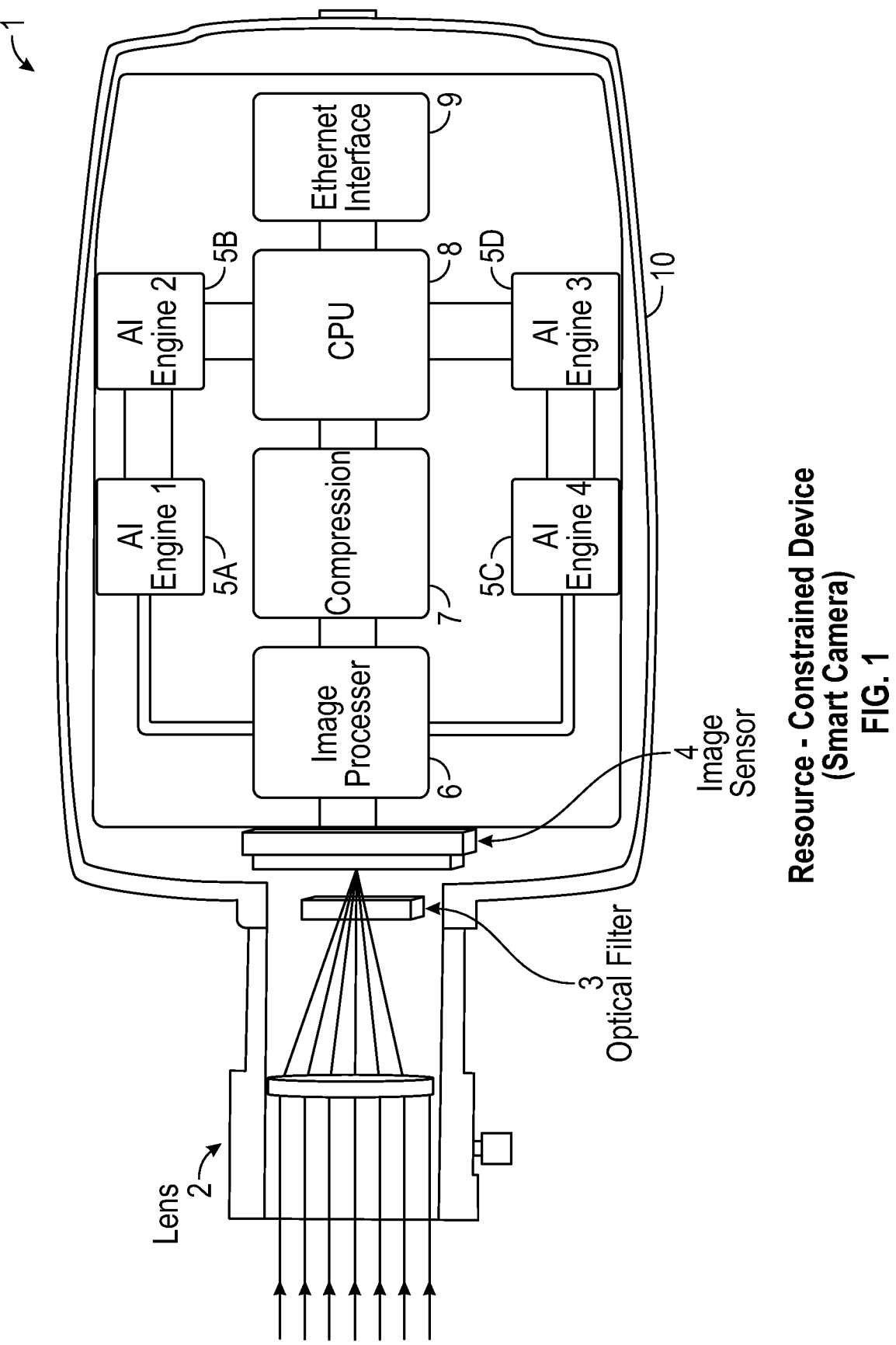
FIG. 1 is a simplified block diagram of a resource-constrained device—a smart camera—in which some embodiments may be practiced.

In the above-described drawing, certain features are simplified to avoid obscuring the pertinent features with extraneous details. The above drawings are not necessarily to scale.

It is to be understood that the disclosed embodiments are merely exemplary of the invention, which may be embodied in various forms. It is also to be understood that multiple references to "some embodiments" are not necessarily referring to the same embodiments.

As used in this document "secure lightweight chiplet-to-chiplet communication" includes chiplet-to-chiplet communication that is secure but uses at least one of less computing power, less memory resources, or less electrical power as compared with at least some alternative modes of secure communication.

This document refers to various types of lookup tables. While a variety of terminology is used for lookup tables, as used in this document a lookup table contains key-value pairs, where the "key" is a first data item in a column that is used to look up a second data item in another column. The second data item will be referred to in this document as a "target value." In some embodiments lookup tables are implemented as table data structures.

As used in this document, a "dynamic" structure or event is a structure or event that is constructed or performed by executing programs during runtime or "on the fly." In contrast, a static structure refers to a structure that is constructed at compile-time, before runtime.

This document refers to dynamic substitution boxes, which in some embodiments. are a lookup table (LUT). Accordingly, this document interchangeably refers to either dynamic substitution boxes or LUT's.

This document uses the term inverse LUT or LUT$^{-1}$. An inverse LUT is an LUT but used in reverse. As discussed above, a key in an LUT is used to access a target value. But when an LUT is used or configured as an inverse LUT, the target value is used to access the key. Inverse LUT's are discussed in detail relative to FIG. 6 below.

This document refers to dynamic keystream tables (KST's), which in some embodiments are a table data structure. This document interchangeably refers to either dynamic keystream tables or KST's. A KST is also a type of look-up table, but this document does not refer to KST's as LUT's or LUT$^{-1}$'s.

This document uses the term "tag" to refers one or more of a cyclic redundancy check (hereinafter "CRC"), hash function, or the like.

This document frequently refers to the term counter, often designated as "ctr."

This document uses the term "session key" to refer to a concatenation of two random or pseudorandom bits designated $r_0$ and $r_1$, the concatenation being $r_0 \| r_1$. In some of the embodiments discussed below, a session key is used to generate an LUT and a KST. These and related concepts are described in more detail below. In some of that discussion, the letter "K" is used to refer to a session key.

In describing some embodiments, this document uses the term "encryption key" to refer to a collection of data structures and data. For example, with respect to some embodiments, an encryption key is a tuple that includes an LUT, a KST, and a ctr. With respect to some other embodiments, an encryption key includes random or pseudo-random bits $r_0$, a KST, and a ctr. In describing some embodiments, this document uses the term decryption key similarly. Specifics of the contents of an "encryption key" or a "decryption key" are discussed below with reference to specific embodiments.

Some mathematical expressions used in this document are:

a. λ (lambda) which in this document refers to a security parameter; and b. ⊕ which indicates a bitwise XOR operation.

There is a need for secure lightweight chiplet-to-chiplet communication. In particular, there is a need for encryption and decryption technologies that avoid or minimize use of resource-intensive multiplication operations. And there is a need for technologies for verifying the integrity and authenticity of messages while avoiding or minimizing resource-intensive hash functions.

This need for secure lightweight chiplet-to-chiplet communication is especially relevant for resource-constrained devices, which as used herein, refers to a computing device that is constrained in at least one of computing power, memory resources, or power supply. One example of a resource-constrained device is an Internet-of-Things (IoT). Other examples of resource-constrained devices include, without limitation, smart cameras, smart home devices, smart telephones, routers and switches, and automotive devices. Examples of computing devices that are not resource-constrained, for purposes of this document, are servers, powerful cloud-based computers, and desktop computers.

Practical applications for resource-constrained devices with secure lightweight chiplet-to-chiplet communication include, for example, surveillance, energy efficiency, home automation, health monitoring, secure and efficient communication, and better functioning machines, such as automobile engines.

Embodiments described herein provide such secure lightweight chiplet-to-chiplet communication. For example, some embodiments provide for communication between a pair of chiplets linked by a communication link. In some embodiments, the pair of chiplets are part of numerous chiplets, and corresponding communication links, in a package. In some embodiments, a pair of chiplets are on the same die. In some embodiments, a pair of chiplets reside on different dies and are linked by a series of network communication links. In some embodiments, two chiplets may communicate with each other across a network.

Embodiments described herein may provide a variety of services, such as for example, one or more of the following services:

a. Lightweight methods of encryption and decryption of messages;

b. Tag computation and verification; and c. Support for various modes of communication between chiplets.

Not all embodiments provide all of the above services. For example, in some embodiments. chiplets communicate via a communication link that does not support encryption or decryption. In some embodiments, tag computation and verification are not performed. And some embodiments are limited in their modes of communication.

Turning first to lightweight methods of encryption and decryption, some embodiments described herein use at least a portion of a dynamic substitution box (LUT). In contrast to a static substitution box, an LUT is computed at runtime, for example, during execution of an encryption or decryption function. An LUT is a lookup table in which the keys are bits representing message blocks and the target values are substitution values composed of at least one of randomly or pseudo-randomly selected bits. In some embodiments, the keys are sorted. Thus, if one has a message block to encrypt, the LUT facilitates locating a key corresponding to the message block and accessing the corresponding target value, which is the substitution value (bits).

In some embodiments. the LUT is a table. In some embodiments, the LUT is stored in memory of a chiplet and in some further embodiments is 4 MB or less in size. And in some particular embodiments, the LUT is a table which is both stored in memory of a chiplet and is 4 MB or less in size. For example, an LUT may be 4 MB in size when the keys are only 16 bits and target values are only 512 bits. The sizes of the keys and the target values are discussed later in this document.

In some other embodiments, encryption is performed in part by dynamically computing one or more needed target values of the LUT and the entire LUT is not computed or stored in memory. This approach allows resource-constrained device to save on computation and memory resources.

Some embodiments additionally use a dynamic keystream table (KST). The KST is a lookup table in which the keys are numerical index values (e.g. blocks of bits) organized in numerical order. And the target values for a KST are at least one of random and pseudo-random blocks of bits. A KST thus matches numerical index values with corresponding random or pseudo-random blocks of bits.

Thus, KST's are useful for encrypting, for example, an ordered plurality of message blocks. In some embodiments, the key (the numerical index value) is a number that corresponds to a position of a message block within the ordered plurality of message blocks. If one has the position of the message block within the ordered plurality of blocks, then a KST facilitates locating an index value (a key) that corresponds to that position and then assigning that position a corresponding target value (e.g. a random or pseudo-random block of bits). Therefore, when used to create ciphertext, the use of a KST provides positional information within the ciphertext. KST's are useful for thwarting attacks by a "man in the middle" who as part of an attack reorders ciphertext blocks.

Although the KST is referred to as a "table", the use of the word table in this document is not intended to preclude using other types of data structures. In some embodiments, an entire KST is computed and stored in memory of a chiplet. In other embodiments, a KST is neither computed nor stored in memory. Instead, target values of a KST are computed dynamically, on the fly as needed.

The LUT and the KST are also used for decryption. When an LUT is used for decryption, it is used or configured as an inverse LUT. That is, the target values which are the randomly or pseudo-randomly selected block of bits are mapped back to the bits representing the message blocks (the keys). For LUT's decryption requires that an LUT be used or be configured to be used as an inverse lookup table.

When a KST is used for decryption, it is used in the exact same way as used during encryption. That is, the keys are numerical index values (e.g. blocks of bits) organized in numerical order and the target values for a KST are at least one of random and pseudo-random blocks of bits. A KST thus matches numerical index values with corresponding random or pseudo-random blocks of bits.

Use of the LUT and of the KST may result in replacing computationally expensive multiplication operations used in some encryption and decryption protocols. Thus, encryption and decryption are less computationally expensive for resource-constrained devices.

Some embodiments also replace computationally-expensive hash-based functions, which are commonly used to verify data integrity, with a lightweight CRC which in some embodiments is concatenated with and encrypted along with the message. Computation of a CRC is less computationally-expensive than computing a hash function. Replacing hash functions with CRC's in many cases causes computationally-expensive multiplication to be replaced by less computationally-expensive shift and XOR operations.

Some embodiments provide one or more of five new modes of communication between chiplets. As compared with traditional half duplex and full-duplex, these new modes of communication provide one or more of faster communication with fewer waiting times, reduced data storage requirements, higher security, or higher performance. More details on these are provided below.

Thus, in some embodiments. a cryptographic method performed at least in part with one or more chiplets includes at least providing a message (e.g. a message M) for encrypting at a first computing device, parsing at least the message into at least one message (e.g. M[i]) block that contains first message data (e.g. a block of the message itself) and that is associated with a first index value (e.g. i), dynamically computing at least one row of a first lookup table (e.g. at least one row of a dynamic substitution box), the at least one row of the first lookup table including at least second message data and at least a first target value (e.g. intermediate ciphertext) associated in the at least one row of the first lookup table with the second message data, at least in part with the first message data, accessing the at least one row of the first lookup table to obtain the first target value, dynamically computing at least one row of a second lookup table (e.g. at least one row of a dynamic keystream table), the at least one row of the second lookup table including at least a second index value and a second target value associated in the at least one row of the second lookup table with the second index value, at least in part with the first index value, accessing the at least one row of the second lookup table to obtain the second target value, computing at least some ciphertext with at least one operation with at least the first lookup value and the second lookup value, the at least one operation including at least an XOR operation, and with at least one processing device transmitting the at least some ciphertext from the first computing device to a second computing device.

Referencing FIG. 1, a resource-constrained device, such as smart camera 1 provides an environment in which some embodiments may be at least partially practiced. Smart camera 1 includes lens 2 coupled or integral with housing 10. Housing 10 includes a processing device such as CPU 8. Housing 10 further includes artificial intelligence resources such as for example AI engines 5A-5D, ethernet interface 9, compression circuitry 7, and image processor 6, each of which is communicably linked with CPU 8. An optical filter 3 and an image sensor 4 are provided and are positioned to capture and process light entering lens 2. As has been discussed above, smart camera 1 is just one example of a resource-constrained device.

Figure 2:
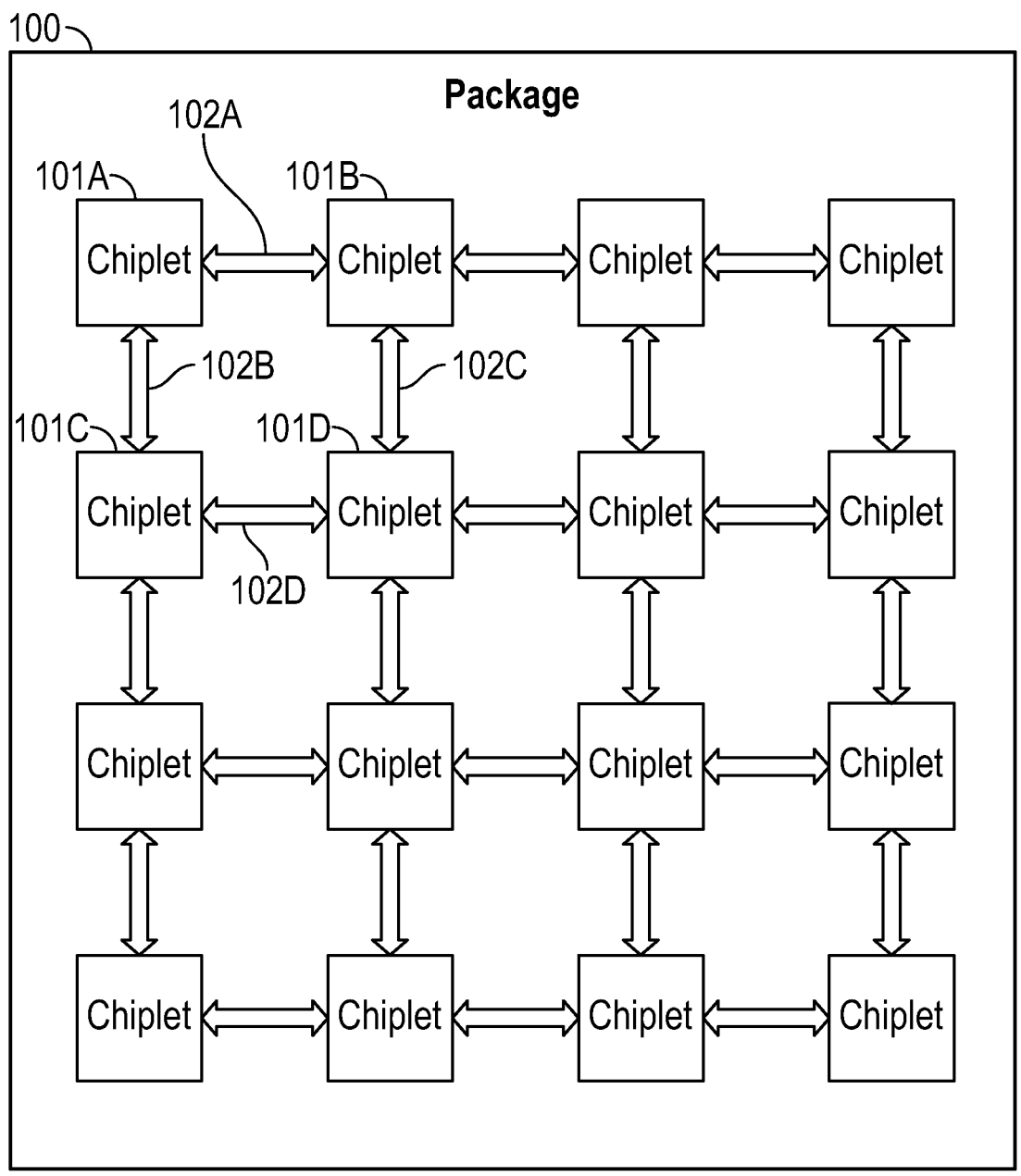
FIG. 2 is a simplified block diagram of a package with which some embodiments may be practiced, showing the package as including a plurality of chiplets communicably linked with a plurality of communication channels.

Referencing FIG. 2, a package 100 includes a plurality of chiplets, including for example chiplets 101A-101D. In some embodiments, package 100 is a component of a processor, such as for example CPU 8 of FIG. 1. The various chiplets, for example chiplets 101A 101D, are communicably linked with one or more other chiplets via communication links, such as communication links 102A-102D.

Figure 3:
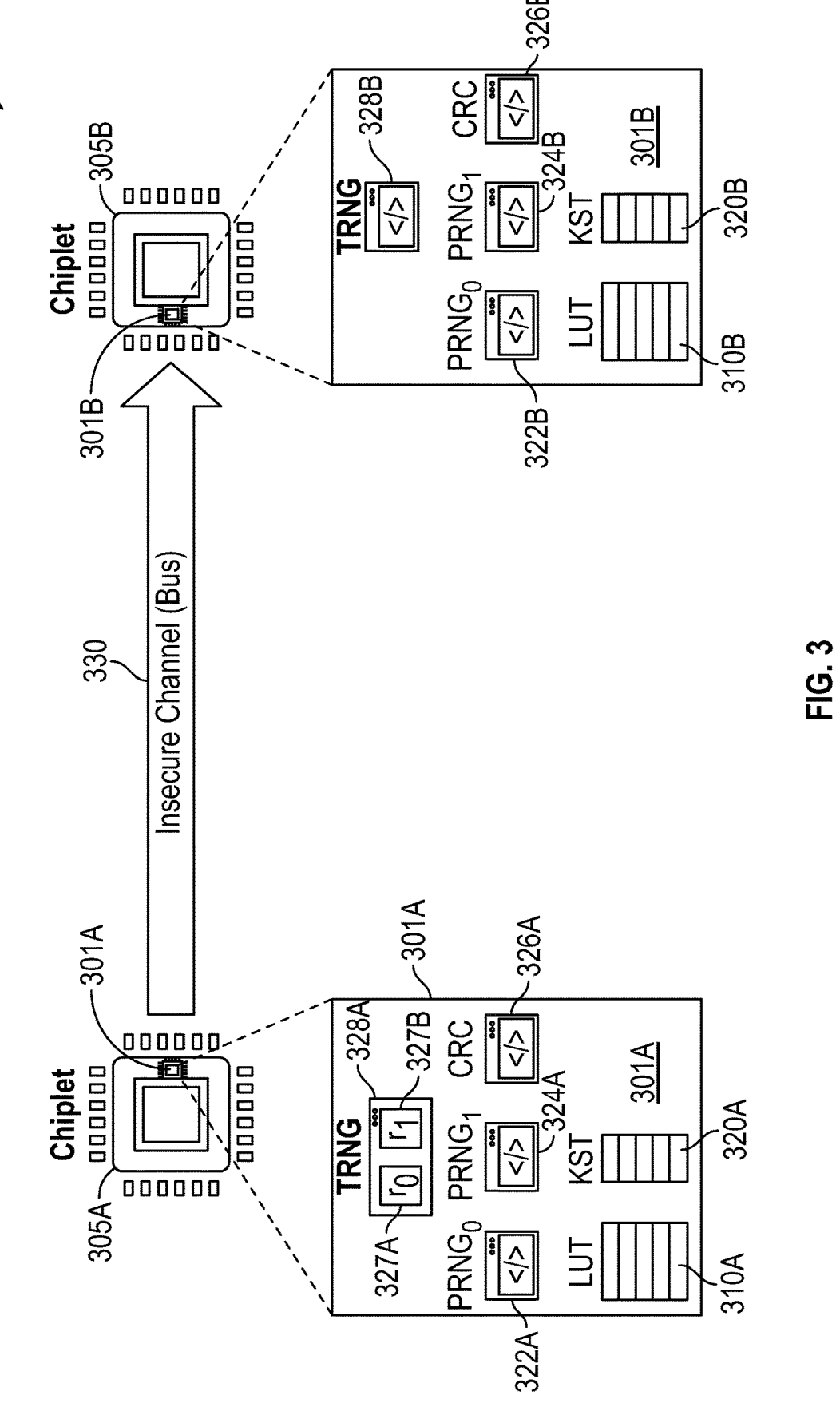
FIG. 3 is a simplified block diagram of a first chiplet and a second chiplet that are communicably linked via an insecure channel, showing various components of both chiplets, consistent with some embodiments.

Referencing FIG. 3, a network 300 includes chiplets 305A, 305B and an insecure channel 330 (e.g. a bus) communicably linking chiplets 305A and 305B. Chiplet 305A includes communication sub-chiplet 301A (same as the transceiver circuit 113 of FIG. 4 which is implemented as a communication sub-chiplet) which includes TRNG 328A (a true random-number generator), $PRNG_0$ 322A and $PRNG_1$ 324A (both pseudo-random number generators), a CRC generator 326A, an LUT 310A and a KST 320A. TRNG 328A is configured to output true random numbers, such as for example, true random numbers r0 (327A) and r1 (327B).

Similarly, Chiplet 305B includes communication sub-chiplet 301B which includes TRNG 328B (a true random-number generator), $PRNG_0$ 322B and $PRNG_1$ 324B (both pseudo-random number generators), a CRC generator 326B, an LUT 310B and a KST 320B.

In some embodiments, communication sub-chiplet 301A is configured to send an encrypted message (not shown) to communication sub-chiplet 301B via insecure channel 330. Communication sub-chiplet 301A encrypts the message in part with LUT 310A and KST 320A. Communication sub-chiplet 301B receives the encrypted message (ciphertext) and decrypts it in part with LUT 310B and KST 320B. In some embodiments, LUT's 310A and 310B are identical and KST's 320A and 320B are identical.

In some embodiments, communication sub-chiplet 301A generates LUT 310A and KST 320A. In some embodiments, this is performed by communication sub-chiplet 301A first generating a true random numbers r0 (327A) and r1 (327B) with TRNG 328A. The true random number r0 is input as a seed into $PRNG_0$ 322A and true random number r1 is input as a seed into $PRNG_1$ 324A. Communication sub-chiplet 301A then uses $PRNG_0$ 322A to generate the LUT 310A. Communication sub-chiplet 301A uses $PRNG_1$ 324A to generate the KST 320A. Communication sub-chiplet 301A uses public key cryptography (e.g. PKC Engine 105 of FIG. 4) to provide the true random numbers r0 (327A) and r1 (327B) via insecure channel 330 to communication sub-chiplet 301B, which then provides the true random numbers r0 (327A) and r1 (327B) to $PRNG_0$ 322B and $PRNG_1$ 324B, respectively, for use as a seed. Communication sub-chiplet 301B then uses $PRNG_0$ 322B to generate the LUT 310B and $PRNG_1$ 324B to generate the KST 320B.

In some embodiments, true random number generators, such as for example TRNG's 328A, 328B, are hardware-based true random number generators. A hardware-based true random number generator generates random numbers based on physical phenomena rather than based on algorithms. Some examples of these physical phenomena are thermal noise, random noise signals, photoelectric effects, quantum effects, and other physical phenomena.

In some embodiments, pseudo-random number generators, such as for example, $PRNG_0$ 322A and $PRNG_1$ 324A are deterministic random number generators that generate pseudo-random numbers based on an algorithm. In some embodiments they are seeded at least in part with a random number or a pseudo-random number. Pseudo-random number generators are sometimes used instead of true random number generators because of reduced computational overhead.

Figure 4:
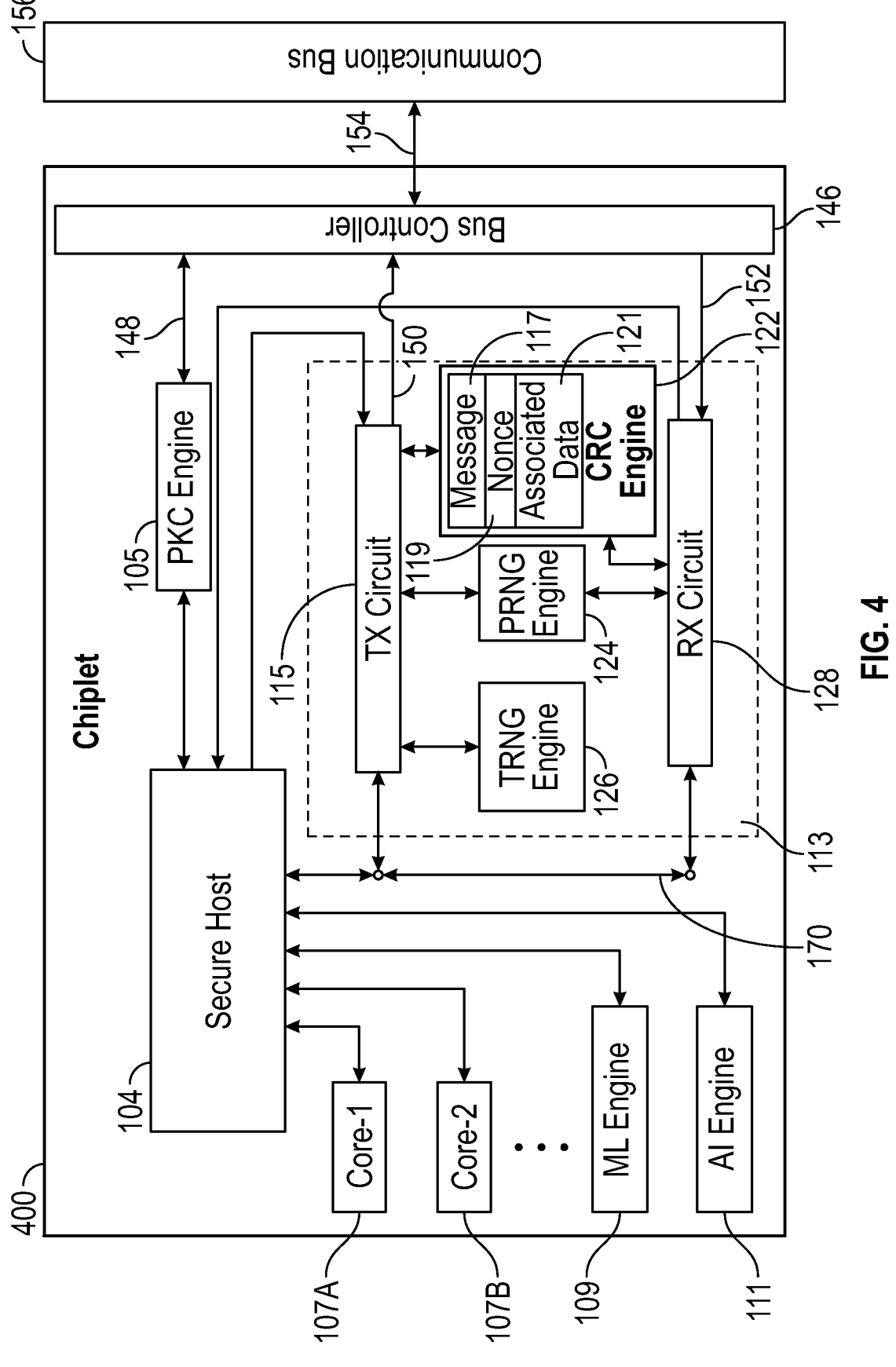
FIG. 4 is a simplified block diagram of an example chiplet consistent with some embodiments, showing first and second cores and various additional components.

Referencing FIG. 4, a chiplet 400 is disclosed in which some embodiments may be practiced. Chiplet 400 includes a secure host 104 (e.g. secure processing circuitry such as for example one or more processors). Consistent with some embodiments, chiplet 400 further includes at least core-1 (107A) and core-2 (107B), an ML engine 109 (a machine-learning engine), and an AI engine 111 (an artificial intelligence engine), all of which are communicably linked with secure host 104. Chiplet 400 further includes transceiver circuit 113 that is communicably linked with secure host 104. Transceiver circuit 113 includes TX Circuit 115 (a transmission circuit), an RX Circuit 128 (a receiver circuit), a TRNG engine 126 (a true random number generator engine), a PRNG engine 124 (a pseudo-random number generator engine), and a CRC engine 122 (a cyclic redundancy check engine). In some embodiments, CRC engine 122 accepts an input a message 117, a nonce 119, and some associated data 121 for generating a CRC.

Although TX Circuit 115 and RX Circuit 128 are at least similar, respectively, to communication sub-chiplet 301A (sender) and to communication sub-chiplet 301B (receiver), there are some differences. For example, in FIG. 3, communication sub-chiplet 301A includes $PRNG_0$ 322A, $PRNG_1$ 322B, TRNG 328A, CRC 326A, LUT 310A, and KST 320A. And similarly, communication sub-chiplet 301B includes $PRNG_0$ 322B, $PRNG_1$ 322B, TRNG 328B, CRC 326B, LUT 310B, and KST 320B. That is, communication sub-chiplets 301A, 301B do not share the foregoing internal components. In contrast, TX Circuit 115 and RX Circuit 128 share (e.g. in a shared memory—not shown), TRNG engine 126, PRNG engine 124, and CRC engine 122.

TRNG engine 126, PRNG engine 124, and CRC engine 122 are each communicably linked with, and therefore accessible to, both TX circuit 115 and RX circuit 128. Each of TX circuit 115 and RX circuit 128 are communicably linked with secure host 104 via communication link 170. Chiplet 400 further includes a public key cryptography engine 105 ("PKC engine") that is communicably linked with secure host 104.

Continuing with reference to FIG. 4, Chiplet 400 further includes a bus controller 146, a communication bus 156, and a communication link 154 that communicably links bus controller 146 with communication bus 156. Bus controller 146 is communicably linked with PKC engine 105 via communication link 148, with TX circuit 115 via communication link 150, and with RX circuit 128 via communication link 152.

Figure 5:
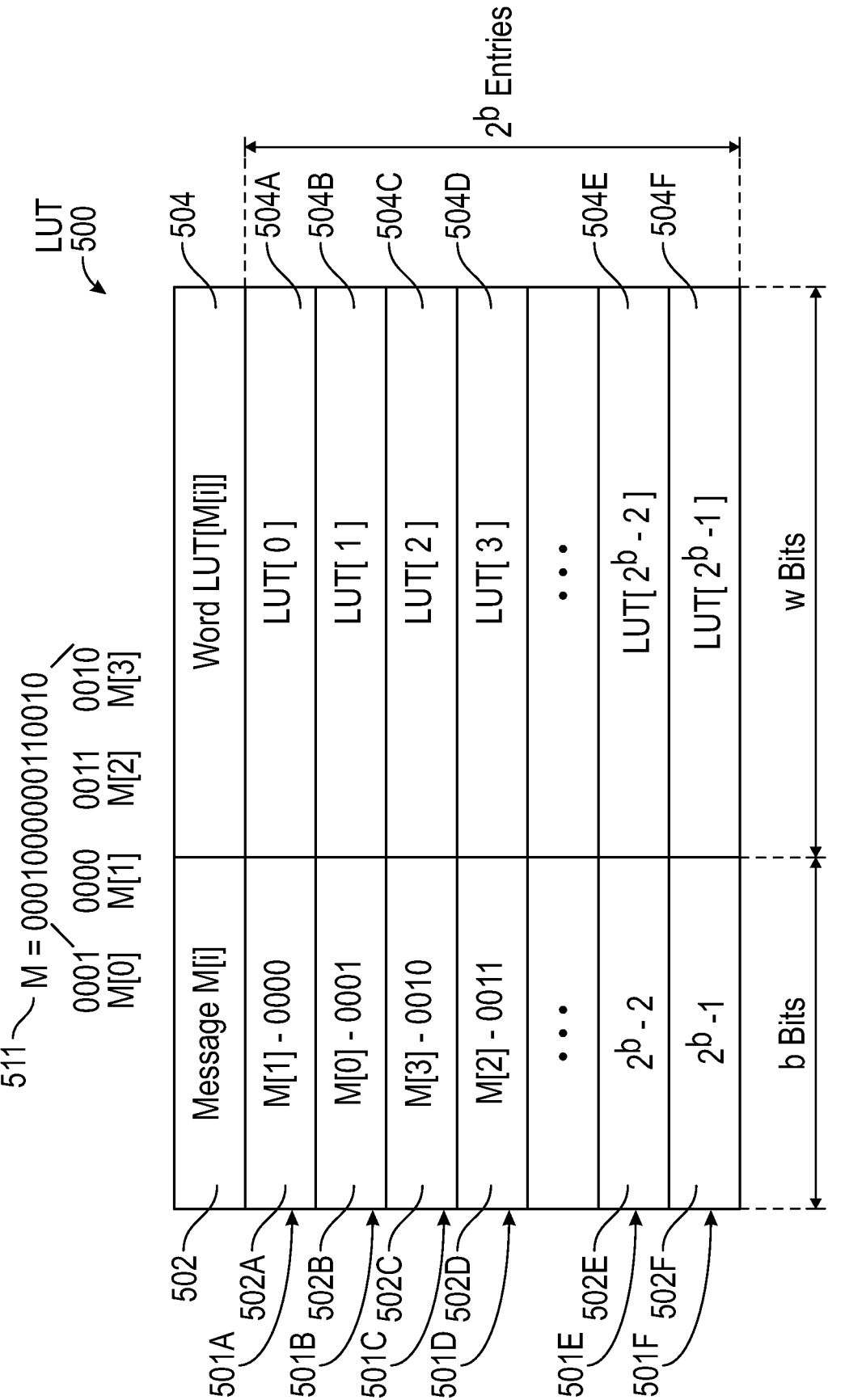
FIG. 5 is a drawing of an exemplary lookup table (LUT), consistent with some embodiments, showing a first column with message data and a second column with target values.

Referencing FIG. 5, LUT 500 is organized as a table data structure that defines rows and columns. Those skilled in the art will recognize that a table may include rows and columns which can be organized as arrays or multi-dimensional arrays. Those skilled in the art, after having been appraised of the principles described herein, will recognize that a variety of implementation choices are possible. All are within the scope of this disclosure. For simplicity this document will refer to rows and columns of a table data structure.

LUT 500 includes a first column 502 of bits (e.g. such as 0000, 0001, 0010, 0011 as shown) that define message blocks 502A-502F (the keys of the LUT). These bits are the actual content of a message M divided into message blocks. After a message is divided into blocks, the message blocks are numerically sorted. The result is message blocks 502A-502F as shown.

LUT 500 also includes a second column 504 with blocks of substitution bits 504A-504F (e.g. LUT[0], LUT[1], LUT [2], LUT[3], . . . LUT $[2^b-2]$, LUT $[2^b-1]$) for the corresponding message blocks 502A-502F. The blocks of substitution bits 504A-504F are at times also referred to as target values because they can be accessed in LUT 500 via the message blocks 502A-502F (the keys) of the first column 502. That is, one may access a message block such as message block 502A and thereby access target value LUT[0] (504A).

Further referencing FIG. 5, LUT 500 defines rows 501A-501F that include both a message block and its associated block of substitution bits. For example, row 501A includes both message block 502A which contains bits 0000 (e.g. 0000) and its corresponding block of substitution bits 504A, denominated LUT[0].

In this example, the message blocks defining column 502 are b bits wide. And the corresponding substitution bits defining column 504 are w bits wide. This results in ciphertext blocks that are w bits wide. For increased security of the ciphertext, the value w is generally greater than the value of b. For example, in an exemplary embodiment, b is 16 bits and w is 256 bits. Other values for b and w are of course possible. For example, where increased security is desirable w is 512 or perhaps 1024. The variables b and w are relevant to various embodiments discussed below and will be discussed below as needed.

The value b determines how many rows are in columns 502 and 504, specifically $2^b$. But because message block 502A has bits equal to zero (0000), the last row 502F has bits equal to $2^b-1$. As discussed below, in some embodiments, b and w are set by a security parameter $\lambda$.

An example showing organization of sample message blocks is now discussed. A message M (511) consists of bits 0001000000110010. This message M is divided into blocks M[0]=0001, M[1]=0000, M[2] 0011, and M[3]=0010. These blocks are then used to define column 502 of LUT 500. But before being used to form column 502, the blocks are numerically sorted. It can be seen that the bits in message blocks 502A-502D are numerically sorted to be in numerical order: 0000, 0001, 0010, 0011. These message blocks are the keys for the LUT 500. LUT[0] is then the block of substitution bits for 0000, LUT[1] is the block substitution bits for 0001, LUT[2] is the block of substitution bits for 0010, and LUT [3] is the block of substitution bits for 0011. And LUT[0]-LUT[3] are target values for LUT 500. Then one intending to find the substitution bits for 0010 would search column 502 for the row (row 501C) with bits 0010, which is a key. Once the key is found, one then finds the corresponding block of substitution bits as LUT[3] (the target value).

Figure 6:
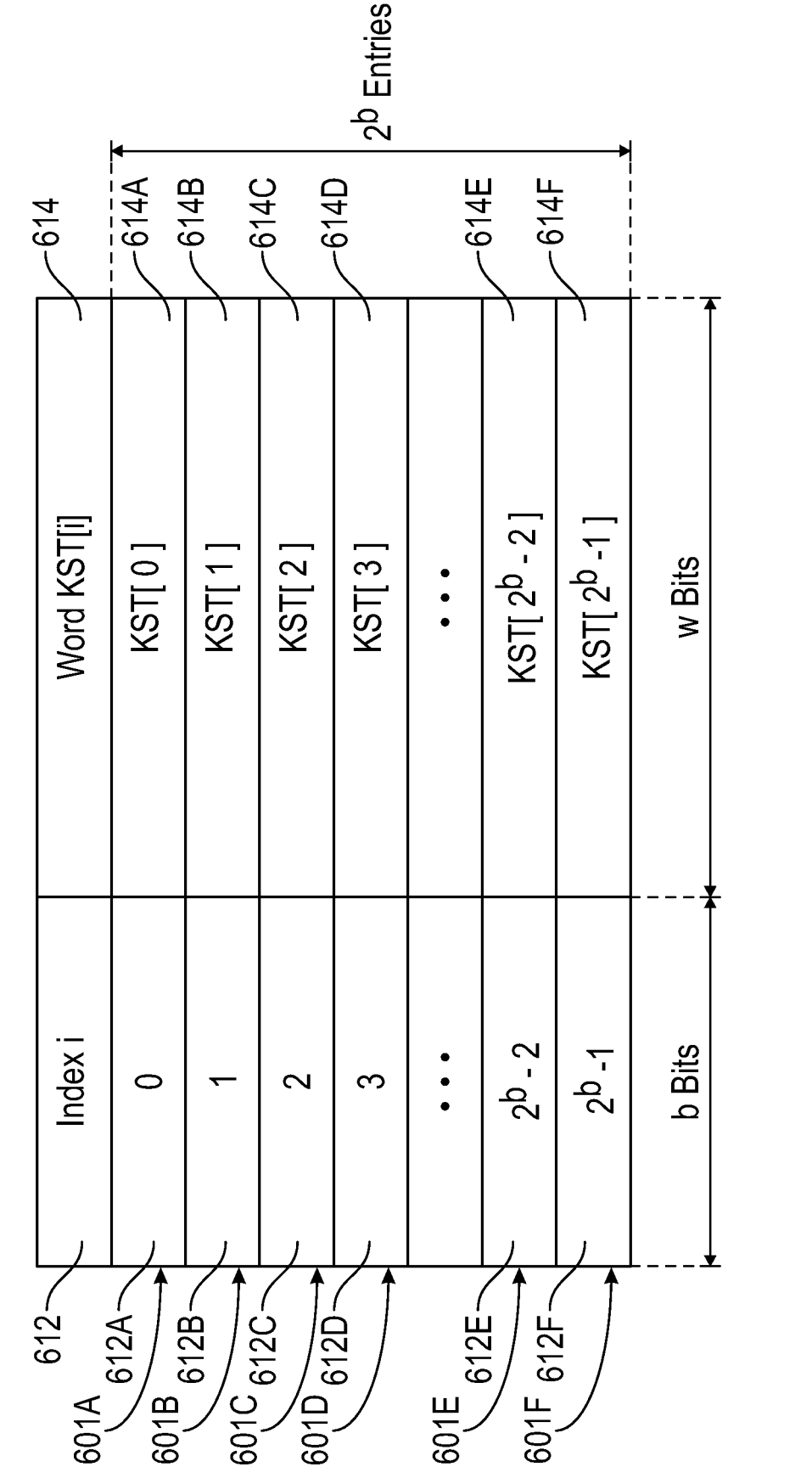
FIG. 6 is a drawing of an exemplary key stream table (KST), consistent with some embodiments, showing a first column with index values and a second column with target values.

Referencing FIG. 6, KST 600 is organized as a table data structure that defines rows and columns. Those skilled in the art will recognize that a table may include rows and columns which can be organized as arrays or multi-dimensional arrays. Those skilled in the art, after having been appraised of the principles described herein, will recognize that a variety of implementation choices are possible. All are within the scope of this disclosure. For simplicity this document will refer to rows and columns of a table data structure.

KST 600 includes a first column 612 that includes the index values from 0 to ($2^b$−1), (612A-612F) where b is number of bits in the index values. The value b also determines the number of rows (601A-601F) in the KST. For example, if b is 4, then each index value has 4 bits and the number of rows in the KST is 24=16. The index values 612A-612F are the keys for looking up the target values, which are discussed next.

KST 600 has a second column 614 with target values that comprise random or pseudo-random blocks of bits that correspond to the index values (the keys) in column 612. For example, target value KST[0] corresponds to index 0 (its key) where KST[0] is a block of random or pseudo-random bits. Thus, for index values 0 to ($2^b$−1) of column 612 (reference numbers 612A-612F), the corresponding target values are KST[0]-KST[$2^b$−1] of column 614 (reference numbers 614A-614F). Thus, if one seeks the target value that correspond to index 3 (index value 612D in row 601D), then the corresponding target value is KST[3] (614D).

KST 600 may also be seen as organized into rows 601A to 601F, where each row has an index value (e.g. index value 0 of row 601A) and a corresponding target value (e.g. KST[0] of row 601A).

The number of bits in the blocks of random or pseudo-random bits of the target values (614A-614F) is w, which is set based on security levels. Generally, if other factors are held constant, as w increases the security level also increases.

The index values 612A-612F are associated with positions of message blocks and may be regarded as position values. For example, returning to FIG. 5 to reference ordered message blocks M[0], M[1], M[2], M[3], the numbers in brackets are index values. For example, for message block [3] the number 3 is an index value (e.g. index value 3 (612D in row 601D in KST 600) associated with the position of message block M[3] within the ordered message blocks M[0], M[1], M[2], M[3]. If a message block changes positions between encryption and decryption (e.g. if moves from position 3 to position 2) the KST will provide one target value during encryption and a different target value (based on the different position) for decryption and an error will result, because of which, during decryption, it is highly unlikely to get the correct key value in the inverse LUT from the obtained target value. Thus, the KST can be used to detect a change in an ordering of blocks, perhaps the result of an attack.

Returning to reference FIG. 5, when LUT 500 is used for encryption, the keys (message blocks 501A-501F) are used to access the corresponding target values (e.g. blocks of substitution bits 504A-504F). However, during decryption, this operation is reversed. That is, the target values (e.g. blocks of substitution bits 504A-504F) are used to access the keys (message blocks 501A-501F). Therefore, if one has a target value there is a way to find the target value's corresponding key. If one has a target value and can find the target value in column 504, then the corresponding message block is the message block that shares the same row as the target value in LUT 500.

In FIG. 5 the target values LUT[0]-LUT[$2^b$−1] are blocks of random or pseudo-random bits. These blocks of random or pseudo-random bits are not in any particular order. Instead, the rows (501A-501F) of the LUT 500 are sorted according to the numerical values of the bits of the message blocks (502A-502F).

But there are times when it is necessary to find a particular target value. For example, if during decryption a ciphertext block has bits xxxx (i.e. arbitrary bits), then one needs to determine which target value has bits that match xxxx. One can compare those bits xxxx to the bits in the target values of column 504 to locate the target value with the correct matching bits. If the bits xxxx match the bits of LUT[2], then one can determine that LUT[2] is in row 501C and that the corresponding message block in row 501C is message 0010 (502C). That raises the issue of how one searches column 504 for the target value with the desired block of bits. There are at least two possible scenarios.

In the first scenario, the target values in column 504 are not sorted. That is, the blocks of random or pseudo-random bits defining the target values of column 504 are not organized in any particular order. In this scenario, one may search column 504 of LUT 500 for the target value that matches a desired pattern of random or pseudo-random set of bits. In one embodiment, this is a linear search. A linear search cannot be replaced by, for example, binary search because binary search requires a sorted set of values, (e.g. a sorted list). While an LUT with unsorted target values in its second column may be used as an inverse LUT (e.g. where keys are accessed based on their corresponding target values), the linear search takes time and computational resources. Nevertheless, this is one option. An LUT with unsorted target values in its second column can be used as an inverse LUT. But, there is at least one other scenario, discussed below.

Figure 7:
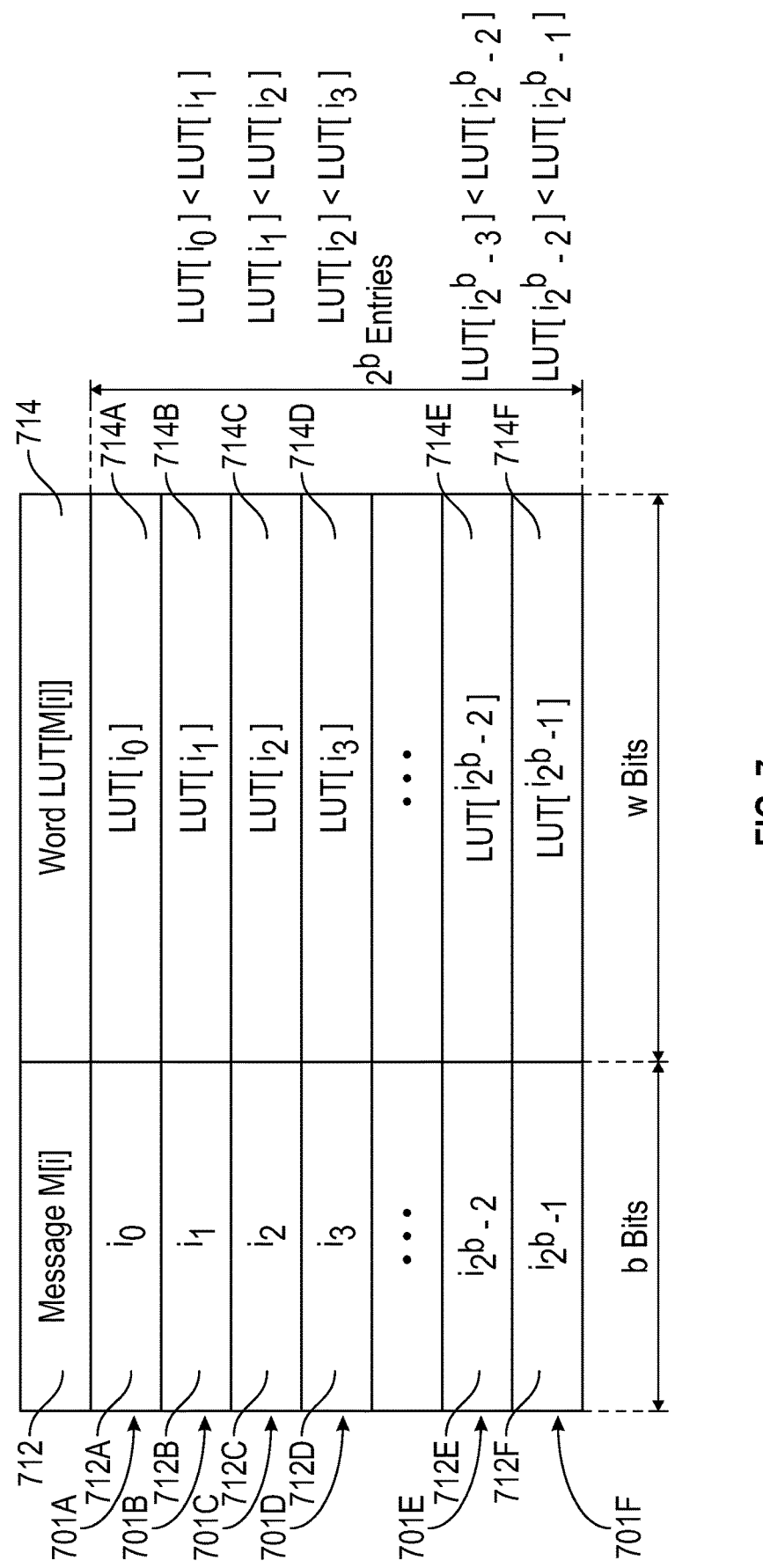
FIG. 7 is a drawing of an exemplary sorted inverse lookup table (designated LUT$^{-1}$), consistent with some embodiments, showing a second column of sorted target values.

Referencing FIG. 7 a sorted inverse LUT 700 is discussed. The content of sorted inverse LUT 700 (i.e. LUT$^{-1}$) is the same as the content of LUT 500 except that the rows 701A-701F have been sorted according to their target values (714A-714F) in the second column 714. Specifically, the target values of column 714 are sorted to achieve and ordering in which: LUT[$i_0$]<LUT[$i_1$], LUT[$i_1$]<LUT[$i_2$], LUT[$i_2$]<LUT[$i_3$] and LUT[$i_{2^b−2}$]<LUT[$i_{2^b−1}$]. Rows 701A-701F and message blocks 712A-712F of first column 712 are ordered consistently with the sorted target values. This means that the blocks of random and pseudo-random bits that define target values LUT[$i_0$]-LUT[$i_{2^b−1}$] are ordered. They may be searched with an efficient non-linear search algorithm, such as binary search.

For example, if one searches for a target value with a bit pattern that matches xxxx (i.e. random bits), then one may perform a non-linear binary search to find a matching target value in sorted inverse LUT 700. If for example, the matching target value is LUT[$i_2$], then one may access the correct corresponding message block $i_2$.

Figure 8:
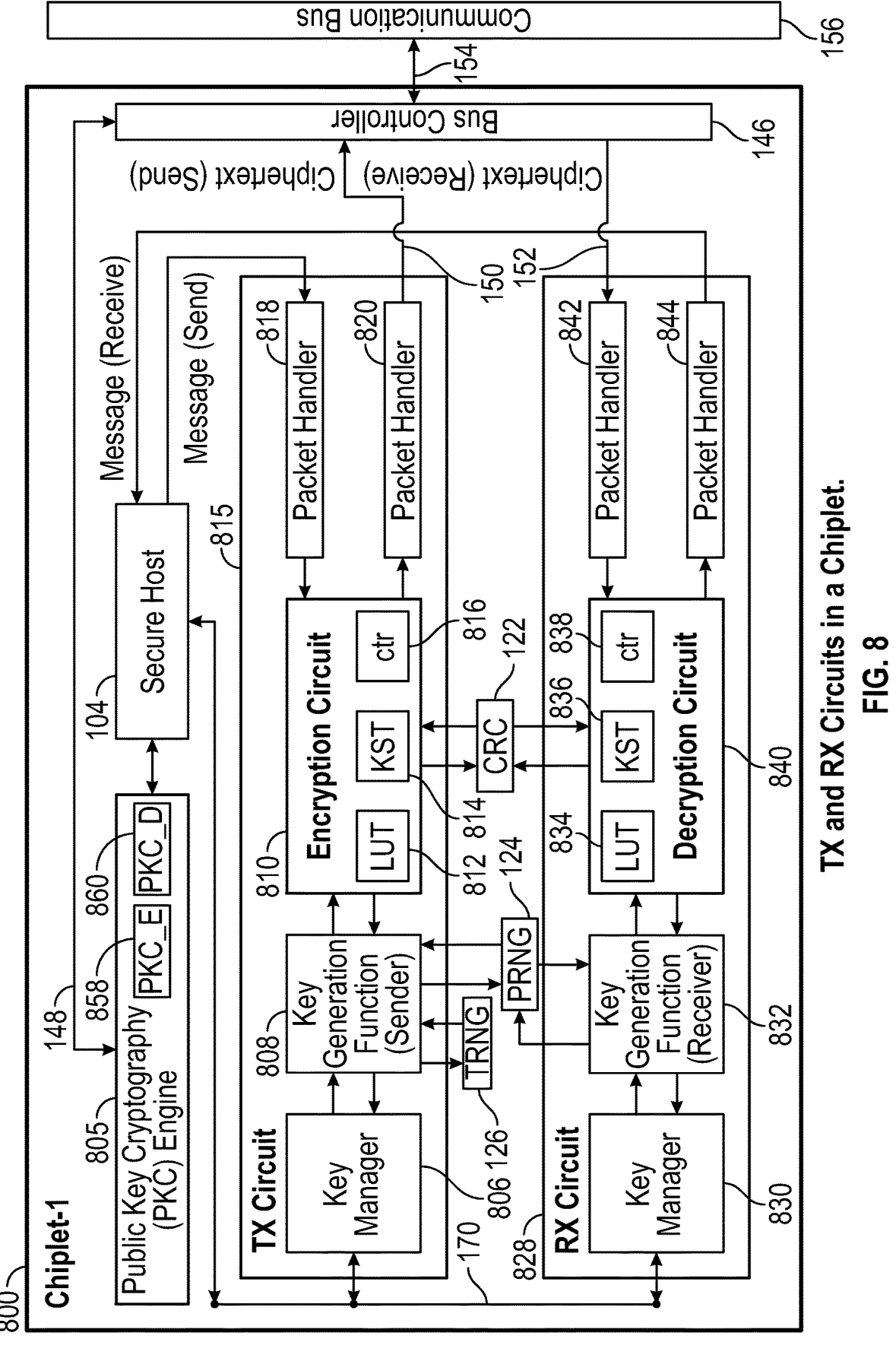
FIG. 8 is a simplified block diagram of a chiplet consistent with some embodiments, showing encryption and decryption circuits with each storing a lookup table, a key stream table, and a counter (ctr).

Referencing FIG. 8, a chiplet 800 includes a public key cryptography engine 805 (PKC engine), a secure host 104, a TX circuit 815 (a transmission circuit), and an RX circuit 828 (a receiving circuit). Chiplet 800 is communicably coupled via communication links 150 and 152 with a bus controller 146, and via communication link 154 with a communication bus 156. TX circuit 815 and RX circuit 828 are communicably linked with local host 104 via communication link 170, and thus may receive commands, instructions, and data from local host 104.

PKC engine 805 includes a public key encryption circuit PKC_E 858 which uses the public key of a receiver chiplet to encrypt the message, and a public key decryption circuit PKC_D 860 which uses the private key of the chiplet 800 to decrypt the ciphertext. PKC engine 805 is communicably coupled with bus controller 146 via communication link 148. PKC engine 805 is also communicably linked with secure host 104 (e.g. one or more processing devices, such as for example, one or more CPU's).

TX circuit 815 includes a key manager 806, a key generation function (sender) 808, an Encryption Circuit 810, a packet handler 818 for receiving transmissions from secure host 104 and a packet handler 820 for transmitting to bus controller 146 via communication link 150.

Encryption Circuit 810 includes a dynamic substitution box in the form of LUT 812, a dynamic keystream table in the form of KST 814, and a counter in the form of ctr 816. The KST 814 is optional. In some embodiments, target values that would be obtained from KST 814 are instead generated on the fly as needed, saving the need to generate and store the KST. The key generation function (sender) 808 is communicably linked for sending and receiving with TRNG 126 (a true random number generator) and for sending and receiving with PRNG 124 (a pseudo-random number generator). Encryption Circuit 810 is communicably linked for sending and receiving with CRC 122 (a CRC generator).

RX circuit 828 includes a key manager 830, a key generation function (receiver) 832, a Decryption Circuit 840, a packet handler 844 for sending transmissions to secure host 104 and a packet handler 842 for receiving communications from bus controller 146 via communication link 152. Decryption Circuit 840 includes a dynamic substitution box in the form of LUT 834, a dynamic keystream table in the form of KST 836, and a counter in the form of ctr 838. In some embodiments, LUT 812 and LUT 834 share the same data, KST 814 and KST 836 share the same data, and ctr 816 and ctr 838 share the same data. The KST 836 is optional. In some embodiments, target values that would be obtained from KST 836 are instead generated on the fly as needed, saving the need to generate and store the KST. The key generation function (receiver) 832 is communicably linked for sending and receiving with PRNG 124 (a pseudo-random number generator). Decryption Circuit 840 is communicably linked for sending and receiving with CRC 122.

A process is now described in which Chiplet 800 (a first chiplet) generates a session key K and transmits K to a second chiplet for use by the second chiplet in performing encryption. Consistent with some embodiments, the chiplet 800 may perform the following steps with the indicated components: (1) key generation function (sender) 808 computing a session key K consistent with method 900 of FIG. 9 (discussed below), (2) the key generation function (sender) 808 sending K to key manager 806 of the TX Circuit 815, (3) the key manager 806 receiving K and further sending K to the Secure Host 104, (4) Secure Host 104 configured for receiving K and further sending K to public key cryptography (PKC) engine 805 with a request for encryption operation on K and for transmission to a second chiplet, (5) PKC engine 805 receiving and then sending K along with the public key of the second chiplet to public key encryption module PKC_E 858, (6) public key encryption module PKC_E 858 receiving K and public key of second chiplet, (7) public key encryption module PKC_E 858 encrypting K to obtain encrypted session key KEnc, the encryption including at least one or more operations that include at least some public key cryptography method, (8) public key encryption module PKC_E 858 further configured for sending KEnc to the PKC Engine 805, and (9) PKC engine 805 receiving key KEnc and transmitting KEnc to the second chiplet via the communication link 148 to bus controller 146 and then via communication link 154 to the communication bus 156 for delivery to the second chiplet.

The second chiplet then continues the process with the following steps by the indicated components: (1) a PKC engine receiving KEnc from the first chiplet via the communication link via a bus controller the communication bus 156, (2) the PKC engine sending key KEnc along with the private key of the second chiplet to a public key decryption module PKC_D, (3) the public key decryption module PKC_D receiving KEnc and the private key of second chiplet, (4) the public key decryption module PKC_D decrypting KEnc to obtain session key K, the decryption including at least one or more operations that include at least some public key cryptography method, (5) the public key decryption module PKC_D sending K to a PKC Engine of the second chiplet, (6) the PKC engine receiving K and then sending K to the Secure Host of the second chiplet, (7) the Secure Host receiving K and sending K to a key manager of the RX circuit of the second chiplet, (8) the key manager K and sending K to the key generation function (receiver) 832, (9) the key generation function (receiver) receiving K from key manager of the RX Circuit of the second chiplet, and (10) key generation function (receiver) 832 computing the decryption key (LUT, KST, ctr) consistent with method 1000 of FIG. 10 (discussed below).

Figure 9:
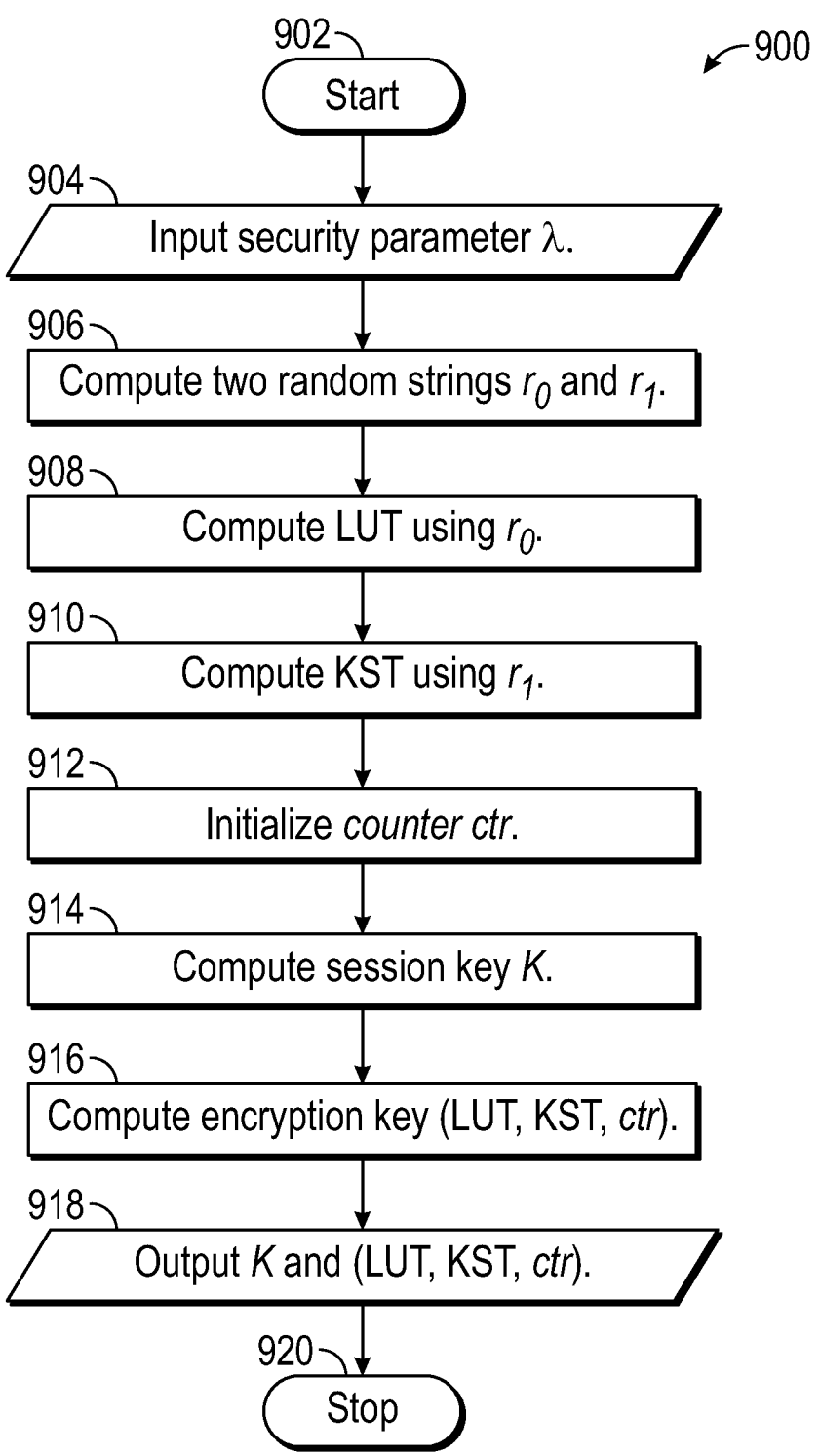
FIG. 9 is a flow chart illustrating an exemplary method of key generation performed at a sending device, consistent with some embodiments.

FIG. 9 and some subsequent drawings illustrate exemplary methods that are capable of being performed in one or more of the physical environments (e.g. chiplets) illustrated in other drawings. However, the exemplary methods are not limited to the disclosed physical environments and may be performed in a variety of other physical environments. In addition, although the exemplary methods have steps or operations that are illustrated as being performed in certain orders or sequences, it should be understood that at least some of the illustrated steps and orders may be performed in different orders or sequences or may be performed concurrently.

Referencing FIG. 9, a method 900 of initializing a sender (e.g. TX circuit 815) for encryption is illustrated. The input is a security parameter λ (lambda). The output is a session key (K), and the encryption key (LUT, KST, ctr) comprising of a dynamic substitution box (LUT), a dynamic keystream table (KST), and a counter (ctr). Method 900 will be referred to at times as the Sender's Key Generation Function ("K_Gen_Sender").

After a start operation 902, control proceeds to operation 904 which inputs the security parameter λ. The λ controls various security matters such as the size of b and w from FIGS. 5-7 above. In addition to controlling message block size, the value b in some embodiments, also controls a nonce size. The nonce is important for security and is discussed further below.

Other matters set dependent on λ may include the length of CRC's (parameter len_crc), the size of the counter ctr (setting parameter len_ctr), the maximum size of a message (setting parameter max_mess_size), the maximum number of message blocks in a session (setting parameter max_blk_cnt), the refresh rate for the session keys (setting parameter ref_rate). Other start-up items include initializing the true random number generator TRNG 126, initializing the pseudo-random number generators, such as PRNG 124, and initializing the counter ctr (discussed below).

Control proceeds to operation 906 which computes random numbers r0 and r1. In some embodiments, operation 906 is performed with a TRNG 126. The number of bits (e.g. the length) of r0 and r1 is a security setting controlled by λ. Having been generated by, for example, TRNG 126, r0 and r1 are true random numbers. In some alternative embodiments, r0 and r1 are generated with a pseudo-random number generator, such as for example PRNG 124.

Control proceeds to operation 908 which computes a dynamic substitution box (LUT) using r0. In some embodiments, operation 908 is performed with a pseudo-random number generator which could be designated $PRNG_0$ and by using r0 as at least a portion of a seed for $PRNG_0$.

In some embodiments, r0 is used as at least a portion of a seed to compute the target values of LUT 500. For example, LUT[M[0]] could be computed with just r0+M[0] as the seed for a pseudo-random number generator, such as for example, $PRNG_0$ 322A with M[0] in this context being the numerical bits at M[0]. Then, LUT[M[1]] could be computed by seeding $PRNG_0$ 322A with r0+M[1], LUT[M[2]] could be computed with r0+M[2] as the seed for $PRNG_0$ 322A. Other target values LUT[M[i]] could be similarly computed. In another example, the target values LUT[M[i]] could be computed on a combination of the intermix of a bit 0 (to distinguish the use of $PRNG_0$ 322A from $PRNG_1$ 324A), value of message block M[i] and random string r0 as the seed for PRNG 124. In another embodiment, the entire LUT table can be computed using $PRNG_0$ 322A (or PRNG 124, with an additional distinguisher 0 bit as input) with r0 as seed and specifying "$w*2^b$" bits as the length of output string. The generated random bit-string could be parsed and stored in the subsequent locations to populate the LUT.

Control proceeds to operation 910 which computes a KST using r1. In some embodiments, r1 is used as a portion of a seed for a different pseudo-random number generator which can be, for example, $PRNG_1$ 324A. In some embodiments, the individual target values for KST are computed by seeding $PRNG_1$ with r1+x, where x is an index value. For example, KST[0] may be computed with the seed for $PRNG_1$ being r1+0. KST[1] may be computed with the seed for $PRNG_1$ being r1+1. KST[2] may be computed with the seed for $PRNG_1$ being r1+2. Other KST target values could be similarly computed. In another example, the target values KST[i] could be computed on a combination of the intermix of a bit 1 (to distinguish the use of $PRNG_1$ 324A from $PRNG_0$ 322A), index i and random string r1 as the seed for PRNG 124.

Control proceeds to operation 912 which initializes counter ctr. In some embodiments, counter ctr is initialized at zero. In other embodiments, the counter ctr can be initialized to a random number that is dependent on one or more of the random numbers r0 and r1, generated using PRNG 124, or any other mathematical function.

Control proceeds to operation 914 which computes a session key, designated K. In some embodiments, K=r0∥r1, that is, r0 concatenated with r1. After this, in operation 916, the Control proceeds to compute the encryption key, designated (LUT, KST, ctr), consisting of the dynamic substitution box (LUT), dynamic keystream table (KST) and the counter ctr. And in operation 918, the following are output: (1) the session key K, and (2) the encryption key (LUT, KST, ctr) consisting of dynamic substitution table LUT, the dynamic keystream table KST, and counter ctr. Operation 920 is a stop operation.

Figure 10:
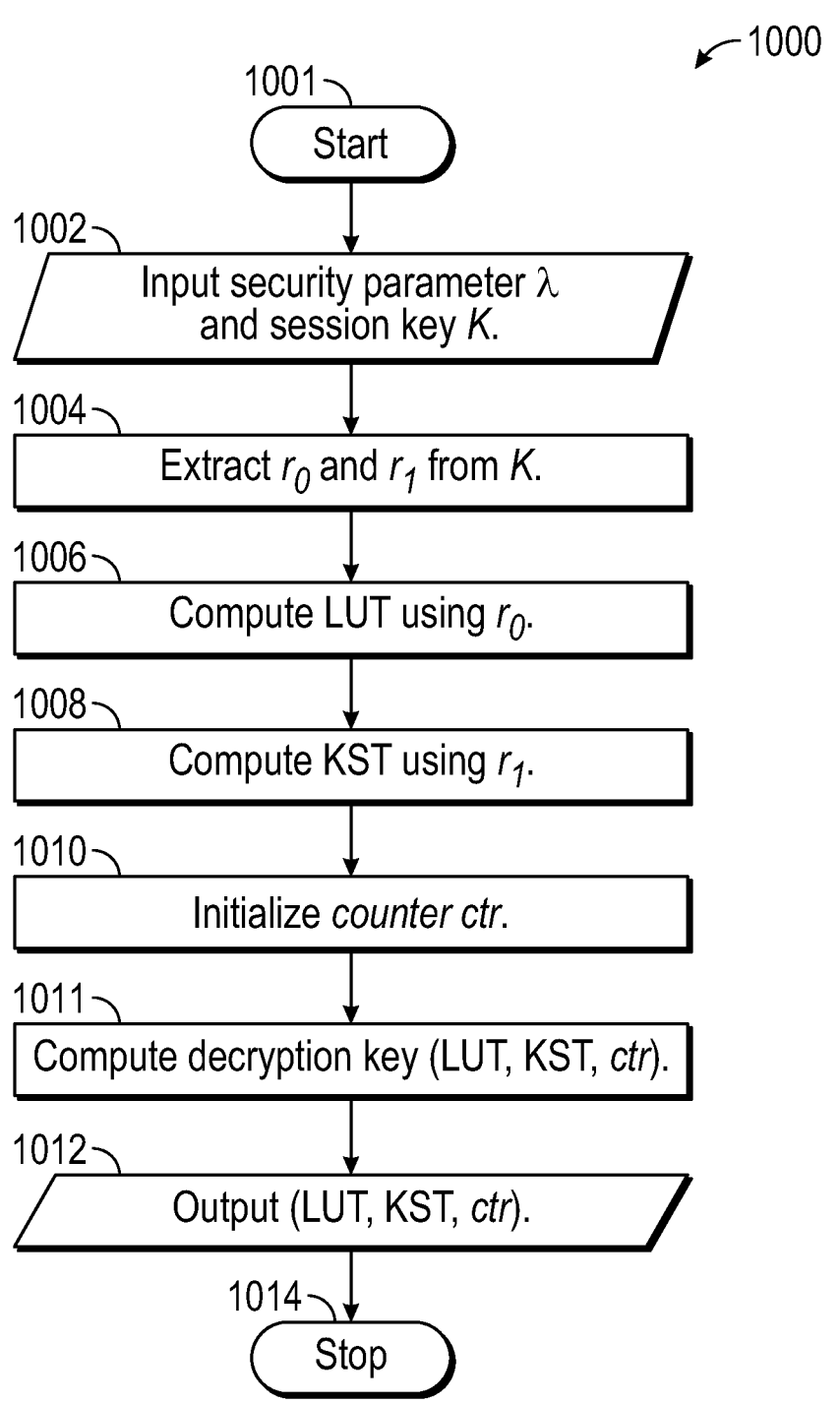
FIG. 10 is a flow chart illustrating an exemplary method of key generation performed at a receiving device, consistent with some embodiments.

Referencing FIG. 10, a method 1000 of initializing a receiver (e.g. RX circuit 828) for decryption is illustrated. The input is the security parameter λ and the session key K computed in method 900. The output is the decryption key (LUT, KST, ctr) comprising of the dynamic substitution box (LUT), the dynamic keystream table (KST), and the counter ctr. Method 1000 will be referred to at times as the Receiver's Key Generation Function ("K_Gen_Receiver").

After start operation 1001, control moves to operation 1002 which inputs the security parameter λ and session key K. The session key, K was computed in method 900 discussed above. The discussion of λ above regarding method 900 is fully applicable.

Control moves to operation 1004 which extracts random numbers r0 and r1 from K. The computation of r0 and r1 and how they are concatenated to form K is all discussed above relative to method 900.

Control moves to operations 1006 and 1008 which, respectively, compute a dynamic substitution table (LUT) using r0 and computing a dynamic keystream table (KST) using r1. At least similar operations are discussed above relative to method 900 and that discussion is fully applicable here.

Control moves to operation 1010 which initializes a counter ctr. In some embodiments, ctr is initialized to zero. Some other methods of computation of ctr are discussed above relative to method 900.

After this, in operation 1011, the Control proceeds to compute the decryption key, designated (LUT, KST, ctr), consisting of the dynamic substitution box (LUT), dynamic keystream table (KST) and the counter ctr.

Control moves to operation 1012 which outputs the decryption key (LUT, KST, ctr). Control then moves to stop operation 1014.

Figure 11:
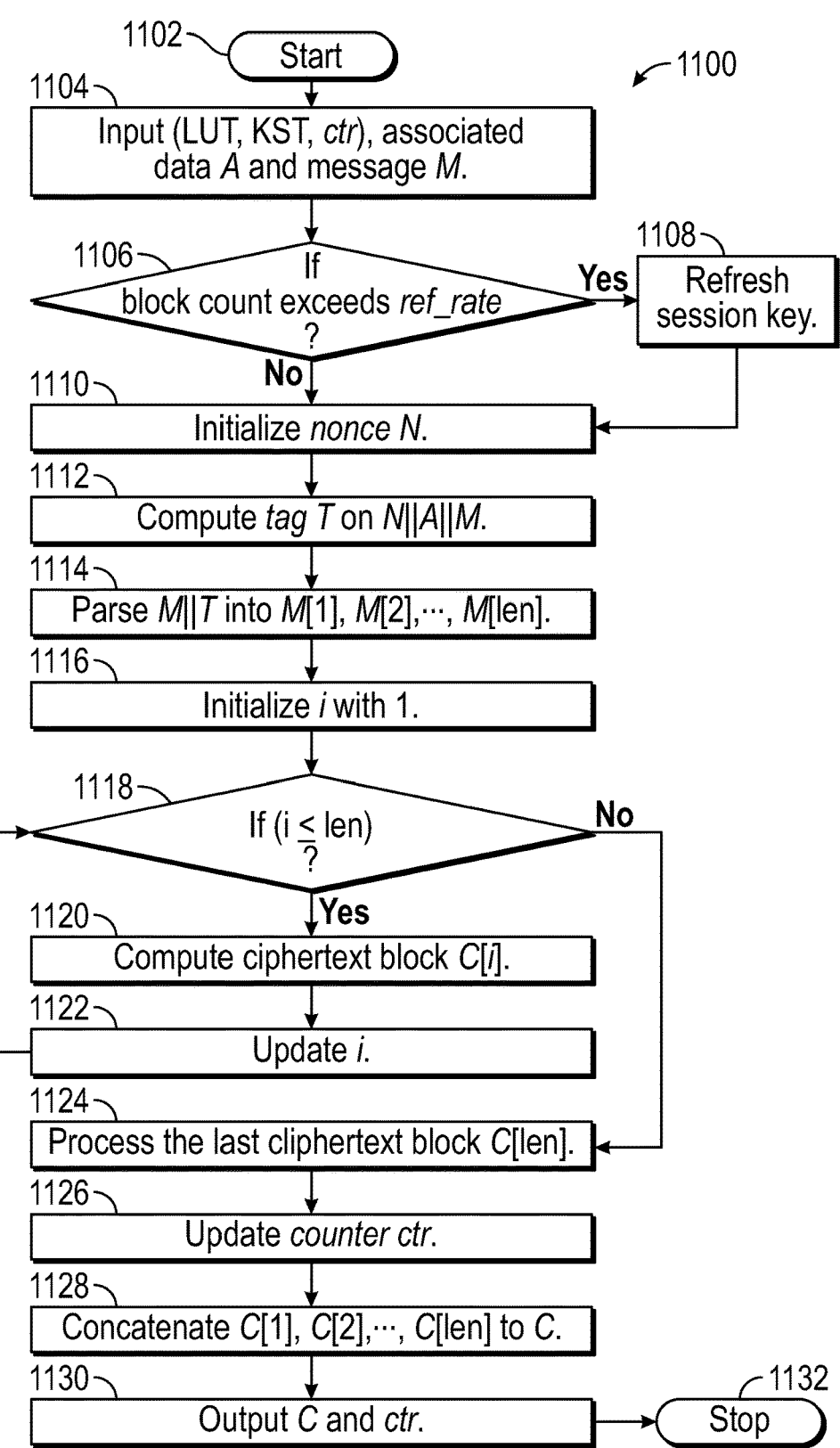
FIG. 11 is a flow chart illustrating an exemplary method of encryption, consistent with some embodiments.

Referencing FIG. 11, a method 1100 of encrypting a message is described. In discussing method 1100, it is assumed that both of methods 900 and 1000 have been performed.

The input for method 1100 is the encryption key (LUT, KST, ctr), consisting of a dynamic substitution box (LUT), a dynamic keystream table (KST), and the counter ctr. Other inputs include some associated data A and a message M to encrypt. The output is a ciphertext with a "tag" and an updated counter ctr.

Of the above inputs, the LUT, KST, and ctr have been previously discussed. The associated data A refers to data that is not encrypted but that is incorporated into a CRC. The associated data A and its use is discussed further below.

The following discussion of FIG. 11 references an encryption algorithm A. Encryption algorithm embodies a particular embodiment within the scope of method 1100. Those with skill in the art, once appraised of the principles discussed herein, will be aware of more alternatives to those stated below.

Encryption Algorithm A

| Enc(LUT, KST, ctr), A, M) |
| --- |
| 1. If (ctr + len + 2 ≥ ref_rate) ※. |
|   a. Refresh Session Key (Execute Key Exchange Protocol.) |
| 2. Compute nonce as N := KST[ctr] †. |
| 3. Compute CRC on message M as T := CRC(N ∥ A ∥ M). |
| 4. Parse M[1] ∥ M[2] ∥ ⋯ ∥ M[len] := M ∥ T. |
| 5. Initialize the temporary variable, temp := N ‡. |
| 6. For i := 1,2, … , len |
|   a. Parse $t_1$ ∥ $t_2$ ∥ … ∥ $t_m$ := temp. |
|   b. Compute val := $t_1 \oplus t_2 \oplus \dots \oplus t_m$ ♠ |
|   c. Compute C[i] := temp := LUT[M[i] ⊕ val] ⊕ KST[ctr + i] ※. |
| 7. Compute C[len] := C[len] ⊕ KST[ctr + len + 1]. |
| 8. Update counter ctr := ctr + len + 2. |
| 9. Compute ciphertext C := C[1] ∥ C[2] ∥ ⋯ ∥ C[len]. |
| 10. Return C and ctr. |

-continued

| Enc(LUT, KST, ctr), A, M) |
| --- |

✗ : If counter is initialized as ctr := KST[0] mod $2^b$, then, depending
on the implementation, the condition will be:
  a. (blk_ctr + len + 2 ≥ ref_rate), or
  b. (ctr + len + 2 − KST[0] ≥ ref_rate).
†: Nonce can also be randomized as:
  a. Compute b : N & 0x01.     (For the first value, N := KST[0])
  b. Compute idx := idx + 1.     (For the first value, idx := 0)
  c. Compute N := $PRNG_{1-b}(r_b \parallel idx)$.
‡: Variable temp can also be computed as temp := LUT[N].
♠: For some Integer s, variable val can also be computed as:
    val := $t_1 \oplus (t_2 \ll s) \oplus ... \oplus (t_m \ll s(m-1))$
⚕: C[i] can also be computed as:
  a. Compute temp := LUT[M[i] ⊕ val].
  b. Compute C[i] := temp ⊕ KST[ctr + i].

Again referencing FIG. 11, after a start operation 1102, control moves to operation 1104 which inputs the encryption key (LUT, KST, ctr), associated data A, and a message M to be encrypted.

Control moves to operation 1106 which determines if a block count exceeds a parameter ref_rate. Ref_rate is a refresh rate for session keys. In the embodiments of encryption algorithm A, it is determined if (ctr+len+2) are greater than or equal to the ref_rate. In this equation, len is the number of blocks to be encrypted and the number 2 is related to the computing of the nonce in process block 1110 and of a last block of ciphertext in process block 1124, discussed below.

If the block count does not exceed the ref_rate, the control moves to operation 1110, discussed below.

If the block count does exceed the ref_rate, then control moves to operation 1108 of refreshing the session key K. In some embodiments, this is performed by executing a key exchange protocol that includes at least:
  a. Chiplet-1 (sender) executes the Sender's Key Generation Function (method 900). This function, is described above relative to FIG. 9. As noted above, the input is the security parameter λ and the outputs are a session key K, and an encryption key (LUT, KST, ctr).
  b. Chiplet-1 sends the session key K to chiplet-2. In some embodiments, this step includes at least:
    i. A public key of chiplet-2 is used to encrypt session key K.
    ii. The encrypted session key KEnc is transmitted to Chiplet 2.
  c. Chiplet-2 (receiver) uses its private key to decrypt the encrypted session key KEnc and thereby obtain the session key K.
  d. Chiplet-2 executes the Receiver's Key Generation Function (method 1000). This function is described above relative to FIG. 10. As noted above, the inputs are the session key K and the security parameter λ. The output is the decryption key (LUT, KST, ctr).

It is important to regularly execute the key exchange protocol because XOR operations produce identical output for a large set of input values. For example: 0⊕3=3, 1⊕2=3, 4⊕7=3, 5⊕6=3 and so on. This is called collision. The probability of collision increases with an increase in the number of input sets. For an XOR with b-bit inputs, after $2^{b/2}$ input sets, the probability of collision becomes significant. To avoid collision, the LUT and KST must be modified. Therefore, after a specified number of encryptions of message blocks, as defined by the parameter ref_rate, the session key is refreshed by invoking the key exchange protocol. The value of ref_rate, in some embodiments, is less than $2^{b/2}$. In some further embodiments, ref_rate is $2^{(b/2-1)}$.

Control moves to operation 1110 which initializes a nonce N. In some embodiments, the value b, set with security parameter λ, determines the length of nonce N. Generally, a longer length of nonce N is associated with increased security relative to a shorter length of Nonce N. Consistent with some embodiments, in encryption Algorithm A, the initialization of nonce N may be performed by setting Nonce N equal to KST[ctr], where ctr is a counter initialized in operation 912. As discussed relative to operation 912, in some embodiments, ctr is initialized as zero. In those embodiments, Nonce N is initialized to KST[0], that is, the first target value in the first row of the KST.

Nonce N has a high degree of randomness because it is initialized as KST[0] and the KST is, in some embodiments, created using a random number r1 computed with TRNG. In those embodiments, r1 is a true random number. Nonce N therefore has a high degree of randomness. This high degree of randomness of nonce N helps prevent nonce forgery and nonce-reuse attacks.

Control moves to operation 1112 which computes a tag T on N∥A∥M, where N is nonce N, A is associated data, and M is a message to be encrypted. In some embodiments, T is a CRC. In those embodiments, we have T=CRC(N∥A∥M). After the tag T is computed, it is concatenated with the message M to be encrypted, that is M∥T.

Control moves to operation 1114 which parses M∥T into message blocks, such as M[1], M[2], M[3], . . . , M[len], where len is the total number of blocks. The size of the blocks in bits is governed by the value b, discussed above.

Control moves to operation 1116 which initializes a counter variable i to 1. In some embodiments, a temp variable is initialized to the value of nonce N.

A loop is executed that includes the following operations:
  a. Operation 1118 determines if the variable i is less than or equal to len, the number of message blocks to be encrypted. If i is greater than len, then the loop is exited and control moves to operation 1124 below.
  b. Operation 1120 computes the ciphertext for M[i], which is C[i]. Referencing encryption algorithm A, in some specific embodiments, computing C[i] includes at least:
    i. Parse t1∥t2∥ . . . ∥tm:=temp, where, in some embodiments, m is the number of b-bit blocks in temp and computed as "m=w/b". That is, temp is parsed into w/b blocks of length b bits each. It will be recalled that temp was initialized to the value of Nonce N, above, which is w bits in length. This value of temp is for the first time through the loop. As indicated below, for subsequent loops, temp is set to the value of C[i], thereby keeping some continuity between blocks of the ciphertext.
    ii. Compute val:=t1⊕t2 ⊕ . . . ⊕ tm, where ⊕ is the symbol for a bitwise XOR operation. This equation XOR's the w/b blocks of b bits of temp together and stores the result in the variable val.
    iii. Compute C[i]:=temp:=LUT[M[i]⊕val]⊕KST[ctr+ i]. Here, in this step, C[i] and temp are both set equal to the result of the mathematical expression on the right. Turning to the mathematical expression, in a left subexpression M[i] and val are XOR'd and the result is the key used in the first column of the LUT to obtain its corresponding target value in the second column of the LUT. This target value may be referred to as a first target value. In a right subexpression, the value of the counter ctr is added to the variable i, and the result is the key used in the first column of the KST to obtain its corresponding target value in the second column of the KST. This target value may be referred to as the second target value. Then, the right expression XOR's first and the second target values to obtain both the ciphertext C[i] and the new value for temp.

c. Operation 1122 updates i incrementing by one. Control then returns to operation 1118 and the loop then repeats until in operation 1118, i is greater than len. When i is greater than len, the loop terminates and control moves to operation 1124.

Operation 1124 computes the value for the last block of ciphertext C[len]. Referencing encryption algorithm A, in some specific embodiments, computing C[len] includes at least computing C[len]:=C[len]⊕KST[ctr+len+1]. Turning to this equation and moving from the left, the last ciphertext block C[len] is equal to a mathematical expression on the right. Moving to the mathematical expression, the left subexpression C[len] is the ciphertext for the last block computed as explained regarding operation 1120. The right subexpression includes looking up a target value in KST wherein the key is (ctr+len+1), that is the sum of current value of the counter ctr, the value len, and the number 1. The resulting KST target value is XOR'd with the C[len] to arrive at the final value for C[len]. This operation prevents the length-extension attacks on the cryptosystem.

Control moves to operation 1126 which updates the counter ctr. Referencing encryption algorithm A, in some specific embodiments, updating ctr includes ctr:=ctr+len+2. This updates ctr by adding the number of message blocks encrypted, len. And by adding the number two, which accounts for the additional processing of the nonce in operation 1110 and the last block in operation 1124, we ensure that no random number block is repeated.

In further explanation for the updating of ctr by let+2, it is noted that the first block KST[ctr] is consumed in assigning a fresh new random number for Nonce, operation 1110. The next len blocks—KST[ctr+1] to KST[ctr+len]—are consumed in the encryption of message blocks, operation 1120. The last block KST[ctr+len+1] is consumed in the extra encryption of the Last ciphertext block C[len]. So, to avoid repetition of the value, ctr is updated by len+2.

Control moves to operation 1128 which calculates the ciphertext by concatenating the ciphertext blocks C[1], C[2], . . . C[len].

Control then moves to operation 1130 which outputs C and ctr as the outputs of the Encryption Circuit, method 1100. Control then moves to Stop operation 1132.

The above method 1100 is subject to a variety of implementations. For example, in some implementations it is desired to disable one of more of authentication or encryption. In the below encryption algorithm B, FlagA enables or disables authentication and FlagE enables or disables encryption. Encryption algorithm B is as follows:

Encryption Algorithm B

| Enc((LUT, KST, ctr), A, M) |
| --- |
| 1. If (ctr + len + 2 ≥ ref_rate) ✗. |
|   a. Refresh Session Key (Execute Key Exchange Protocol.) |
| 2. Compute nonce as N := KST[ctr] †. |
| 3. If (Flag$_A$ == 1) |
|   a. Compute CRC on message M as T := CRC(N ‖ A ‖ M). |
| 4. Else, Initialize T := ε. |
| 5. If (Flag$_E$ == 1) |
|   a. Parse M[1] ‖ M[2] ‖ ... ‖ M[len] := M ‖ T. |

-continued

| Enc((LUT, KST, ctr), A, M) |
| --- |
| 6. Else, Parse M[1] ‖ M[2] ‖ ⋯ ‖ M[len] := T. |
| 7. Initialize the temporary variable, temp := N ‡. |
| 8. For i := 1,2, ... , len |
|   a. Parse t$_1$ ‖ t$_2$ ‖ ... ‖ t$_m$ := temp. |
|   b. Compute val := t$_1$ ⊕ t$_2$ ⊕ ... t$_m$ ♠. |
|   c. Compute C[i] := temp := LUT[M[i] ⊕ val] ⊕ KST[ctr + i] ✿. |
| 9. Compute C[len] := C[len] ⊕ KST[ctr + len + 1]. |
| 10. Update counter ctr := ctr + len + 2. |
| 11. If (Flag$_E$ == 1) |
|   a. Compute ciphertext C := C[1] ‖ C[2] ‖ ⋯ ‖ C[len]. |
| 12. Else, Compute ciphertext C := M ‖ C[1] ‖ C [2] ‖ ⋯ ‖ C[len]. |
| 13. Return C and ctr. |
| ✗ : If counter is initialized as ctr := KST[0] mod 2$^b$, then, depending on the implementation, the condition will be: |
|   a. (blk_ctr + len + 2 ≥ ref_rate), or |
|   b. (ctr + len + 2 − KST[0] ≥ ref_rate). |
| † : Nonce can also be randomized as: |
|   a. Compute b := N & 0x01.    (For the first value, N := KST[0]) |
|   b. Compute idx := idx + 1.    (For the first value, idx := 0) |
|   c. Compute N := PRNG$_{1−b}$(r$_b$ ‖ idx). |
| ‡: Variable temp can also be computed as temp := LUT[N]. |
| ♠: For some Integer s, variable val can also be computed as: |
|     val := t$_1$ ⊕ (t$_2$ ≪ s) ⊕ ... ⊕ (t$_m$ ≪ s(m − 1)) |
| ✿: C[i] can also be computed as: |
|   a. Compute temp := LUT[M[i] ⊕ val]. |
|   b. Compute C[i] := temp ⊕ KST[ctr + i]. |

Figure 12:
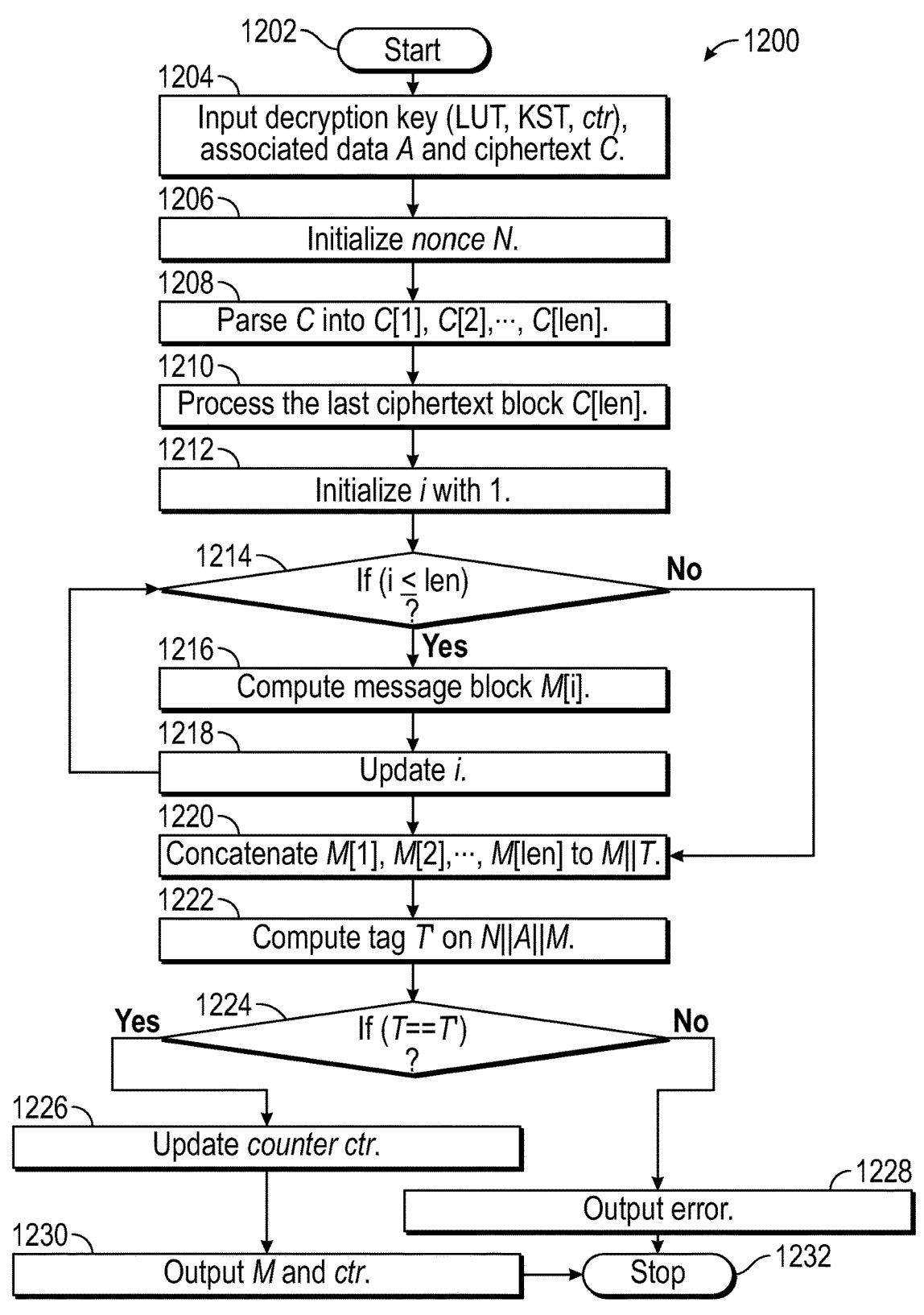
FIG. 12 is a flow chart illustrating an exemplary method of decryption, consistent with some embodiments.

Referencing FIG. 12, decryption method 1200 decrypts ciphertext C created with method 1100. Method 1200 includes as inputs the decryption key (LUT, KST, ctr), associated data A, and the ciphertext C output by method 1100. The outputs are the decrypted message M and an updated counter ctr. In discussing method 1200, it is assumed that methods 900 and 1100 have been performed at a first chiplet, chiplet-1, that method 1000 has been performed at a second chiplet, chiplet-2, and that chiplet-1 has transmitted ciphertext C to chiplet-2. Decryption method 1200 is performed at chiplet-2.

The discussion of FIG. 12 references decryption algorithm C. Decryption algorithm C embodies specific embodiments within the scope of method 1200 of FIG. 12. Those with skill in the art, once appraised of the principles discussed herein, will be aware of more alternatives to those stated below.

Decryption Algorithm C

| Dec((LUT, KST, ctr), A, C) |
| --- |
| 1. Compute nonce as N := KST[ctr] †. |
| 2. Parse C[1] ‖ C[2] ‖ ⋯ ‖ C[len] := C. |
| 3. Compute C[len] := C[len] ⊕ KST[ctr + len + 1]. |
| 4. Initialize the temporary variable, temp := N ‡. |
| 5. For i := 1,2, ... , len |
|   a. Parse t$_1$ ‖ t$_2$ ‖ ⋯ ‖ t$_m$ := temp. |
|   b. Compute val := t$_1$ ⊕ t$_2$ ⊕ . . . ⊕ t$_m$ ♠ |
|   c. Compute temp := C[i] ✿. |
|   d. Compute M[i] := LUT$^{−1}$[C[i] ⊕ KST[ctr + i]] ⊕ val✿. |
| 6. Compute message M ‖ T := M [1] ‖ M [2] ‖ ⋯ ‖ M[len]. |
| 7. Compute CRC on message M as T' := CRC(N ‖ A ‖ M). |
| 8. If (T == T') |
|   a. Update counter ctr := ctr + len + 2. |
|   b. Return M and ctr. |
| 9. Else |
|   a. Return Error. |
| † : Nonce can also be randomized as: |
|   a. Compute b := N & 0x01.    (For the first value, N := KST[0]) |
|   b. Compute idx := idx + 1.    (For the first value, idx := 0) |
|   c. Compute N := PRNG$_{1−b}$(r$_b$ ‖ idx). |

-continued

---

Dec((LUT, KST, ctr), A, C)

---

‡ : Variable temp can also be computed as temp := LUT[N].
♠ For some Integer s, variable val can also be computed as:
      val := $t_1 \oplus (t_2 \ll s) \oplus ... \oplus (t_m \ll s(m-1))$
✠ : M[i] can also be computed as:
  a. Compute temp := $C[i] \oplus KST[ctr + i]$.
  b. Compute M[i] := $LUT^{-1}[temp] \oplus val$.

---

Again referencing method 1200, after a start operation 1202, control moves to operation 1204 which receives as input the decryption key (LUT, a KST, ctr), associated data A, and the ciphertext C to be decrypted.

Control moves to 1206 which initializes nonce N. This operation 1206 is unchanged from operation 1110 of method 1100. Reference is made to the discussion of operation 1110.

Control moves to operation 1208 which parses C into ciphertext blocks C[1], C[2], . . . , C[len], where len is the total number of ciphertext blocks. The parameter w, discussed above, governs the size of the ciphertext blocks.

Control moves to operation 1210 which processes the last ciphertext block C[len]. In some specific embodiments decryption Algorithm C uses the following equation $C[len]:=C[len] \oplus KST[ctr+len+1]$. The same XOR operation with the same operands was performed in operation 1124 of method 1100. Performing an XOR operation twice results in the original values as they existed before the first XOR. Thus, operation 1210 of method 1200 reverses the processing of operation 1124. The result is that C[len] is the last ciphertext block as it existed prior to the processing of operation 1124.

Control moves to operation 1212 which initializes a counter variable i to 1. In some embodiments, operation 1212 also initializes a "temp" variable to the value of nonce N.

A loop is executed that includes the following operations:
  a. Operation 1214 determines if the variable i is less than or equal to the parameter len, the number of ciphertext blocks to be decrypted. If i is greater than len, then the loop is exited and control moves to operation 1220 below.
  b. Operation 1216 computes message block M[i] by decrypting ciphertext C[i]. Referencing decryption algorithm C, in some specific embodiments, computing M[i] includes at least:
    i. Parse t1∥t2∥ . . . ∥tm:=temp, where, in some embodiments, m is the number of b-bit blocks in temp and computed as "m=w/b". Temp is parsed into w/b blocks of length b bits each. Operation 1212 initialized temp to the value of Nonce N, which is w bits in length, for the first time through the loop. For subsequent loops, step iii (below) sets temp is set to the value of C[i].
    ii. Compute val:=t1⊕t2⊕ . . . ⊕tm. That is, the b-bit w/b blocks of temp are XOR'd together and the result is stored in the variable val.
    iii. Assign Temp:=C[i]. Temp is set to equal C[i] for second and subsequent iterations of the loop.
    iv. Compute M[i]:=$LUT^{-1}[C[i] \oplus KST[ctr+i]] \oplus val$. This equation sets M[i] as equal to the result of the mathematical expression on the right. Turning to the mathematical expression, in a left subexpression, $LUT^{-1}[C[i] \oplus KST[ctr+i]]$, the $LUT^{-1}$ refers to an inverse LUT (i.e. $LUT^{-1}$) as described relative to FIG. 7. As discussed above, for $LUT^{-1}$ the message blocks in the first column are the target values and the corresponding blocks of random or pseudo-random bits are the keys. That is the reverse of normal LUT operation. Thus key for the $LUT^{-1}$ is $[C[i] \oplus KST[ctr+i]]$. That key is simplified by XOR'ing C[i] with the target value obtained by using ctr+i as the key to the KST, ctr+i being the current value of the counter ctr plus the value of counter variable i. The value obtained via the left subexpression is then XOR'd with val.
  c. Operation 1218 updates i by incrementing i by one. Control then returns to operation 1214 and the loop then repeats until in operation 1214, i is greater than len. When i is greater than len, the loop terminates and control moves to operation 1220.

Once the loop terminates, control moves to operation 1220, which concatenates M[1], M[2] . . . M[len] to obtain M∥T, which was originally computed in operation 1112 of method 1100.

Control moves to operation 1222 which computes a tag T'. In embodiments in which T' is a CRC, operation 1222 computes CRC(N∥A∥M).

Control moves to operation 1224 which determines if T==T'. That is, operation 1224 determines if the tag T that was originally computed in operation 1112 of method 1100 and is received after decryption of ciphertext C in operation 1220, is equal to tag T' computed in operation 1222.

If no, control moves to operation 1228 which outputs an a error. Control then moves to stop operation 1232.

If yes, then control moves to operation 1226 which updates the counter ctr. Referencing decryption algorithm C, in some embodiments, the counter is updated by setting ctr:=ctr+len+2. Thus, the value of ctr at chiplet-2 after method 1200 is the same as the value ctr at chiplet-1 after method 1100. Control then moves to operation 1230 which outputs the message M and updated counter ctr as the output of method 1200. Control then moves to stop operation 1232.

The above method 1200 is an exemplary embodiment. Various implementations are possible. For example, in another implementation, flags are provided to enable/disable authentication and to enable/disable encryption. This implementation is set forth as decryption algorithm D. In this algorithm, FlagA enables/disables authentication and FlagE enables/disables encryption.

Decryption Algorithm D

---

Dec((LUT, KST, ctr), A, C)

---

1. Compute nonce as N := KST[ctr] †.
2. If ($Flag_E$ == 1)
  a. Parse C[1] ∥ C[2] ∥ ⋯ ∥ C[len] := C.
3. Else,  If ($Flag_A$ == 1)
    i. Parse M ∥ C[1] ∥ C[2] ∥ ⋯ ∥ C[len] := C.
4. Compute C[len] := $C[len] \oplus KST[ctr + len + 1]$.
5. Initialize the temporary variable, temp := N ‡.
6. For i := 1,2, ..., len
  a. Parse $t_1 \parallel t_2 \parallel ... \parallel t_m$ := temp.
  b. Compute val := $t_1 \oplus t_2 \oplus ... \oplus t_m$ ♠
  c. Compute temp := C[i] ✠.
  d. Compute M[i] := $LUT^{-1}[C[i] \oplus KST[ctr + i]] \oplus val$ ✠.
7. If ($Flag_A$ == 1)
  a. If ($Flag_E$ == 1)
    i. Compute message M ∥ T := M[1] ∥ M[2] ∥ ⋯ ∥ M[len].
  b. Else, Compute T := M[1] ∥ M[2] ∥ ⋯ ∥ M[len].
  c. Compute CRC on message M as T' := CRC(N ∥ A ∥ M).
  d. If (T == T')
    i. Update counter ctr := ctr + len + 2.
    ii. Return M and ctr.
  e. Else, Return Error.

-continued

| Dec((LUT, KST, ctr), A, C) |
|---|

8. Else
  a. If (Flag$_E$ == 1)
    i. Compute message M := M[1] ‖ M[2] ‖ ⋯ ‖ M[len].
  b. Update counter ctr := ctr + len + 2.
  c. Return M and ctr.
† : Nonce can also be randomized as:
  d. Compute b := N & 0x01.    (For the first value, N := KST[0])
  e. Compute idx := idx + 1.    (For the first value, idx := 0)
  f. Compute N := PRNG$_{1-b}$(r$_b$ ‖ idx).
‡ : Variable temp can also be computed as temp := LUT[N].
♠ For some Integer s, variable val can also be computed as:
    val := t$_1$ ⊕ (t$_2$ ≪ s) ⊕ ... ⊕ (t$_m$ ≪ s(m − 1))
✿: M[i] can also be computed as:
  c. Compute temp := C[i] ⊕ KST[ctr + i].
  d. Compute M [i] := LUT$^{-1}$[temp] ⊕ val.

Various example modes of communication between a chiplet-1 (e.g. a first chiplet) and a chiplet-2 (e.g. a second chiplet) are now discussed with reference to exemplary sequences. A sequence of communication between chiplet-1 and chiplet-2 may include multiple messages. Usually, communications are bi-directional. If both of the chiplets may send data only sequentially, one-after-the-other, then the communication is half-duplex. If both of the chiplets may send data concurrently, then the communication is full-duplex.

For simplicity, in some exemplary sequences described below only one chiplet (for example chiplet-1) is sending messages to the other chiplet (for example chiplet-2). However, this feature is not intended to be limiting. Those skilled in the art will recognize that the exemplary sequences described can be extended to bi-directional communication without undue experimentation.

In the example communication sequences described below, the messages $M_1$, $M_2$, . . . $M_i$ (of lengths $n_1$, $n_2$, . . . $n_1$) are encrypted and sent by chiplet-1 to chiplet-2 in sequence. The counter variable ctr is synchronized with the following procedures:

a. The variable ctr is initialized to identical value in both chiplet-1 and chiplet-2.

b. The ctr is updated on the sender side (chiplet-1) just after encryption of a message.

c. The ctr is updated on the receiver side (chiplet-2) only after successful decryption and verification of received ciphertext. (The ciphertext is resent if verification fails).

Each of the example communication sequences shown below begins with chiplet-1 and chiplet-2 authenticating themselves to each other. There are a variety of techniques for chiplets authenticating themselves to one another. Some authentication techniques use the existing Public Key Infrastructure (PKI) with the Digital Signature Algorithm (DSA), others deploy a blockchain-based mechanism. A discussion on chiplet authentication techniques is beyond the scope of this document.

Figure 13:
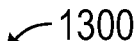
FIG. 13 is a sequence diagram showing an exemplary sequence of transmissions between two chiplets, consistent with some embodiments.

Referencing FIG. 13, communication sequence 1300 begins with chiplet authentication 1302 between chiplet-1 1312 and chiplet-2 1314. A key exchange 1304 is then performed between chiplet-1 and chiplet-2. In some embodiments, the key exchange 1304 is performed by executing a Key Exchange Protocol consistent with methods 900 and 1000 of FIGS. 9 and 10, respectively.

The communication sequence 1300 proceeds to step 1 with chiplet-1 encrypting $M_1$ by computing ciphertext $C_1$. In some embodiments, chiplet-1 performs the encryption by executing an encryption function such as method 1100.

In step 2, chiplet-1 transmits the ciphertext $C_1$ via transmission 1306 to chiplet-2. In step 3, chiplet-2 decrypts ciphertext $C_1$ and computes plaintext $M_1$. In some embodiments, chiplet-2 performs the decryption by executing a decryption function such as method 1200.

The communication sequence 1300 continues with chiplet-1, in step 4, encrypting a second message $M_2$ by computing ciphertext $C_2$. In step 5, chiplet-1 transmits ciphertext $C_2$ to chiplet-2 via transmission 1308. In step 6, chiplet-2 decrypts ciphertext $C_2$ and computes message $M_2$.

In step 7, chiplet-1 encrypts message $M_i$ by computing ciphertext $C_i$. In step 8 chiplet-1 transmits ciphertext $C_i$ to chiplet-2 via transmission 1310. In step 9, chiplet-2 decrypts $C_i$ to compute $M_i$.

The discussion below proceeds to discuss a chiplet and a communication sequence for unoptimized basic half-duplex mode of communication. Basic half-duplex mode of communication is a known mode of communication that is incorporated into embodiments herein, as discussed below.

In basic half-duplex mode of communication only one chiplet at a time (e.g. chiplet-1) may transmit data. The other chiplet (e.g. chiplet-2) must wait to transmit until the data transmitted from chiplet-1 is all received and decrypted successfully. The value of a counter ctr is the same for each chiplet and is the same for both transmitting and receiving. There are four types of control signals which allow smooth transmission of data in the transmission channel or bus:

a. The SND signal: A chiplet sends the SND signal when the chiplet seeks to send data. When a chiplet receives the SND signal, it stops all its transmission-related activities and begins to wait for the data from the other chiplet. At the receiver's side, the waiting period is predefined. If the receiver does not receive any data within the predefined period, the SND signal is dropped. If the SND signal is dropped, the sender then needs to re-send the SND signal before starting to send data.

b. The ACK signal: A chiplet sends ACK when the chiplet has successfully decrypted, and verified the transmitted data. When a chiplet receives an ACK signal, it is confirmation that its previously sent data has been decrypted and verified successfully. If a chiplet has not received an ACK signal within a predefined period of time and if the SND signal has not expired, the chiplet resends the data. If a chiplet has not received an ACK signal within the predefined period of time and if the SND signal has expired, then the chiplet will resend the SND signal and then resend the data.

c. The NACK signal: A chiplet sends the NACK signal when the chiplet has received the data but has not successfully decrypted and verified the data. When a chiplet receives the NACK signal, it resends the data. The NACK signal is evidence of error at a higher-layer of a network stack or of an attack by an adversary. If the number of NACK signals exceeds a threshold, a session may be terminated and a new session be established.

d. The SND-ACK signal: This signal is a combination of the SND and ACK signals. A chiplet sends the SND-ACK signal when the chiplet has successfully decrypted and verified data and then seeks to send data. When a chiplet receives an SND-ACK signal, it is confirmed that its previously sent data has been successfully decrypted and verified and that the chiplet must wait for the other chiplet to send data. The SND-ACK signal provides a fair opportunity for a receiving chiplet to send data. It also ensures that one chiplet does not hold or occupy a communication channel for too long.

Figure 14:
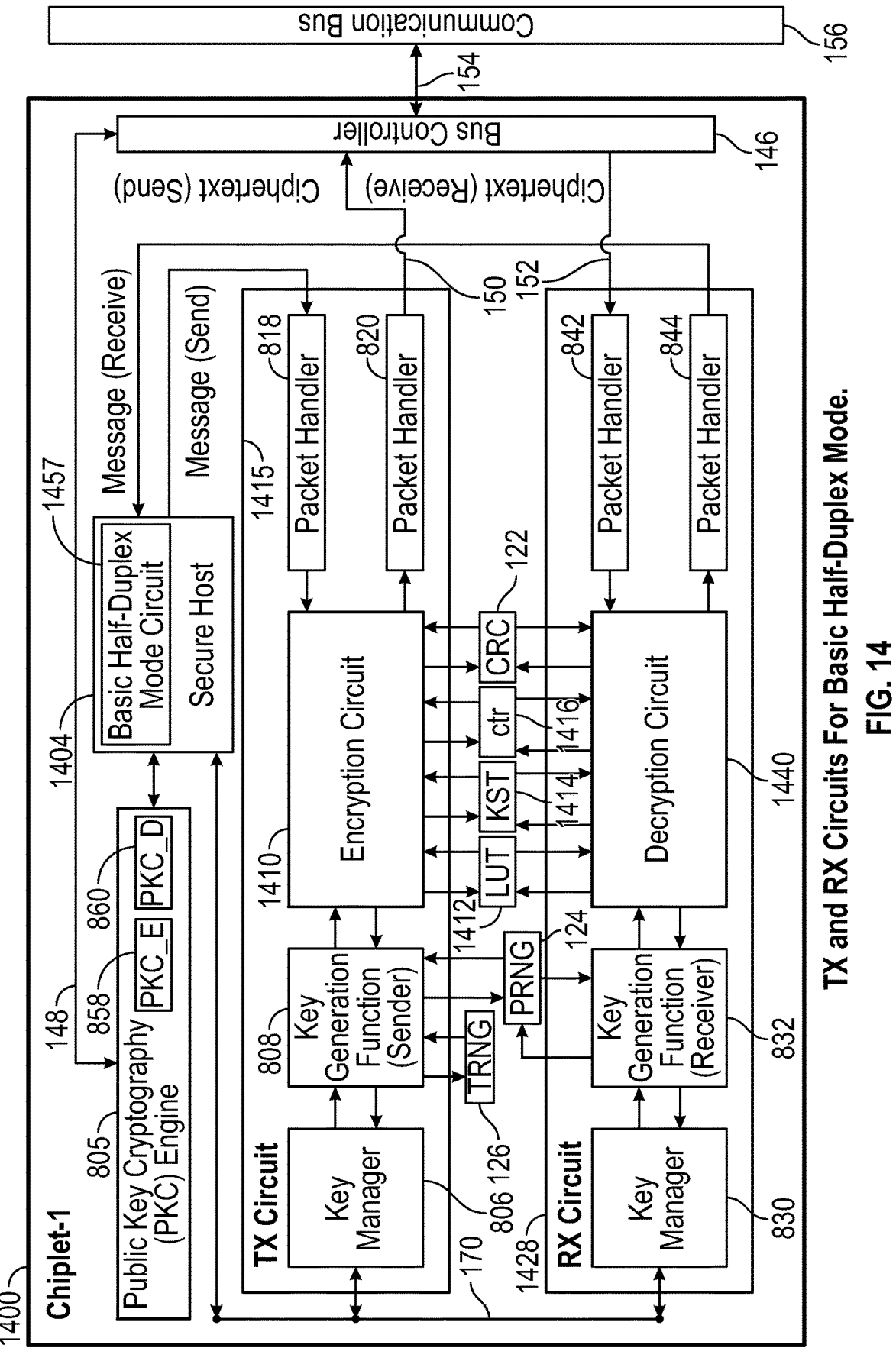
FIG. 14 is a simplified block diagram of a chiplet configured for basic half-duplex mode of communication, consistent with some embodiments.

Referencing FIG. 14, a chiplet 1400 is configured for encryption and decryption, for example via methods 1100 and 1200, and for basic (e.g. unoptimized) half-duplex mode of communication. Except where discussed below, chiplet 1400 is at least similar to chiplet 800. Elements present in chiplet 800 that are not changed in chiplet 1400 are not further discussed. Instead, for these unchanged elements, this document relies on the discussion relative to chiplet 800. The same applies below regarding drawings of additional chiplets (i.e. chiplets 1600, 1800, 2000, 2100, 2200). For each of these additional chiplets, only new elements or changed elements are discussed. And reliance is placed on previous discussions regarding unchanged elements of chiplets.

Chiplet 1400 includes a secure host 1404 that includes a basic half-duplex mode circuit 1457 that configures local host 1404 for issuing instructions, commands, and data for causing chiplet 1400 to communicate via basic half-duplex mode of communication. In some embodiments. basic half-duplex mode circuit 1457 is a memory bearing executable instructions for causing chiplet 1400 to communicate via basic half-duplex mode. In some other embodiments, basic half-duplex mode circuit 1457 is hard-wired logic. And in yet some other embodiments, basic half-duplex mode circuit 1457 includes both a memory with executable instructions and hard-wired logic.

The chiplet 1400 includes a TX circuit 1415 (a transmission circuit). TX circuit 1415 includes Encryption Circuit 1410. In contrast to the chiplet 800 of FIG. 8, Encryption Circuit 1410 does not include, but is instead communicably linked with an LUT 1412, a KST 1414, a counter in the form of ctr 1416, and a CRC 122 (a CRC generator). Access to the foregoing elements is shared between Encryption Circuit 1410 and Decryption Circuit 1440 (discussed below).

Chiplet 1400 includes an RX circuit 1428 (a receiving circuit). RX circuit 1428 includes a Decryption Circuit 1440. In contrast to Decryption Circuit 840 of FIG. 8, Decryption Circuit 1440 does not include, but is instead communicably linked with the LUT 1412, the KST 1414, the counter ctr 1416, and the CRC 122. The foregoing elements are shared between Decryption Circuit 1440 and Encryption Circuit 1410. A shared LUT, KST and ctr offers the advantage of saving a huge memory space, which otherwise would be double, as shown in FIG. 8. The shared memory could be, for example, one or more SRAM's (not shown).

Figure 15:
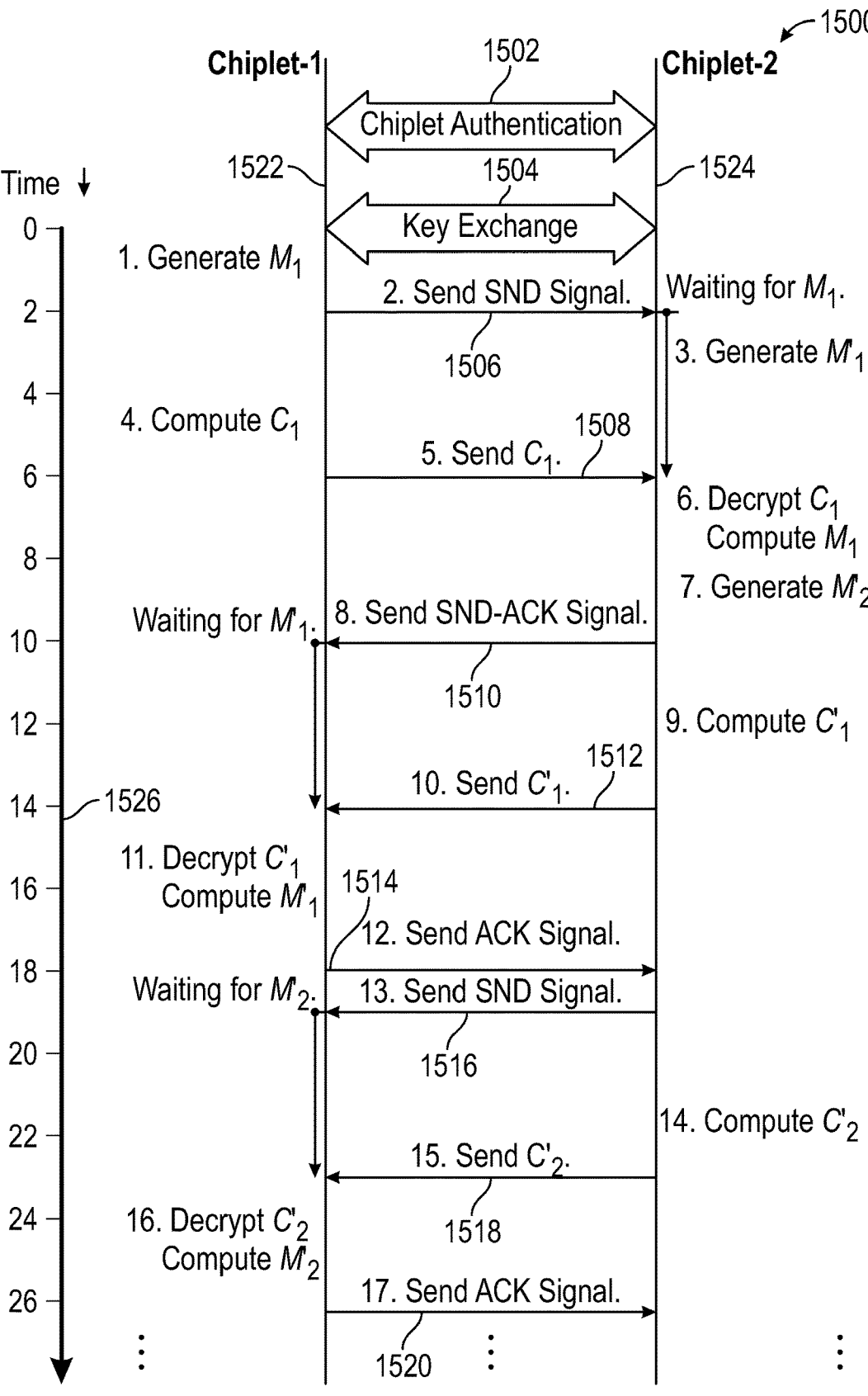
FIG. 15 is a sequence diagram showing an exemplary sequence of transmissions between two chiplets, consistent with some embodiments, showing a basic half-duplex mode of communication.

Referencing FIG. 15, a communication sequence 1500 illustrates an example of basic half-duplex mode of communication. Time proceeds as shown by timeline 1526. Sequence 1500 begins with chiplet authentication 1502 between chiplet-1 (1522) and chiplet-2 (1524). After chiplet authentication, chiplet-1 and chiplet-2 perform a key exchange 1504.

At step 1, chiplet-1 generates a message $M_1$ and checks whether chiplet-2 has sent an SND signal. After determining that chiplet-2 has not sent an SND signal, at step 2, chiplet-1 sends an SND signal to chiplet-2 via transmission 1506.

At step 3, chiplet-2 is waiting for $M_1$ and also generates a message $M'_1$.

At step 4, chiplet-1 completes the encryption of $M_1$ by computing ciphertext $C_1$. In some embodiments, chiplet-1 performs the encryption by executing an encryption function such as method 1100 of FIG. 11. In step 5, chiplet-1 transmits $C_1$ to chiplet-2 via transmission 1508.

In step 6, chiplet-2 decrypts $C_1$ and thereby generates $M_1$. In some embodiments, chiplet-2 performs the decryption by executing a decryption function such as method 1200 of FIG. 12.

In step 7, chiplet-2 generates a message $M'_2$. And in step 8, chiplet-2 sends an SND-ACK signal to chiplet-1 via transmission 1510. This signal confirms decryption and verification of $M_1$ and places chiplet-1 in a waiting mode. Chiplet-1 is waiting for $M'_1$.

In step 9, chiplet-2 completes the encryption of $M'_1$ by computing ciphertext $C'_1$ and in step 10 sends $C'_1$ to chiplet-1 via transmission 1512.

At step 11, chiplet-1 decrypts $C'_1$ and thereby computes $M'_1$. At step 12, Chiplet-1 sends an ACK signal to chiplet-2 via transmission 1514. This signal confirms decryption and verification of $M'_1$ and also signals to chiplet-2 that chiplet-1 does not have a message to send.

At step 13, chiplet-2 sends an SND signal to chiplet-1 via transmission 1516. Chiplet-1 begins waiting for $M'_2$. At step 14, chiplet-2 encrypts $M'_2$ by computing the ciphertext $C'_2$. In step 15, chiplet-2 sends $C'_2$ to chiplet-1 via transmission 1518.

In step 16, chiplet-1 decrypts $C'_2$ to compute $M'_2$. At step 17, chiplet-1, having successfully decrypted and verified $M'_2$ sends an ACK signal via transmission 1520. The ACK signal confirms successful decryption and verification of $M'_2$ and also signals that chiplet-1 does not have a message to send.

Advantages of the basic half-duplex mode of communication are the need to store only one counter and the simplicity of Chiplet 1400 of FIG. 14. Disadvantages include low channel utilization and secure time-stamping of the control signals is required to resolve conflicts.

The discussion below proceeds to discuss a chiplet and a communication sequence for unoptimized full-duplex mode of communication. Full-duplex mode of communication is a known mode of communication that is incorporated into embodiments herein, as discussed below.

In full-duplex mode of communication both chiplets can send data simultaneously. The encryption/decryption process and the transmission of data are not dependent on another chiplet. A chiplet has two counters, ctr and ctr': one for sending messages and one for receiving messages. The session key K is the same for both sending and receiving.

Figure 16:
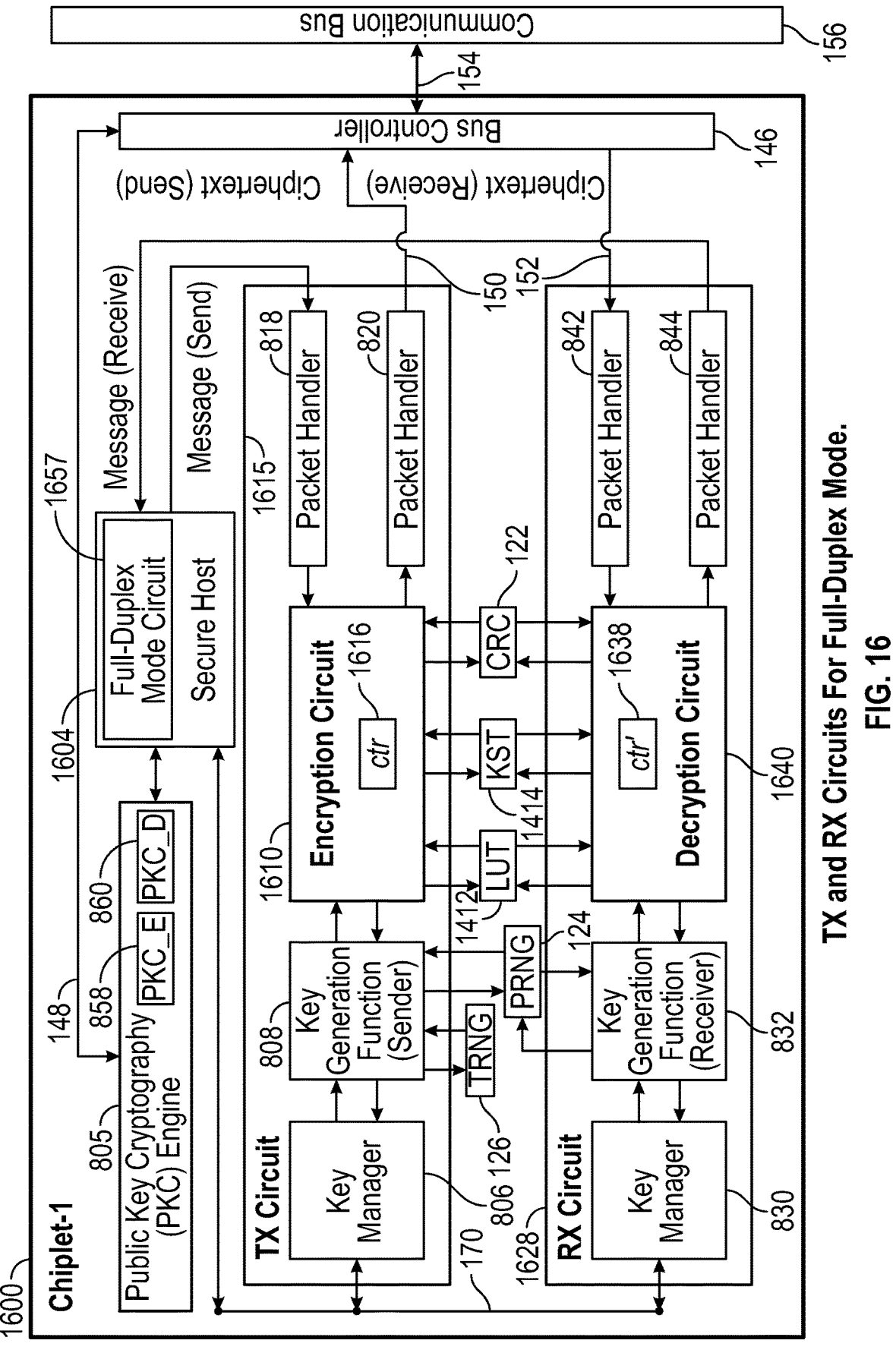
FIG. 16 is a simplified block diagram of a chiplet configured for full-duplex mode of communication, consistent with some embodiments.

Referencing FIG. 16, a chiplet 1600 is configured for encryption and decryption, for example via methods 1100 and 1200, and for full-duplex mode of communication. Unlike chiplet 1400 of FIG. 14, this chiplet 1600 has a counter ctr 1616 for transmission and another counter ctr' 1638 for receiving.

Chiplet 1600 includes a secure host 1604 that includes a full-duplex mode circuit 1657 that configures local host 1604 for issuing instructions, commands, and data for causing chiplet 1600 to communicate via full-duplex mode of communication. In some embodiments, full-duplex mode circuit 1657 is a memory bearing executable instructions for causing chiplet 1600 to communicate via full-duplex mode. In some other embodiments, full-duplex mode circuit 1657 is hard-wired logic. And in yet some other embodiments, full-duplex mode circuit 1657 includes both a memory with executable instructions and hard-wired logic.

The chiplet 1600 includes a TX circuit 1615 (a transmission circuit). TX circuit 1615 includes encryption circuit 1610 which includes a counter ctr 1616 dedicated to the TX circuit 1615. That is, ctr 1616 is not shared with RX circuit 1628 (below).

Chiplet 1600 includes an RX circuit 1628 (a receiving circuit). RX circuit 1628 includes decryption circuit 1640 which includes a counter ctr' 1638 dedicated to the RX circuit 1628. That is, ctr' 1638 is not shared with TX circuit 1615. The separate counters ctr 1616 and ctr' 1638 at least partially configure chiplet 1600 for full-duplex mode.

Figure 17:
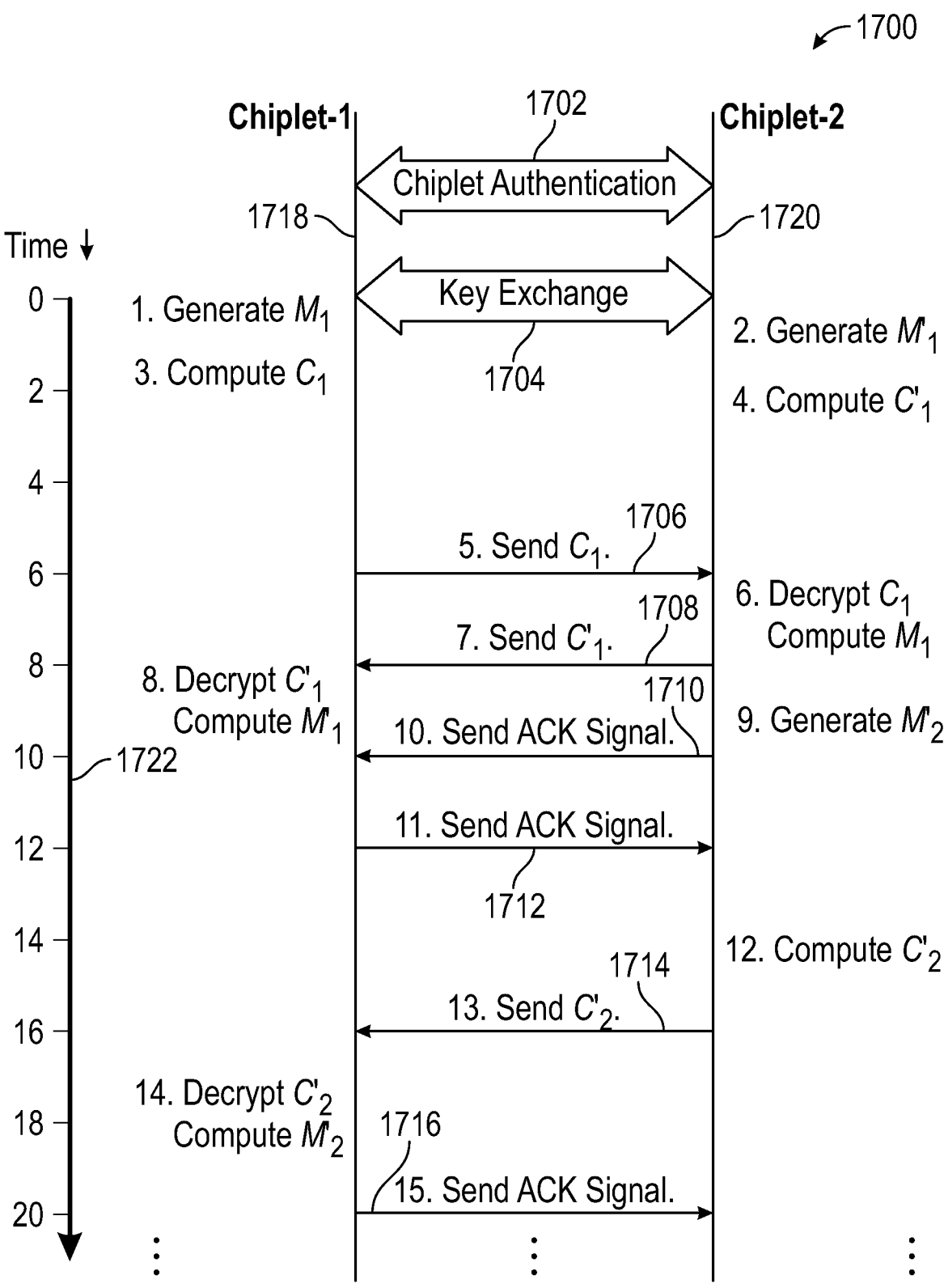
FIG. 17 is a sequence diagram showing an exemplary sequence of transmissions between two chiplets, consistent with some embodiments, showing a full-duplex mode of communication.

Referencing FIG. 17, a communication sequence 1700 illustrates full-duplex mode of communication between chiplet-1 (1718) and chiplet-2 (1720). In some embodiments, chiplet-1 is chiplet 1600 above and stores: a) A session key K that equals r0‖r1, b) an LUT generated with random number r0, c) a counter ctr for sending data, and d) a counter ctr' for receiving data. Although FIG. 16 shows KST 1414 shared by encryption circuit 1610 and decryption circuit 1640, this is optional. A KST need not be stored because values from a KST can be computed on the fly.

In those embodiments, chiplet-2 stores a) the same session key K that equals r0‖r1, b) the same LUT generated with random number r0, c) the counter ctr but for receiving data, and d) the counter ctr' but for sending data. Thus, in chiplet-2 the role of the counters is reversed compared to their role in chiplet-1. A KST need not be stored because values from a KST can be computed on the fly.

The number of control signals for full-duplex mode is simplified and includes two control signals:

a. The ACK signal: A chiplet sends the ACK signal to indicate that it has successfully decrypted and verified the transmitted data. When a chiplet receives the ACK signal, it is confirmed that its previously sent data has been decrypted and verified successfully. If a chiplet does not receive an ACK signal within a predefined period of time after sending data, the data is resent.

b. The NACK signal: A chiplet sends the NACK signal when the chiplet has received the data but has not successfully decrypted and verified the data. When a chiplet receives the NACK signal, it resends the data. The NACK signal is evidence of error at a higher-layer of a network stack or of an attack by an adversary. If the number of NACK signals exceeds a threshold, a session may be terminated and a new session be established.

The direction of time for communication sequence 1700 is shown by timeline 1722. Communication sequence 1700 begins with chiplet authentication 1702 between chiplet-1 (1718) and chiplet-2 (1720). After chiplet authentication, chiplet-1 and chiplet-2 perform a key exchange 1704. In some embodiments, chiplet-1 and chiplet-2 perform the key exchange by executing a Key Exchange Protocol consistent with methods 900 and 1000 of FIGS. 9 and 10, respectively.

At step 1, chiplet-1 generates a message $M_1$. Meanwhile, at step 2, chiplet-2 generates message $M'_1$.

At step 3, chiplet-1 encrypts message $M_1$ by computing ciphertext $C_1$. In parallel, at step 4, chiplet-2 encrypts message $M'_1$ by computing ciphertext $C'_1$.

At step 5, chiplet-1 transmits $C_1$ to chiplet-2 via transmission 1706. At step 6, chiplet-2 decrypts $C_1$ to obtain $M_1$. At step 7, chiplet-2 transmits $C'_1$ to chiplet-1 via transmission 1708.

At step 8, chiplet-1 decrypts $C'_1$ to compute $M'_1$. At step 9, chiplet-2 generates $M'_2$, but chiplet-2 has not received an ACK for $M'_1$ so it awaits taking action on $M'_2$. At step 10 chiplet-2 sends an ACK signal to chiplet-1 via transmission 1710, signaling that chiplet-2 has decrypted and verified $M_1$. At step 11, chiplet-1 sends an ACK signal to chiplet-2 via transmission 1712, signaling that chiplet-1 has decrypted and verified $M'_1$.

At step 12 chiplet-2 encrypts message $M'_2$ by computing ciphertext $C'_2$. And at step 13 chiplet-2 transmits $C'_2$ to chiplet-1 via transmission 1714.

At step 14 chiplet-1 decrypts $C'_2$ to compute $M'_2$ and at step 15 chiplet-1 sends an ACK signal to chiplet-2 via transmission 1716, signaling that chiplet-2 has decrypted and verified $M'_2$.

The discussion below proceeds to discuss a chiplet and a communication sequence for a new communication mode, no-delay half-duplex mode. In no-delay half-duplex mode, a chiplet may, while waiting for a message after receiving an SND signal, encrypt its own message using a different counter. And while a chiplet is decrypting received data, it can transmit its own encrypted data over the channel, improving the channel utilization.

Figure 18:
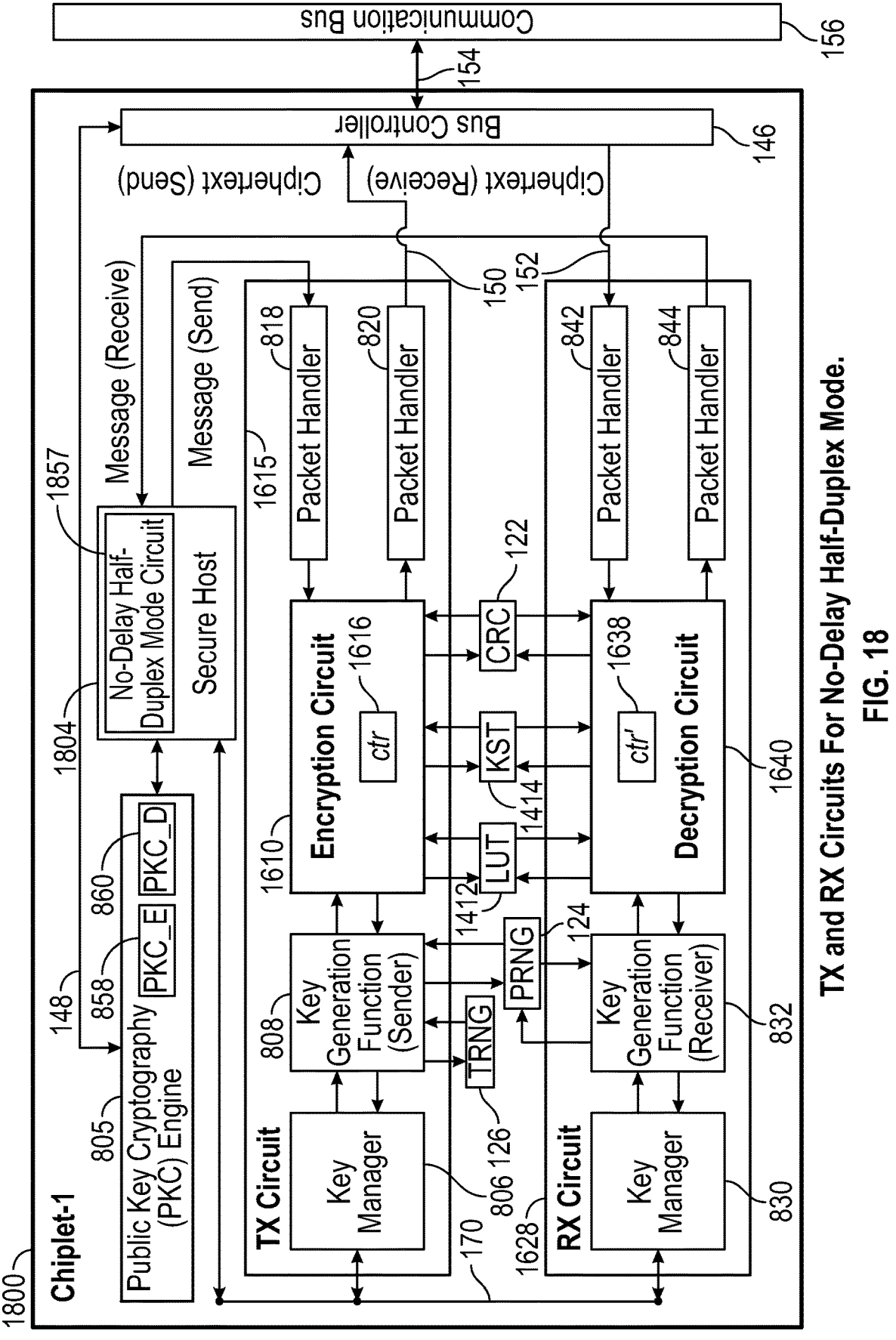
FIG. 18 is a simplified block diagram of a chiplet configured for no-delay half-duplex mode of communication, consistent with some embodiments.

Referencing FIG. 18, a chiplet 1800 is configured for encryption and decryption, for example via methods 1100 and 1200, and for communication via no-delay half-duplex mode. The no-delay half-duplex mode is enabled at least in part by no-delay half duplex mode circuit 1857 and by having two counters, a counter ctr 1616 for transmission and another counter ctr' 1638 for receiving.

Chiplet 1800 includes a secure host 1804 that includes a no-delay half-duplex mode circuit 1857 that configures local host 1804 for issuing instructions, commands, and data for causing chiplet 1800 to communicate via no-delay half-duplex mode of communication. In some embodiments, no-delay half-duplex mode circuit 1857 is a memory bearing executable instructions for causing chiplet 1800 to communicate via no-delay half-duplex mode. In some other embodiments, no-delay half-duplex mode circuit 1857 is hard-wired logic. And in yet some other embodiments, no-delay half-duplex mode circuit 1857 includes both a memory with executable instructions and hard-wired logic.

As described above regarding chiplet 1600, Chiplet 1800 includes a TX circuit 1615 with Encryption Circuit 1610 which includes a counter ctr 1616 dedicated to the TX circuit 1615. And, as does chiplet 1600, chiplet 1800 includes an RX circuit 1628 which includes decryption Circuit 1640 which includes a counter ctr' 1638 dedicated to the RX circuit 1628.

In chiplet 1600, the counters ctr 1616 and ctr' 1638 were used for full-duplex mode, but in chiplet 1800 they are configured to be used for no-delay half-duplex mode at least partly by no-delay half-duplex mode circuit 1857.

Figure 19:
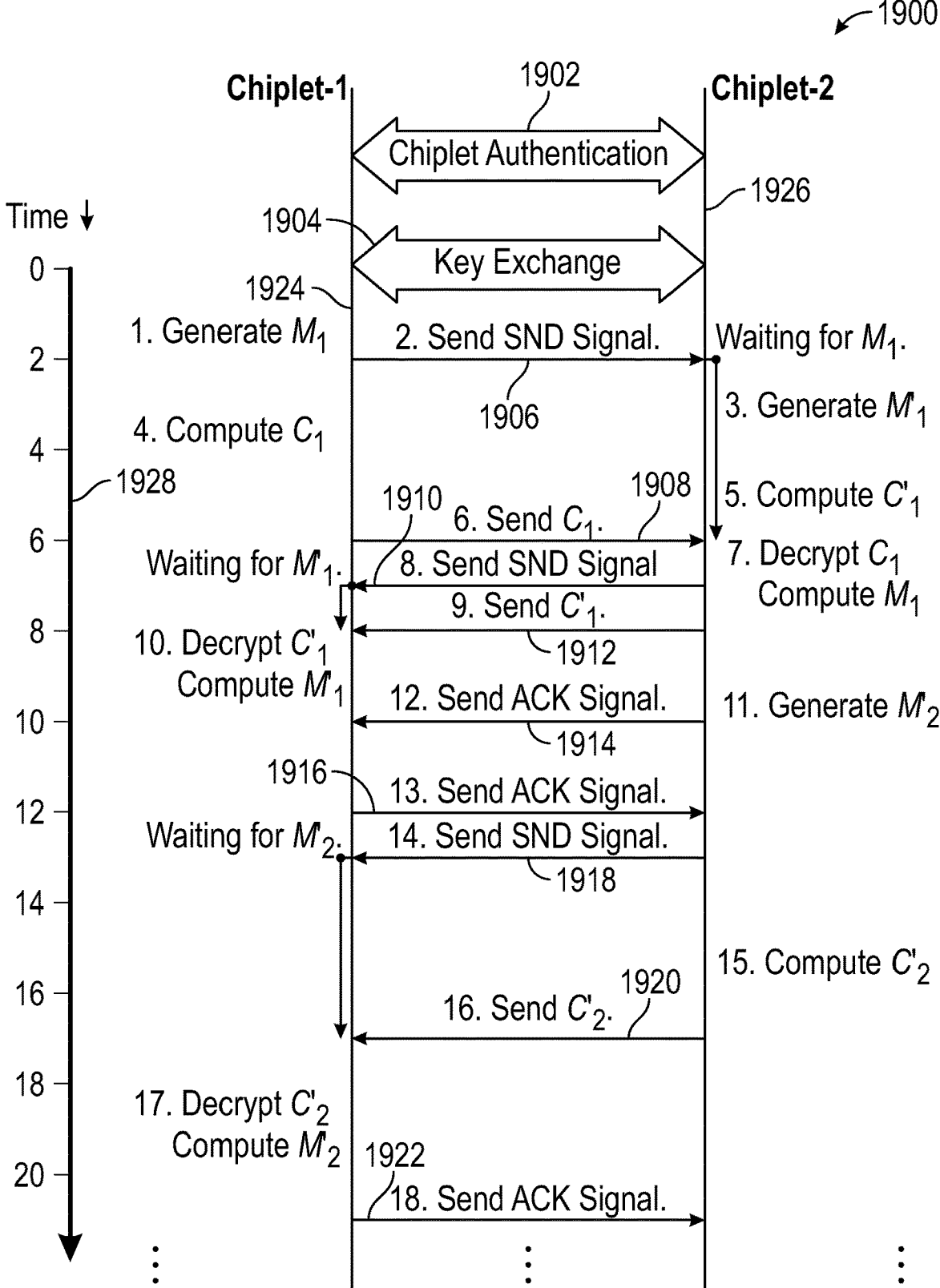
FIG. 19 is a sequence diagram showing an exemplary sequence of transmissions between two chiplets, consistent with some embodiments, showing a no-delay half-mode of communication.

Referencing FIG. 19, a communication sequence 1900 illustrates no-delay half-duplex mode of communication between chiplet-1 (1924) and chiplet-2 (1926). In some embodiments, chiplet-1 is chiplet 1800 above and stores: a) A session key K that equals r0‖r1, b) an LUT generated with random number r0, c) a counter ctr for sending data, and d) a counter ctr' for receiving data. Although FIG. 18 shows KST 1414 shared by encryption circuit 1610 and decryption circuit 1640, this is optional. A KST need not be stored because values from a KST can be computed on the fly.

In those embodiments, chiplet-2 stores a) the same session key K that equals r0‖r1, b) the same LUT generated with random number r0, c) the counter ctr but for receiving data, and d) the counter ctr' but for sending data. Thus, in chiplet-2 the role of the counters is reversed compared to their role in chiplet-1. A KST need not be stored because values from a KST can be computed on the fly.

With no-delay half-duplex mode there is a risk of collision of counters ctr and ctr'. It is possible that after encryption of M[i] and M[i'] message blocks on both chiplets, that the counters may collide such that (ctr+i)=(ctr'+i'). This collision may leak some partial information, which may allow for several kinds of attacks. Therefore, the collision is highly undesirable.

A risk of collision is present when $|ctr-ctr'|<ref\_rate$, where ref_rate is the refresh rate of the session key. The risk may be mitigated by choosing ctr and ctr' differently, for example by choosing ctr probabilistically and choosing ctr' deterministically. For example, during the execution of the sender's and the receiver's Key Generation Functions the counter ctr' can be computed as $ctr':=ctr+2^{b/2}$. The following are some other options for avoiding collisions:

a. Assigning ctr' a random value. For example, $ctr':=KST$ [1] mod $2^b$.

b. Using an initial value IV. For example, $ctr\|ctr':=IV$.

c. Using the two PRNG's. For example, $ctr:=PRNG_0(r1)$ and $ctr':=PRNG_1(r0)$.

d. Using a single PRNG. For example, $ctr:=PRNG(KST[0]\|0)$ and ctr' $PRNG(KST[0]\|1)$.

With no-delay half-duplex mode, the control signals are the same control signals as for basic half-duplex mode (SND, ACK, NACK, SND-ACK). In some embodiments, the above control signals are timestamped to resolve conflicts.

Referencing FIG. 19, the direction of time for communication sequence 1900 is shown by timeline 1928. Communication sequence 1900 begins with chiplet authentication 1902 between chiplet-1 (1924) and chiplet-2 (1926). After chiplet authentication, chiplet-1 and chiplet-2 perform a key exchange 1904. In some embodiments, chiplet-1 and chiplet-2 perform the key exchange 1904 by executing a Key Exchange Protocol consistent with methods 900 and 1000 of FIGS. 9 and 10, respectively.

At step 1, chiplet-1 generates a message $M_1$. Chiplet-1 then checks if chiplet-2 has sent an SND signal. At step 2, after determining that chiplet-2 has not sent an SND signal, chiplet-1 sends an SND signal to chiplet-2 via transmission 1906.

At step 3, chiplet-2 is waiting for $M_1$ but nevertheless generates message $M'_1$. But because chiplet-1 has sent an SND signal, chiplet-2 does not send its own SND signal.

At step 4, chiplet-1 encrypts $M_1$ by computing ciphertext $C_1$.

At step 5, chiplet-2 is still waiting for $M_1$, but under no-delay half-duplex mode, nevertheless encrypts $M'_1$ by computing ciphertext $C'_1$.

At step 6, via transmission 1908, chiplet-1 transmits $C_1$ to chiplet-2 which is waiting for $M_1$ because of the SND signal from chiplet-1.

At step 7, chiplet-2 decrypts $C_1$ to compute $M_1$. And in step 8, sends an SND signal to chiplet-1 via transmission 1910. Chiplet-1 is now waiting for $M'_1$. And in step 9, chiplet-2 transmits $C'_1$ to chiplet-1 via transmission 1912.

In step 10, chiplet-1 decrypts $C'_1$ to compute $M'_1$.

In step 11, chiplet-2 generates message $M'_2$. And in step 12, chiplet-2 sends an ACK signal to chiplet-1 via transmission 1914. This ACK signal acknowledges that chiplet-2 has decrypted and verified $M_1$.

In step 13, chiplet-1 sends an ACK signal to chiplet-2 via transmission 1916. The ACK signal acknowledges that chiplet-1 has decrypted and verified $M'_1$.

At step 14, chiplet-2 sends an SND signal to chiplet-1 via transmission 1918. Chiplet-1 is now waiting for $M'_2$. At step 15, chiplet-2 encrypts $M'_2$ by computing $C'_2$. And at step 16, chiplet-2 sends $C'_2$ to chiplet-1 (and chiplet-1 stops waiting) via transmission 1920.

Chiplet-1, in step 17, decrypts $C'_2$ to compute $M'_2$. And in step 18, chiplet-1 sends an ACK signal to chiplet-2 via transmission 1922. The ACK signal acknowledges that chiplet-1 has decrypted and verified $M'_2$.

The no-delay half-duplex mode has advantages and disadvantages. Advantages include a high utilization rate of the channel compared with basic half-duplex mode, smaller waiting times, and timeliness of data transmissions. Disadvantages include extra logic (e.g. no-delay half-duplex mode circuit 1857), a requirement to store an additional counter (as compared with one counter for basic half-duplex mode), and a requirement, in some embodiments, to time-stamp control signals to resolve conflicts.

The discussion below proceeds to discuss a chiplet 2000 configured for a space-saver mode. Chiplet 2000 is configured to communicate via at least one of basic half-duplex mode or full-duplex mode, but is optimized to save space by avoiding the computation and storage of an entire LUT in the TX circuit 2015. Instead, components in TX circuit 2015 compute only a target value (e.g. LUT[M[i]]) of the LUT on the fly as needed, and this target value is, in some embodiments, not stored. The operation of communication sequences is, in some embodiments, at least one of sequence 1500 for half-duplex mode or 1700 for full-duplex mode.

The space optimization for space-saver mode is especially significant for IoT devices, which may include one or more chiplets at least similar to chiplet 2000. IoT devices are constrained in computing power, memory storage, and access to electrical power, and space saver mode allows an IoT device to conserve resources.

In a further possible optimization, in some embodiments, an IoT device includes chiplets (e.g. chiplet 2000) that perform only encryption using space-saver mode, but that do not perform decryption and thus, do not include circuitry for decryption. That is, the IoT device may not include RX circuit 2028 or may include a simplified receiving circuit (now shown), but not one configured for decryption (e.g. lacks key manager 830, key generation function (receiver) 2032, and decryption circuit 2040). Instead, an IoT device may gather data from, for example, sensors and then encrypt and transmit that data to a network device (e.g. a server) (not shown), which performs the decryption.

Figure 20:
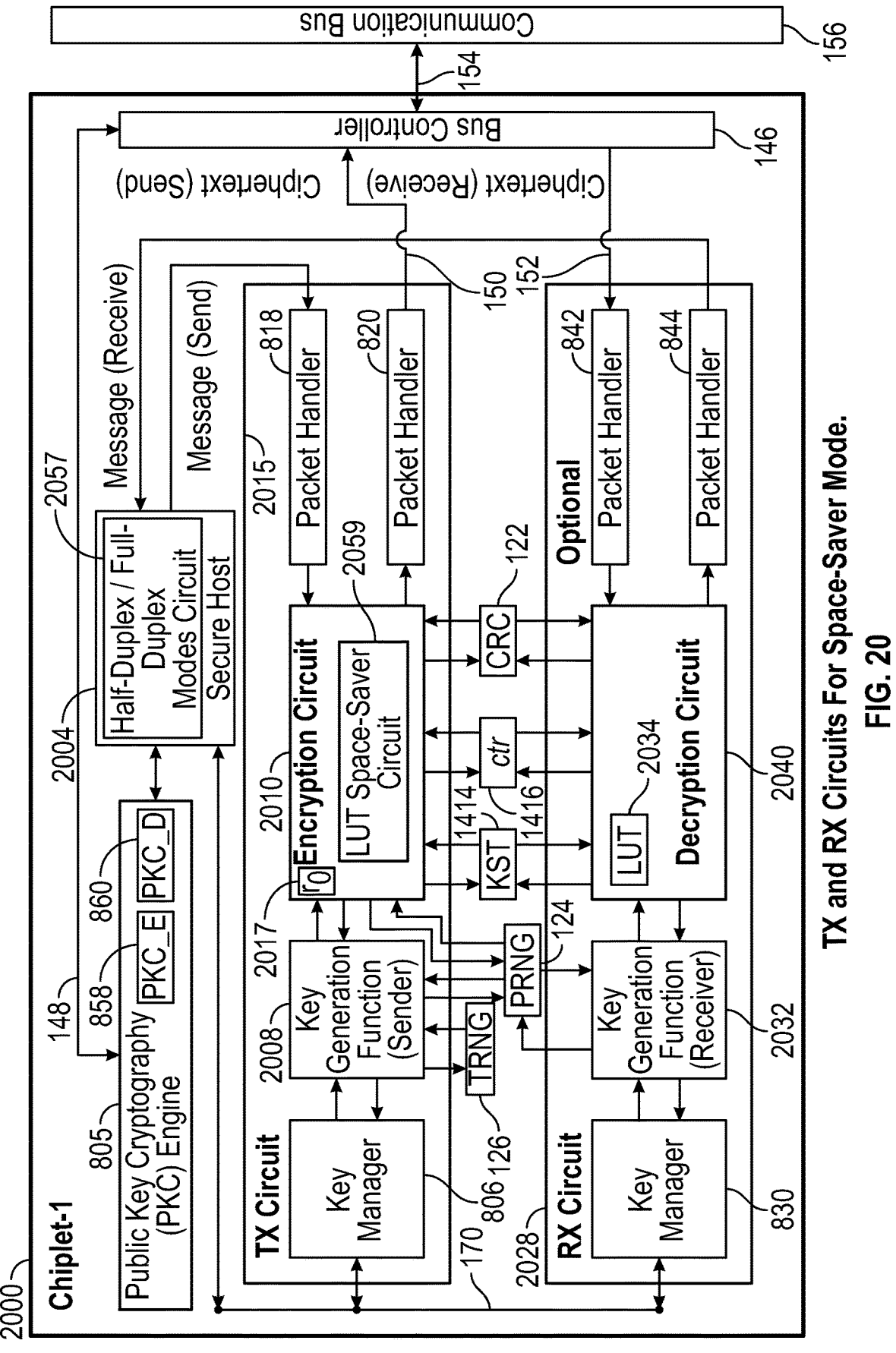
FIG. 20 is a simplified block diagram of a chiplet configured for a space-saver mode of communication, consistent with some embodiments.

Referencing FIG. 20, chiplet 2000 includes a secure host 2004 that includes a half-duplex/full-duplex modes circuit 2057 that configures local host 2004 for issuing instructions, commands, and data for causing chiplet 2000 to communicate via at least one of half-duplex or full-duplex mode in space-saver mode. In some embodiments, half-duplex/full-duplex modes circuit 2057 is a memory bearing executable instructions for causing chiplet 2000 to communicate via at least one of half-duplex or full-duplex mode while in space-saver mode. In some other embodiments, half-duplex/full-duplex modes circuit 2057 is hard-wired logic. And in yet some other embodiments, half-duplex/full-duplex modes circuit 2057 includes both a memory with executable instructions and hard-wired logic.

Chiplet 2000 includes a TX circuit 2015 that includes a modified key generation function (sender) 2008 that does not return an LUT as output. Instead, key generation function (sender) 2008 interfaces with true random number generator TRNG 126 and provides random number r0 (2017) to an Encryption Circuit 2010 that computes Encryption Key ((r0, KST, ctr), A, M). That is, Encryption Circuit 2010 does not receive an LUT, but, instead, a random number r0 to dynamically compute target values of an LUT on the fly as they are needed.

Encryption Circuit 2010 does not compute, store, or utilize an entire LUT in encryption. Instead, Encryption Circuit 2010 includes an LUT space-saver circuit 2059 that is configured to dynamically compute a target value of an LUT on the fly using random number r0 (2017) as discussed below. In some embodiments, space-saver circuit 2059 does not retain the computed target value and therefore does not utilize memory (such as an SRAM) for storing the dynamically computed target value. For computing a target value of an LUT, in some embodiments, the following formula is used: LUT[M[i]]=PRNG$_0$(mix(r0, M[i])). The function mix( ) diffuses values of r0 and M[i] (the message block i) to produce a string that acts as a seed for pseudo-random number generator PRNG$_0$. Method 1100 for encryption is modified. In that, operation 1120 utilizes the dynamically computed LUT[M[i]] rather than target values from an LUT.

In some embodiments, chiplet 2000 includes an RX circuit 2028 that includes a modified key generation function (receiver) 2032 that computes an LUT 2034 according to the same formula LUT[M[i]]=PRNG$_0$(mix(r0, M[i])). That is, in those embodiments, the foregoing is utilized by key generation function (receiver) 2032 to compute an entire LUT 2034 rather than just a single target value. Decryption Circuit 2040 receives as input this LUT 2034 generated by the foregoing formula, but its operation is otherwise unchanged.

The mix(function is, in some embodiments, computed according method one or method two:

Method 1: Using rearrangements.
  a) If:
    a. The input to PRNG$_0$, say, |seed|=128 bits,
    b. The message block size, |M[i]|=16 bits,
  b) Then, we have |r0|=128–16=112 bits.
  c) Then, to compute mix(function, the M[i] can be:
    a. Appended—added at the end
      ⇒mix(r0, M[i]):=r0||M[i].
    b. Prefixed—added at the start
      ⇒mix(r0, M[i]):=M[i]||r0.
    c. Prefixed and appended—added half at start and half at end
      ⇒mix(r0, M[i]):=M[i]$_1$||r0||M[i]$_2$.
    d. Diffused—added throughout the r0
      ⇒mix(r0, M[i]):=M[i]$_1$||r0$_1$||M[i]$_2$||r0$_2$|| . . . ||M[i]$_k$||r0$_k$||M[i]$_{k+1}$.

Method 2: Using functions.
  a) Compute the value of mix(function with the help of a mathematical function using r0 and M[i] as inputs.
  b) The potential functions are: Hash function, Compression function, XORing, multiplication, etc.

In addition to the advantages discussed above for IoT devices, the space-saver mode has several advantages. Advantages include that for small messages, a large computation cost is avoided. These avoided computation costs include the cost of computing all but a few target values of an otherwise large LUT. Generating an LUT, in some embodiments, requires computing all $2^b$ entries of w bits each (for instance, in one example, $2^{16}$ entries of 64 bits each). Avoiding the above computation avoids high utilization of a PRNG. A further advantage is, in some embodiments, avoiding the need to store the LUT in memory, such as SRAM.

The discussion below proceeds to discuss a chiplet 2100 configured for a two-key encryption mode. Chiplet 2100 provides high security for, in some embodiments, at least one of basic half-duplex mode or full-duplex mode, but is configured with two encryption keys for greater security. The operation of communication sequences is, in some embodiments, at least one of sequence 1500 for half-duplex mode or 1700 for full-duplex mode.

Two-key encryption mode utilizes two session keys: K and K'. The session key K is used for communication from a first chiplet, chiplet-1, to a second chiplet, chiplet-2. And session key K' is used for communication from chiplet-2 to chiplet-1.

Figure 21:
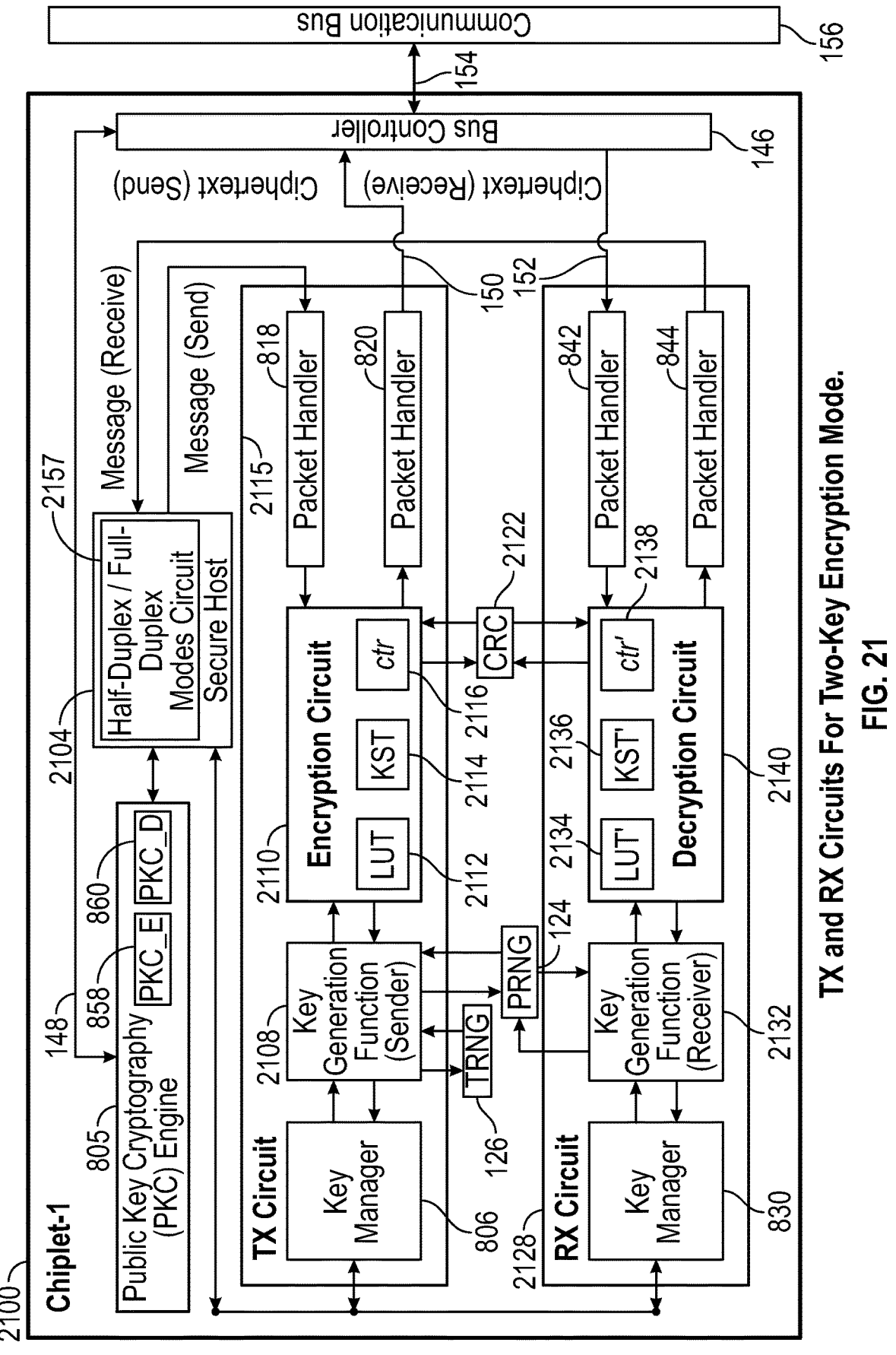
FIG. 21 is a simplified block diagram of a chiplet configured for a two-key encryption mode, consistent with some embodiments.

In some embodiments, chiplet-1 is chiplet 2100 above and stores the following for transmitting circuit: a) A session key K that equals r0||r1, b) an LUT generated with random number r0, and c) a counter ctr for sending data. Although FIG. 21 shows encryption circuit 2110 as including KST 2114, this is optional. A KST need not be stored because values from a KST can be computed on the fly. The chiplet-1 also stores the following for receiving circuit: a) A session key K' that equals r0'||r1', b) an LUT' generated with random number r0', and c) a counter ctr' for receiving data. Although FIG. 21 shows decryption circuit 2140 as including KST' 2136, this is optional. A KST' need not be stored because values from a KST' can be computed on the fly.

In those embodiments, chiplet-2 stores the following for transmitting circuit: a) A session key K' that equals r0'||r1', b) an LUT' generated with random number r0', and c) a counter ctr' for sending data. A KST' need not be stored because values from a KST' can be computed on the fly. The chiplet-2 also stores the following for receiving circuit: a) A session key K that equals r0||r1, b) an LUT generated with random number r0, and c) a counter ctr for receiving data. A KST need not be stored because values from a KST can be computed on the fly. Thus, in chiplet-2, the role of the session keys, LUT's, counters and KST's are reversed compared to their role in chiplet-1.

Referencing FIG. 21, a chiplet 2100 includes a secure host 2104 that includes a half-duplex/full-duplex modes circuit 2157 that configures local host 2104 for issuing instructions, commands, and data for causing chiplet 2100 to communicate via at least one of half-duplex or full-duplex mode while in two-key encryption mode. In some embodiments, half-duplex/full-duplex modes circuit 2157 is a memory bearing executable instructions for causing chiplet 2100 to communicate via at least one of half-duplex or full-duplex mode while in two-key encryption mode. In some other embodiments, half-duplex/full-duplex modes circuit 2157 is hard-wired logic. And in yet some other embodiments, half-duplex/full-duplex modes circuit 2157 includes both a memory with executable instructions and hard-wired logic.

Chiplet 2100 includes a TX circuit 2115 with a key generation function (sender) 2108 that utilizes random numbers r0 and r1 to generate a session key K (e.g. where K:=r0||r1). Outputs from key generation function (sender) 2108 to Encryption Circuit 2110 include LUT 2112, KST 2114, and counter ctr 2116. LUT 2112, KST 2114, and counter ctr 2116 are stored for use of encryption circuit 2110 for encrypting outgoing data. The foregoing outputs from key generation function (sender) 2108 are for the use of TX circuit 2115 and are not shared with RX circuit 2128 (discussed below). The session key K is shared to the second chiplet, chiplet-2 via the key exchange performed between chiplet-1 and chiplet-2. In some embodiments, the key exchange is performed by executing a Key Exchange Protocol consistent with methods 900 and 1000 of FIGS. 9 and 10, respectively.

Chiplet 2100 further includes an RX circuit 2128 with a key generation function (receiver) 2132 that utilizes two different random numbers r0' and r1'. In one embodiment, the values of r0' and r1' are generated by the TX circuit 2115 of the second chiplet, chiplet-2, using a true random number generator, at least similar to TRNG 126. After this, the chiplet-2 utilizes random numbers r0' and r1' to generate a different session key K' (e.g. where K':=r0'||r1'). The session key K' is shared by the chiplet-2 to the chiplet-1 via the key exchange performed between chiplet-2 and chiplet-1. In another embodiment, the key generation function (receiver) 2132 may be given access to TRNG 126 to generate two different random numbers r0' and r1' for the generation of a different session key K' (e.g. where K':=r0'||r1'). The session key K' is shared by the chiplet-1 to the chiplet-2 via the key exchange performed between chiplet-1 and chiplet-2. In some embodiments, the key exchange is performed by executing a Key Exchange Protocol consistent with methods 900 and 1000 of FIGS. 9 and 10, respectively. Outputs from key generation function (receiver) 2132 to decryption circuit 2140 include LUT' 2134, KST' 2136, and counter ctr' 2138. At least LUT' 2134, KST' 2136, and counter ctr' 2138 are stored for use by decryption circuit 2140. The foregoing are for the use of RX circuit 2128 and are not shared with TX circuit 2115.

The discussion below proceeds relative to FIG. 22 to discuss a chiplet 2200 configured for a two-key space-saver encryption mode. Chiplet 2200 saves on memory use and provides high security for, in some embodiments, at least one of basic half-duplex mode or full-duplex mode. The operation of communication sequences is, in some embodiments, at least one of sequence 1500 for half-duplex mode or 1700 for full-duplex mode.

Two-key space-saver encryption mode is a space-saver variant of two-key encryption mode. In two-key space-saver encryption mode, both a first chiplet (chiplet-1) and a second chiplet (chiplet-2) use space-saver encryption mode for their transmitting circuit. Storage of an LUT in the TX circuit is thereby avoided. During encryption, the desired LUT target value is computed on the fly without computing or storing an entire table.

In some embodiments, chiplet-1 is chiplet 2200 above and stores the following for transmitting circuit: a) A session key K that equals r0||r1, and b) a counter ctr for sending data. Although FIG. 22 shows encryption circuit 2210 as including KST 2114, this is optional. A KST need not be stored because values from a KST can be computed on the fly. The chiplet-1 also stores the following for receiving circuit: a) A session key K' that equals r0'||r1', b) an LUT' generated with random number r0', and c) a counter ctr' for receiving data. Although FIG. 22 shows decryption circuit 2140 as including KST' 2136, this is optional. A KST' need not be stored because values from a KST' can be computed on the fly.

In those embodiments, chiplet-2 stores the following for transmitting circuit: a) A session key K' that equals r0'||r1', and b) a counter ctr' for sending data. A KST' need not be stored because values from a KST' can be computed on the fly. The chiplet-2 also stores the following for receiving circuit: a) A session key K that equals r0||r1, b) an LUT generated with random number r0, and c) a counter ctr for receiving data. A KST need not be stored because values from a KST can be computed on the fly. Thus, in chiplet-2, the role of the session keys, LUT's, counters and KST's are reversed compared to their role in chiplet-1.

Thus, the management of keys is similar to two-key encryption mode, but the avoidance of computing and storing an LUT in the TX circuit is similar to space-saver mode.

Figure 22:
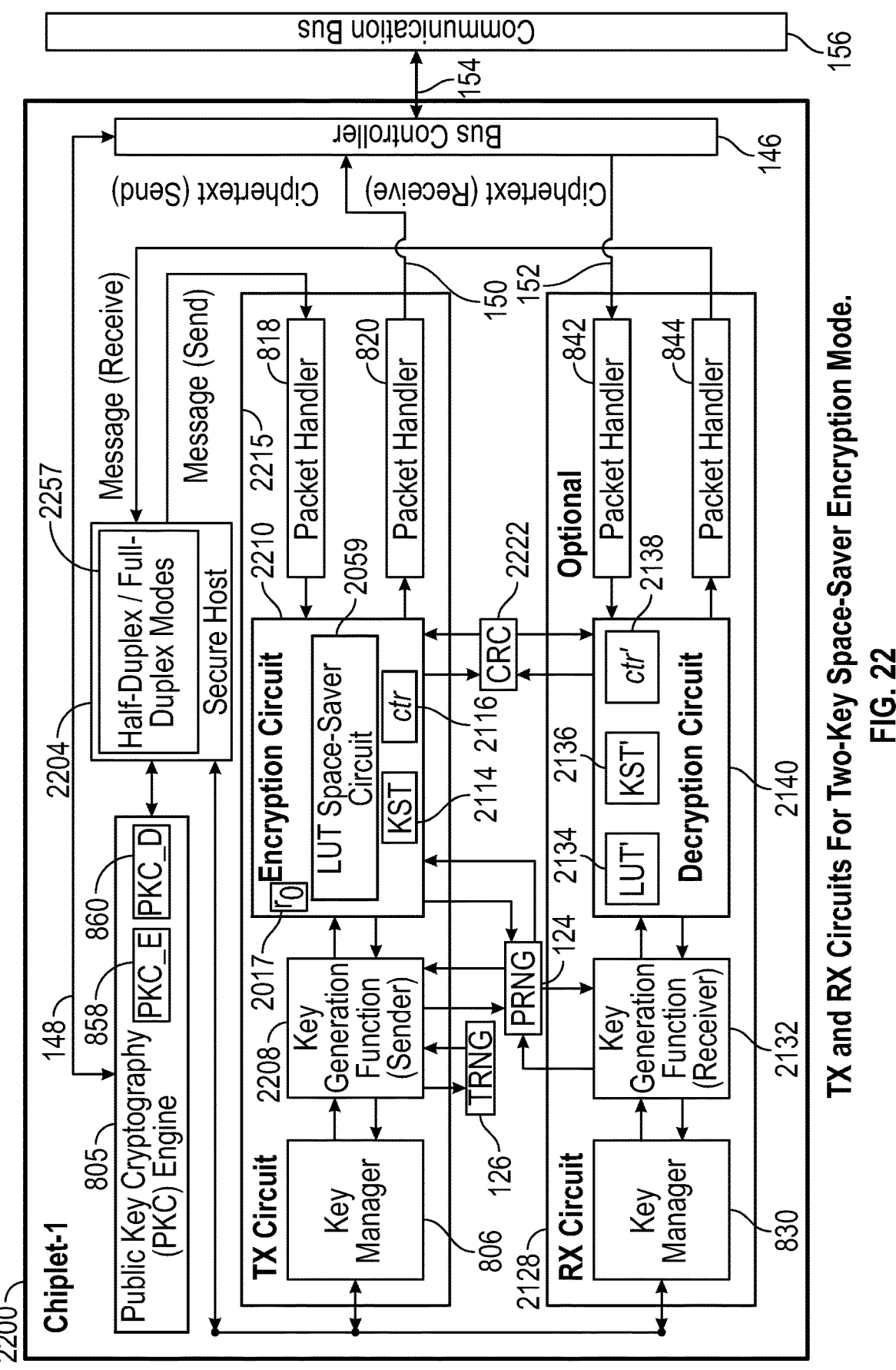
FIG. 22 is a simplified block diagram of a chiplet configured for two-key space-saver mode, consistent with some embodiments.

Referencing FIG. 22, a chiplet 2200 includes a secure host 2204 that includes a half-duplex/full-duplex modes circuit 2257 that configures local host 2204 for issuing instructions, commands, and data for causing chiplet 2200 to communicate via at least one of half-duplex or full-duplex mode in two-key space-saver encryption mode. In some embodiments, half-duplex/full-duplex modes circuit 2257 is a memory bearing executable instructions for causing chiplet 2200 to communicate via at least one of half-duplex or full-duplex mode while in two-key space-saver encryption mode. In some other embodiments, half-duplex/full-duplex modes circuit 2257 is hard-wired logic. And in yet some other embodiments, half-duplex/full-duplex modes circuit 2257 includes both a memory with executable instructions and hard-wired logic.

Chiplet 2200 includes a TX circuit 2215 with a key generation function (sender) 2208 that utilizes random numbers r0 and r1 to generate a session key K (e.g. where K:=r0||r1). Outputs from key generation function (sender) 2208 to Encryption Circuit 2210 include K, r0 (2017), KST 2114, and counter ctr 2116, but not an LUT. These outputs are stored for use of Encryption Circuit 2210 for encrypting outgoing data. The foregoing outputs are for the use of TX circuit 2215 and are not shared with RX circuit 2128 (discussed below). The session key K is shared to the second chiplet, chiplet-2 via the key exchange performed between chiplet-1 and chiplet-2. In some embodiments, the key exchange is performed by executing a Key Exchange Protocol consistent with methods 900 and 1000 of FIGS. 9 and 10, respectively.

As noted above, key generation function (sender) 2208 does not return an LUT as output. Instead, key generation function (sender) 2208 interfaces with true random number generator TRNG 126 and provides random number r0 (2017) to an encryption circuit 2010, which is described above relative to FIG. 20 and which will not be discussed further relative to FIG. 22.

Two-key space-saver encryption mode has advantages and disadvantages. One advantage is that the risk of collision of two counters ctr and ctr'—discussed above regarding no-delay half-duplex mode—is rendered negligible. Another advantage is that the session keys K and K' are refreshed independently of each other. In some embodiments, a key is refreshed with the number of blocks encrypted equals or exceeds ref_rate (the refresh rate). It is possible that K and K' will be used for k blocks at different times. Another advantage is saving the cost of storing an additional LUT. A disadvantage is the requirement, in some embodiments, to store one more session key.

An additional mode is high-volume data encryption mode, a mode that utilizes data compression. High-volume data encryption mode operates in any of the above communication modes, including for example half-duplex or full-duplex. It is utilized where a high data transfer rate is desired. There are at least the following two modes of implementing high-volume data encryption mode.

Method 1: Uses loss-less compression and decompression functions. The following are applicable:

a. Method 1 uses a compression function Comp: $\{0,1\}^q \mapsto \{0,1\}^b$ in the transmission circuit.

b. Method 1 uses a decompression function Decomp: $\{0,1\}^b \mapsto \{0,1\}^q$ in the receiving circuit.

c. At the Sender's side, the steps are:

i. Receive a message block $M_q$ of q bits.

ii. Compress $M_q$ into a b-bit message block: $M_b := \text{Comp} (M_q)$.

iii. Encrypt $M_b$ to generate a w-bit ciphertext block: $C_w := \text{Enc}(M_b)$.

iv. Send w-bit ciphertext block $C_w$ to the Receiver.

Message block $M_q$.
↓ Compression
Compressed Message block $M_b$.

-continued

```
                    ↓ Encryption
           Ciphertext block C_w.
                    ↓ Send to Receiver
``` d. At the Receiver's side, the steps are:
   i. Receive w-bit ciphertext block $C_w$ from Sender.
   ii. Decrypt w-bit ciphertext block $C_w$ to generate a compressed b-bit message block: $M_b$:=Dec($C_w$).
   iii. Decompress $M_b$ to a q-bit message block: $M_q$:=Decomp($M_b$).
   iv. Accept $M_q$.

```
                    ↓ Receive from Sender
           Ciphertext block C_w.
                    ↓ Decryption
     Compressed Message block M_b.
                    ↓ Decompression
           Message block M_q.
```

Method 2: Uses a lossy compression and decompression with error correction. The following are applicable:
   a. Method-2 uses a compression function Comp: $\{0,1\}^w \mapsto \{0,1\}^q$ in the transmission circuit.
   b. Method-2 uses a decompression function Decomp: $\{0,1\}^q \mapsto \{0,1\}^w$ along with error correction in the receiving circuit.
   c. At the Sender's side, the steps are:
      i. Receive a message block $M_b$ of b bits.
      ii. Encrypt $M_b$ to generate a w-bit ciphertext block $C_w$: $C_w$:=Enc($M_b$).
      iii. Compress $C_w$ into a compressed q-bit ciphertext block $C_q$: $C_q$:=Comp($C_w$).
      iv. Send compressed q-bit ciphertext block $C_q$ to the Receiver.

```
           Message block M_b.
                    ↓ Encryption
           Ciphertext block C_w.
                    ↓ Compression
     Compressed Ciphertext block C_q.
                    ↓ Send to Receiver
``` d. At the Receiver's side, the steps are:
   i. Receive compressed q-bit ciphertext block $C_q$ from Sender.
   ii. Decompress $C_q$ to obtain a w-bit uncompressed ciphertext block $C_w'$: $C_w'$:=Decomp($C_q$).
   iii. Correct error in $C_w'$ to obtain $C_w$.
   iv. Decrypt $C_w$ to obtain b-bit message block $M_b$: $M_b$:=Dec($C_w$).
   v. Accept $M_b$.

```
                    ↓ Receive from Sender
     Compressed Ciphertext block C_q.
                    ↓ Decompression
           Ciphertext block C'_w.
                    ↓ Error-Correction
           Ciphertext block C_w.
                    ↓ Decryption
           Message block M_b.
```

The use of compression and decompression has advantages and disadvantages. An advantage is increased performance (e.g. high data transfer rate). A disadvantage is an increased computation cost due to executing compression and decompression functions.

Some embodiments are now discussed. In discussing exemplary methods, exemplary structures that could perform some actions or functions are discussed. The discussion of structures is not intended to be limiting or exhaustive. Those skilled in the art will appreciate that depending on context, other structures could also be used.

In some embodiments: a cryptographic method is performed at least in part at a first chiplet. The method includes at least with the first chiplet, parsing a message into at least one or more message blocks (e.g. secure host 104 parsing the message). The method further includes at least dynamically generating at least a first target value that is associated with at least a first key (e.g. encryption circuit 810 using LUT 812 or encryption circuit 2010 generating target value on the fly with LUT space-saver circuit 2059). The method further includes at least dynamically generating at least a second target value that is associated with at least a second key (e.g. at least encryption circuit 810 or encryption circuit 2010 using KST 814 or KST 1414 or generating target value on the fly). The method further includes at least encrypting at least one message block of the at least one or more message blocks to generate at least some ciphertext, the encryption being performed with at least one operation that includes at least one XOR operation, the at least one XOR operation being performed at least in part with the first target value and with at least the second target value, the first target value and the second target value being accessed at partly via the first and second keys, respectively (e.g. with encryption circuit 810 with, for example, encryption algorithm A). The method further includes at least one processing device associated with the first chiplet, transmitting the at least some ciphertext to a second chiplet (e.g. with secure host 104 and TX circuit 815).

In some further embodiments, the cryptographic method further includes at least wherein the first key is the message block of the one or more message blocks (e.g. message block 502A) and the first target value is at least one of a random number or a pseudo-random number accessed as a substitute for the first key (e.g. target value 504A).

In some further embodiments, the cryptographic method further includes at least wherein the one or more message blocks are one or more ordered message blocks (e.g. at least message blocks 504A-504D), wherein the second key is a numerical index value associated with a position of the at least one message block within the one or more ordered message blocks (e.g. at least keys 612A-612D corresponding to positions M[0], M[1], M[2], M[3] of FIG. 5), and wherein the second target value is at least one of a random number or a pseudo-random number (e.g. KST[0]-KST[3] of FIG. 6).

In some further embodiments, the cryptographic method further includes at least wherein dynamically generating at least a first target value that is associated with at least a first key includes at least generating a dynamic substitution box (e.g. LUT 500) that includes at least (i) the first key (e.g. 502A) and (i) the first target value (e.g. 504A), the generating the dynamic substitution box including at least: a) generating a plurality of keys (e.g. 502A-502D) that include the first key, including at least generating the plurality of keys to include at least respective numerical representations of the one or more message blocks (e.g. 0000 for 502A, 0001 for 502B, etc.), and b) generating a plurality of target values, including at least generating the first target value as a substitute value for a numerical representation associated with the first key (e.g. 504A-504D). In some further particular embodiments, the cryptographic method further includes at least c) sorting the plurality of keys in the dynamic substitution table, the sorting being based on at least in part on the respective numerical representations of the plurality of keys (e.g. 0000 of 502A, 0001 of 502B, etc.) and d) accessing the first target value (e.g. LUT[0], LUT[1], etc.) in the dynamic substitution box by locating the first key, the locating being performed at least in part by searching the sorted numerical representations of the plurality of keys to locate the numerical representation of the first key.

In some further embodiments, the cryptographic method further includes at least wherein dynamically generating at least a second target value that is associated with at least a second key includes at least generating a lookup table (e.g. KST 600) that includes at least (i) the second key (e.g. 612A) and (ii) the second target value (e.g. 614A), the generating the lookup table including at least, a) generating a plurality of keys (e.g. 612A-612D) that include at least the second key, the plurality of keys including at least respective numerical index values (e.g. 0000 for 612A, 0001 for 612B, etc.), and b) generating a plurality of target values (e.g. 614A-614D) that include at least the second target value, respective ones of the plurality of target values being accessible in the lookup table at least in part via the respective numerical index values of the plurality of keys. In some further particular embodiments, the cryptographic method further includes at least accessing the second target value (e.g. KST[0], KST[1], etc.) in the lookup table by locating the second key (e.g. keys 0 of 612A, 1 of 612B, 2 of 612C, etc.), the locating being performed at least in part by searching the respective numerical index values of the plurality of keys to locate a numerical index value associated with the second key.

In some further embodiments, the cryptographic method includes at least wherein generating the first target value includes at least generating a first random number (e.g. r0 327A) with a true random number generator (e.g. 126, 328A) and wherein generating the second target value includes at least generating a second random number (e.g. r1 327B) with the true random number generator (e.g. 126, 328A). In some further particular embodiments, the cryptographic method includes at least wherein generating the first target value additionally includes generating the first target value based at least in part on an output of a pseudo-random number generator (e.g. PRNG0 322A) seeded with a seed that includes at least the first random number (e.g. r0), and wherein generating the second target value additionally includes generating the second target value based at least in part on an output of a pseudo-random number generator (e.g. PRNG1 324A) seeded with a seed that includes at least the second random number (e.g. r1).

In some further embodiments, the cryptographic method further includes at least generating a tag based at least in part on the message, a nonce value, and some additional data, and concatenating the tag with at least the message block of the one or more message blocks. The encrypting at least a message block of the at the one or more message blocks further includes encrypting at least the concatenation of the tag with the at least one message block.

In some further embodiments, the cryptographic method further includes at least wherein the method is performed with a first chiplet that is part of a resource constrained device (e.g. smart camera 1).

In some further embodiments, the cryptographic method further includes at least wherein the dynamically generating at least a first target value that is associated with at least a first key includes at least dynamically generating at least a first substitute value for the first key and wherein the generating the first substitute value does not include generating a lookup table containing the first substitute value (see e.g. encryption circuit 2010 with LUT space-saver circuit 2059 with input r0 (2017).

In some further particular embodiments, the cryptographic method further includes at least with at least one processing device associated with the first chiplet, transmitting the at least some ciphertext to a second chiplet with at least one of the following communication modes: a) transmitting in a no-delay half-duplex mode in which the first chiplet encrypts a message block of the one or more message blocks while waiting for a message from the second chiplet, b) transmitting in a space-saver mode in which the first chiplet saves memory resources by generating the first target value without generating a dynamic substitution box, c) transmitting in a two-key encryption mode in which a first security configuration is used for transmitting from the first chiplet to the second chiplet and a second security configuration is used for transmitting from the second chiplet to the first chiplet, d) transmitting in a two-key space-saver mode in which the security configuration is a combination of the space-saver mode and the two-key encryption mode, or e) transmitting in a high performance mode that utilize data compression and data decompression.

In some embodiments, a cryptographic method is performed at least in part at a second chiplet. The method includes at least dynamically generating a first lookup table (e.g. LUT 500) that includes a plurality of first target values and a plurality of first keys, a given first target value of the plurality of first lookup values being obtainable based on corresponding first key of the plurality of first keys, and wherein the first lookup table is at least one of usable or configurable as an inverse lookup table (e.g. LUT 500 used as an inverse lookup table, sorted inverse LUT 700, etc.), for obtaining the corresponding first key based at least in part on the given first target value. The method further includes at least dynamically generating at least a second lookup table (e.g. KST 600) that includes a plurality of second target values and a plurality of second keys, a given second target value of the plurality of second target values being obtainable based on a corresponding second key of the plurality of second keys. The method further includes at least decrypting at least one ciphertext block of one or more ciphertext blocks to generate at least some plaintext, the decryption being performed at least partly with one or more operations that include at least one or more XOR operations, the one or more XOR operations performed at least in part with the corresponding first key obtained at least partly via the given first target value and with at least the given second target value obtained at least partly via the corresponding second key (See e.g. method 1200). The method further includes at least verifying the at least some plaintext. And the method further including at least outputting the at least some plaintext responsive to a successful verification of the plaintext.

In some further embodiments, the cryptographic method further includes at least wherein the at least one XOR operation reverses at least one previous XOR operation, performed at the first chiplet during encryption, of the one or more ciphertext blocks.

In some further embodiments, the cryptographic method further includes at least receiving ciphertext at the second chiplet transmitted from a first chiplet and parsing the ciphertext into the one or more ciphertext blocks.

In some further embodiments, the cryptographic method further includes at least wherein the verifying the at least some plaintext includes at least a) separating the at least some plaintext into a first tag and at least a portion of a message, b) computing a second tag based at least in part on the at least a portion of a message, on a nonce, and on additional data, c) comparing the first tag and the second tag, and d) if the first tag and the second tag do not match. issuing an error message indicating that verification of the at least some plaintext has failed.

In some further embodiments, the cryptographic method further includes at least wherein the first target values are at least one of random or pseudo-random numbers and wherein the first lookup table is usable as an inverse lookup table by at least a) selecting a block of ciphertext of the one or more ciphertext blocks, the block of ciphertext including at least a numerical value, b) searching the target values of the first lookup table for a particular target value that matches the numerical value of the selected block of ciphertext, the searching performed with at least a linear search algorithm; and c) based at least in part on the particular target value obtaining a first key of the plurality that corresponds in the first lookup table with the particular target value.

In some further embodiments, the cryptographic method further includes at least wherein the first target values of the plurality are at least one of random or pseudo-random numbers, and wherein the first lookup table is configurable and usable as an inverse lookup table by at least a) sorting the plurality of first target values, b) selecting a block of ciphertext of the one or more ciphertext blocks, the block of ciphertext including at least a numerical value, c) searching the target values of the first lookup table for a particular target value that matches the numerical value associated with the selected block of ciphertext, the search performed with at least a non-linear search algorithm, and d) based at least in part on the particular target value obtaining a first key of the plurality that is associated in the first lookup table with the particular target value.

In some embodiments, a cryptographic method is performed at least in part at a first chiplet based on a resource-constrained computing device. The method includes a) at least with the first chiplet, parsing a message into at least one or more message blocks, b) dynamically generating at least a first target value that is associated with at least a first key, c) dynamically generating at least a second target value that is associated with at least a second key, d) encrypting at least a message block of the at least one or more message blocks to generate at least some ciphertext, the encryption being performed with at least one or more operations that include one or more XOR operations, the at least one XOR operation being performed at least in part with the first target value and with at least the second target value, the first target value and the second target value being accessed at partly via the first and second keys, respectively, e) with at least one processing device associated with the first chiplet, transmitting the at least some ciphertext to a second chiplet, f) receiving ciphertext for decryption and transmitting the ciphertext to another computing device for decryption.

Part Two

In the encryption and decryption algorithms of methods 1100 and 1200, the tag is authenticated after the decryption. For example, in method 1100, if the tag is a CRC, it is computed as $T:=CRC(N\|A\|M)$, where N is a nonce, A is associated data, and M is the message. Method 1100 then concatenates the tag to the message, as in $M\|T$. The concatenation is then encrypted.

And in performing decryption, method 1200 decrypts the ciphertext C to obtain $M\|T$ and then M and T. Then for authentication, method 1200 then computes tag $T':=CRC(N\|A\|M)$. The method then verifies the computed CRC T' against the decrypted CRC T. Thus, the decryption takes place before the authentication.

But decryption takes more time and computing resources than CRC-based authentication. Therefore, for at least some implementations it is desirable to authenticate before incurring the computational expense of decryption.

One approach is the encrypt-then-tag mode. In the encrypt-then-tag mode, the following are performed during encryption:

a. Encrypt the message M using the LUT and KST to obtain the ciphertext $C_0$.

b. Compute the CRC on the ciphertext $C_0$ along with the nonce N and the associated data A.

c. Encrypt the CRC using the LUT and KST to obtain the ciphertext $C_1$.

d. Compute the ciphertext C as the concatenation of $C_0$ and $C_1$.

The following steps are performed during decryption:

a. Parse ciphertext C into $C_0$ and $C_1$.

b. Decrypt the ciphertext $C_1$ to obtain the CRC.

c. Recompute the CRC on ciphertext $C_0$ along with the nonce N and the associated data A.

d. Verify the computed CRC against the decrypted CRC.

e. If verification is successful, decrypt the ciphertext $C_0$ to obtain the message M.

Before proceeding to discuss specific embodiments, this discussion turns to a high-level overview of three modes of authenticated encryption.

Figures 23A, 23B, 23C:
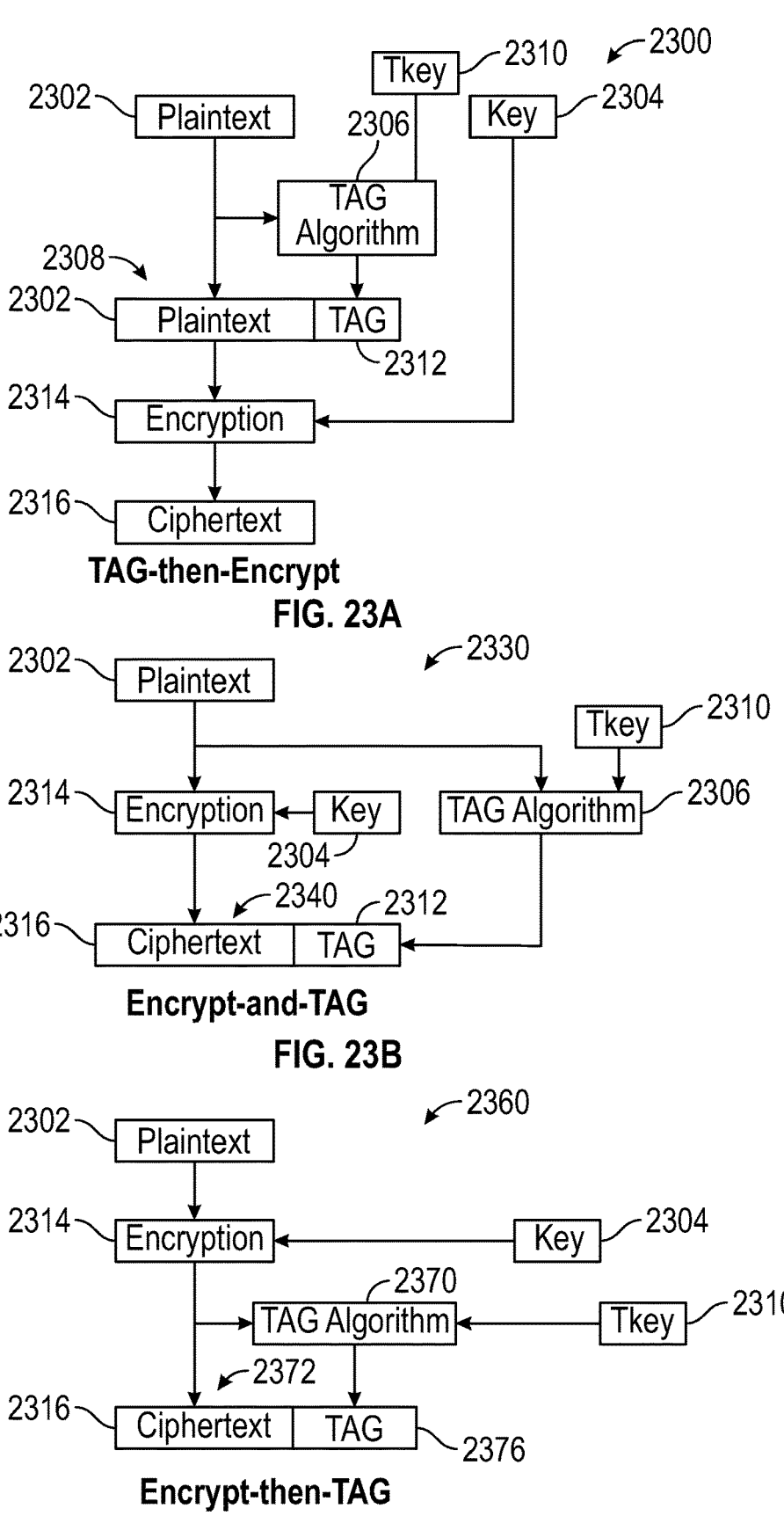
FIG. 23A is a sequence diagram, consistent with some embodiments, illustrating an exemplary sequence for performing a tag-then-encrypt mode.
FIG. 23B is a sequence diagram, consistent with some embodiments, illustrating an exemplary sequence for performing an encrypt-and-tag mode.
FIG. 23C is a sequence diagram, consistent with some embodiments, illustrating an exemplary sequence for performing an encrypt-then-tag mode.

Referencing FIG. 23A, a sequence 2300 of computing a tag and then encrypting illustrates tag-then-encrypt mode. This mode is used in method 1100. Sequence 2300 begins with plaintext 2302. Plaintext 2302 is input to tag algorithm 2306 along with a TKey 2310. In some embodiments, tag algorithm 2306 is a CRC routine performed by, for example, CRC engine of 122. In some alternative embodiments, tag algorithm 2306 is a hash function. In some particular alternative embodiments, tag algorithm 2306 is a keyed hash function that accepts as input key 2304 (e.g. a cryptographic key). Tag algorithm 2306 outputs tag 2312. In some embodiments, tag 2312 is a CRC. In some alternative embodiments, tag 2312 is a hash.

Although FIG. 23A includes a key (TKey 2310) as input to tag algorithm 2306, this does not indicate that a key is necessarily used for the tagging. For example, where the tag algorithm 2306 is a CRC, no key is used in computing the CRC. However, a key may be used for encrypting the CRC value. In some embodiments, TKey 2310 is an encryption key that includes at least LUT, KST, ctr. In some other embodiments, TKey 2310 is another type of key. Regardless of the type of key used, for security the CRC must be encrypted. In some embodiments key 2304 and Tkey 2310 are the same key. In other embodiments key 2304 and TKey 2310 are different keys. Various modes that include encryption of a CRC (or other type of tag) are described with reference to FIGS. 23A-23C. And the above discussion applies to those various modes.

Continuing with sequence 2300, plaintext 2302 is concatenated (as shown) with the tag 2312. The concatenation 2308 of plaintext 2302 and tag 2312 is then processed via encryption 2314, which utilizes key 2304 to produce ciphertext 2316.

Thus, in the above sequence 2300 illustrating tag-then-encrypt mode, the tag is computed and concatenated with the plaintext before both are encrypted. The tag-then-encrypt mode has an advantage of high security because the tag 2312 is computed on a plaintext, which is encrypted before the transmission, and tag 2312 is encrypted, which is part of the ciphertext 2316. A disadvantage is that a computational cost for decryption is incurred even if authentication fails.

Referencing FIG. 23B, a sequence 2330 of computing a tag in parallel with encrypting a message illustrates encrypt-and-tag mode. Sequence 2330 begins with plaintext 2302 that is input in parallel to encryption 2314 and to tag algorithm 2306. Encryption 2314 accepts a key 2304 as input and outputs ciphertext 2316. Tag Algorithm 2306 accepts a TKey 2310 and outputs tag 2312. Ciphertext 2316 and tag 2312 are concatenated to form concatenation 2340.

Thus, in the above sequence 2330 illustrating encrypt-and-tag mode, a device such as a chiplet computes in parallel (a) a tag 2312 from plaintext 2302, and (b) ciphertext 2316 from the encryption of plaintext 2302. Encryption algorithm A, discussed above in tandem with method 1100 can be modified into encrypt-and-tag mode as is discussed below. The encrypt-and-tag mode has an advantage of performing encryption and computing a tag in parallel. A disadvantage is that authentication is verified after the decryption of the entire plaintext.

Referencing FIG. 23C, a sequence 2360 of encrypting and computing a tag illustrates encrypt-then-tag mode. Sequence 2360 begins with plaintext 2302 being input to Encryption 2314. Encryption 2314 also accepts key 2304 as input and then outputs ciphertext 2316, which may be referred to as message ciphertext 2316. Tag Algorithm 2370 accepts the ciphertext 2316 along with a TKey 2310 as input and outputs a tag 2376 of the ciphertext 2316, which may be referred to as tag ciphertext 2376. The tag 2376 is concatenated with the ciphertext 2316 to form concatenation 2372.

Thus, in encrypt-then-tag mode, a chiplet encrypts the plaintext 2302 to obtain ciphertext 2316 and then computes a tag 2376 from the ciphertext 2316. Encryption algorithm A, discussed above in tandem with method 1100 can be modified into encrypt-then-tag mode. Instead of computing the tag as T:=CRC(N∥A∥M), the tag is computed as T:=CRC (N∥A∥C), where C is the ciphertext.

Referencing FIG. 24, method 2400 provides a method of encryption for encrypt-and-tag mode. The discussion of method 2400 will be in tandem with encryption algorithm E.

Encryption Algorithm E

---

Enc((LUT, KST, ctr), A, M)

---

1. If (ctr + len + 2 + len' + 2 ≥ ref_rate) ✗.
   a. Refresh Session Key (Execute Key Exchange Protocol.)
2. Compute nonce as N := KST[ctr] †.
3. Compute CRC on message M as T := CRC(N ∥ A ∥ M).
4. Parse M[1] ∥ M[2] ∥ ... ∥ M[len] := M.
5. Parse M'[1] ∥ M'[2] ∥ ... ∥ M'[len'] := T.
6. Initialize the temporary variable, temp := N ‡.
7. For i := 1,2, ... , len
   a. Parse $t_1$ ∥ $t_2$ ∥ ... ∥ $t_m$ := temp.
   b. Compute val := $t_1$ ⊕ $t_2$ ⊕ . . . ⊕$t_m$ ♠.
   c. Compute C[i] := temp := LUT[M[i] ⊕ val] ⊕ KST[ctr + i] ✠.
8. Compute C[len] := C[len] ⊕ KST[ctr + len + 1].
9. Initialize the temporary counter, ctr' := ctr + len + 2.
10. Initialize the temporary variable, temp' := KST[ctr'].
11. For i' := 1,2, ... , len'
    a. Parse $t'_1$ ∥ $t'_2$ ∥ · · · ∥ $t'_m$ := temp'.
    b. Compute val' := $t'_1$ ⊕ $t'_2$ ⊕ ... ⊕ $t'_m$♠.
    c. Compute C'[i'] := temp' := LUT[M'[i'] ⊕ val'] ⊕ KST [ctr' + i'] ✠.
12. Compute C'[len'] := C'[len'] ⊕ KST[ctr' + len' + 1].
13. Update counter ctr := ctr + len + 2 + len' + 2.
14. Compute ciphertext C :=
    C[1] ∥ C[2] ∥ ... ∥ C[len] ∥ C'[1] ∥ C'[2] ∥ ⋯ ∥ C'[len'].

-continued

---

Enc((LUT, KST, ctr), A, M)

---

15. Return C and ctr .
✗ : If counter is initialized as ctr := KST[0] mod $2^b$, then, depending on the implementation, the condition will be:
   a. (blk_ctr + len + 2 ≥ ref_rate), or
   b. (ctr + len + 2 − KST[0] ≥ ref_rate).
† : Nonce can also be randomized as:
   d. Compute b := N & 0x01.       (For the first value, N := KST[0])
   e. Compute idx := idx + 1.       (For the first value, idx := 0)
   f. Compute N := $PRNG_{1-b}$ ($r_b$ ∥ idx).
‡ : Variable temp can also be computed as temp := LUT[N].
♠: For some Integer s, variable val can also be computed as:
   val := $t_1$ ⊕ ($t_2$ << s) ⊕ ... ⊕ ($t_m$ << s(m − 1))
✠: C[i] can also be computed as:
   c. Compute temp := LUT[M[i] ⊕ val].
   d. Compute C[i] := temp ⊕ KST[ctr + i].

---

Encryption algorithm E has a number of changes relative to encryption algorithm A. But first, unchanged are methods 900 and 1000 for key generation for sender and receiver, respectively. Also, the inputs and outputs for encryption algorithm E are the same as for encryption algorithm A. These changes are discussed below in the context of the discussion of the operations of method 2400.

Algorithm E, as well as Algorithms F through H discussed below, have operations that specifically refer to a CRC. This is not intended to be limiting. The CRC is just one example of a tag algorithm. Those skilled in the art will recognize that where a CRC is specifically referred to, that other types of tag algorithms, such as hash functions, could be substituted.

Returning to reference FIG. 24, after a start operation 2401, method 2400 proceeds to operation 2402 of inputting the encryption key (LUT, KST, ctr), associated data A, and message M for encryption.

Control moves to operation 2404 of determining if the block count exceeds ref_rate, where ref_rate is the refresh rate of the session key. Encryption algorithm E makes this determination as: If (ctr+len+2+len'+2) is greater than or equal to ref_rate. A difference from encryption algorithm A is that len', the length of the CRC is included in the condition for refreshing the session key. And the additional 2 is for processing of a nonce and the last block of tag ciphertext (below).

If it is determined that the block count exceeds ref_rate, then control moves to operation 2406 for refreshing the session key. This is unchanged from method 1100 of FIG. 11 and reference is made to that discussion. After the session key is refreshed, control moves to operation 2408 below.

If it is determined that the block count does not exceed the ref_rate, then in operation 2408 nonce N is initialized. This operation is unchanged from operation 1110 of method 1100. Reference is made to the discussion of operation 1110.

Control moves to operation 2410 of computing tag T on N∥A∥M. This operation is unchanged from operation 1112 of method 1100. Reference is made to the discussion of operation 1112.

Control moves to operation 2414 of Parsing M into M[1], M[2], . . . , M[len]. This is different than operation 1114 where the concatenation of M∥T is parsed. In method 2400 the message M and the CRC are parsed separately. The message M is parsed in operation 2414 and the CRC is parsed in operation 2426 (discussed below).

Control moves to operation 2416 of initializing a counter variable i with 1.

A loop is executed that includes operation 2418 of determining if the counter i is less than or equal to the number of message blocks len. If the counter i is greater than len, the control moves to exiting the loop and proceeding to operation 2424 discussed below. If the counter i is less than or equal to len, then control stays in the loop to execute operation 2420 of computing ciphertext block C[i] and then to operation 2422 of updating the counter i. This loop is unchanged from operations 1118, 1120, and 1122 of method 1100 of FIG. 11, and reference is made to that discussion.

Control moves to operation 2424 of computing the last ciphertext block C[len]. This operation is unchanged from operation 1124 of method 1100. Reference is made to that discussion.

Control moves to operation 2426 which parses the tag T into tag blocks M'[1], M'[2], ... M'[len']. M'[ ] refers to tag blocks (i.e. the parsed blocks of tag) and len' is the number of tag blocks. In some embodiments, the size of the tag blocks is the same as the size of the message blocks and is governed by the value "b" discussed above. Operation 2426 corresponds to step 5 of encryption algorithm E.

Control moves to operation 2428 which initializes a counter variable i' to 1. Encryption algorithm E includes at step 9, initializing an additional counter $ctr':=ctr+len+2$, which is the current value of the counter ctr, plus len which is the number of message blocks, plus 2. Encryption algorithm E further includes initializing a temporary variable, temp' to KST[ctr'], which is the KST target value associated with a key value equal to ctr'.

A loop is executed that includes operation 2430 which determines if the counter i' is less than or equal to the number of tag blocks len'. If no, then control exits the loop and proceeds to operation 2436 discussed below. If yes, then control stays in the loop to execute operation 2432 which computes tag ciphertext block C'[i'] where C'[i'] is a tag ciphertext block (i.e. ciphertext of a tag block). The loop then continuing to operation 2434 which updates the counter i' before repeating the loop. The loop repeats until operation 2430 evaluates to yes, then control moves to operation 2436.

This loop is at least substantially similar to operations 1118, 1120, and 1122 of method 1100 of FIG. 11, except that the variable temp' replaces temp, temp' is parsed into t'[ ] blocks instead of t[ ] blocks and the variable val' replaces val. Therefore, reference is again made to that discussion.

After control exits the loop, operation 2436 processes the last tag ciphertext block C'[len']. This operation is substantially similar to operation 1124 of method 1100 except that the ciphertext block is C' instead of C, the number of blocks is len' for the number of CRC ciphertext blocks instead of len for the number of message blocks, and the counter variable used is ctr' instead of ctr. Reference is made to that discussion.

Control moves to operation 2438 of updating the counter ctr. In some embodiments, in accordance with encryption algorithm E, the update is $ctr:=ctr+len+2+len'+2$, which is the usual update from operation 1126 plus len' which is the number of tag blocks plus an additional 2 for processing of the nonce value and the last tag ciphertext block.

Control moves to operation 2440 of concatenating C[1], C[2], ... C[len] and C'[1], C'[2], ... C'[len'], to form the final ciphertext C. That is, the message ciphertext blocks corresponding to the message M are concatenated, the ciphertext blocks corresponding to the CRC (e.g. the tag) are concatenated, and then the tag ciphertext is appended to the message ciphertext to form the final ciphertext C.

Control moves to operation 2446 of outputting C and ctr before moving to a stop operation 2448.

Referencing FIG. 25, method 2500 provides a method of decryption for encrypt-and-tag mode. Method 2500 decrypts the ciphertext C output by method 2400. The discussion of method 2500 will be in tandem with decryption algorithm F.

Decryption Algorithm F

| Dec((LUT, KST, ctr), A,C) |
|---|
| 1. Compute nonce as N := KST [ctr] †. |
| 2. Parse C[1] ‖ C[2] ‖ ... ‖ C[len] ‖ C'[1] ‖ C'[2] ‖ ⋯ ‖ C'[len'] := C. |
| 3. Compute C[len] := C[len] ⊕ KST [ctr + len + 1]. |
| 4. Initialize the temporary variable, temp := N ‡. |
| 5. For i := 1,2, ... , len |
|    a. Parse $t_1 ‖ t_2 ‖ ... ‖ t_m$ := temp. |
|    b. Compute val := $t_1 ⊕ t_2 ⊕ ... ⊕ t_m$ ♠. |
|    c. Compute temp := C[i] ✠. |
|    d. Compute M[i] := $LUT^{-1}$[C[i] ⊕ KST[ctr + i]] ⊕ val ✠. |
| 6. Compute message M := M[1] ‖ M[2] ‖ ⋯ ‖ M[len]. |
| 7. Initialize the temporary counter, ctr' := ctr + len + 2 ‡. |
| 8. Compute C'[len'] := C'[len'] ⊕ KST[ctr' + len' + 1]. |
| 9. Initialize the temporary variable, temp' := KST[ctr'] ‡. |
| 10. For i' := 1,2, ⋯ , len' |
|    a. Parse $t'_1 ‖ t'_2 ‖ ⋯ ‖ t'_m$ := temp'. |
|    b. Compute val' := $t'_1 ⊕ t'_2 ⊕ ... ⊕ t'_m$♠. |
|    c. Compute temp' := C'[i'] ✠. |
|    d. Compute M'[i'] := $LUT^{-1}$[C'[i'] ⊕ KST[ctr' + i']] ⊕ val'✠. |
| 11. Extract T := M'[1] ‖ M' [2] ‖ ... ‖ M'[len']. |
| 12. Compute CRC on message M as T' := CRC(N ‖ A ‖ M). |
| 13. If (T == T') |
|    a. Update counter ctr := ctr + len + 2 + len' + 2. |
|    b. Return M and ctr. |
| 14. Else |
|    a. Return Error. |
| † : Nonce can also be randomized as: |
|    g. Compute b := N & 0x01.    (For the first value, N := KST[0]) |
|    h. Compute idx := idx + 1.    (For the first value, idx := 0) |
|    i. Compute N := $PRNG_{1-b}(r_b ‖ idx)$. |
| ‡ : Variable temp can also be computed as temp := LUT[N]. |
| ♠ : For some Integer s, variable val can also be computed as: |
|       val := $t_1 ⊕ (t_2 ≪ s) ⊕ ... ⊕ (t_m ≪ s(m - 1))$ |
| ✠ M[i] can also be computed as: |
|    e. Compute temp := C[i] ⊕ KST[ctr + i]. |
|    f. Compute M[i] := $LUT^{-1}$[temp] ⊕ val. |

Decryption algorithm F has a number of changes relative to decryption algorithm B. But first, unchanged are methods 900 and 1000 for key generation for sender and receiver, respectively. Also, the inputs and outputs for decryption algorithm F are the same as for decryption algorithm B. Changes from decryption algorithm B are discussed below in the context of the discussion of the operations of method 2500.

Returning to reference FIG. 25, after a start operation 2502, method 2500 proceeds to operation 2504 of inputting the decryption key (LUT, KST, ctr), associated data A, and ciphertext C for decryption.

Control moves to operation 2506 of initializing Nonce N. This operation is unchanged from operation 1206 of method 1200. Reference is made to that discussion.

Control moves to operation 2508 of parsing ciphertext C into ciphertext blocks, including message ciphertext blocks denominated C[ ] associated with the encrypted message and tag ciphertext blocks denominated C'[ ] associated with the encrypted tag. More specifically, in some embodiments, C is parsed into C[1], C[2], ... C[len] and C'[1], C'[2], ... C'[len']. In the foregoing, len is once again the number of ciphertext blocks associated with the message M and len' is the number of ciphertext blocks associated with the CRC.

Control moves to operation 2510 of processing the last message ciphertext block, C[len]. This operation is unchanged from operation 1210 of method 1200 and therefore reference is made to the discussion of operation 1210 above.

Control moves to operation 2512 of initializing counter variable i to 1. Consistent with some embodiments, decryption algorithm F also includes initializing a temp variable to be equal to nonce N. This operation is unchanged from that discussed in association with operation 1212 of method 1200. Reference is therefore made to the discussion related to operation 1212 above.

A loop is executed that includes operation 2514 of determining if the counter i is less than or equal to the number of message blocks len. If no, then control exists the loop and proceeds to operation 2520 (below). If yes, then control stays in the loop to execute operation 2516 which computes decrypted message block M[i] and then to operation 2518 which updates the counter i. This loop is unchanged from operations 1214, 1216, and 1218 of method 1200 and reference therefore is made to that discussion regarding method 1200.

Upon exiting the above loop, control moves to operation 2520 of concatenating the message blocks M[1], M[2], . . . , M[len] to form the complete decrypted message M. Operation 2520 is different from operation 1220 of method 1200 in that the concatenated message blocks form only message M. In operation 1220 the concatenated blocks form a concatenation of the message M and a tag T, as in M∥T. However, in method 2500 the processing of tag ciphertext blocks is performed separately.

The processing of the tag ciphertext blocks begins, in some embodiments, with operation 2522 of processing the last tag ciphertext block, that is C'[len']. Except for the substitution of len' for len and C' for C, this operation is unchanged from operation 1210 of method 1200. Reference is made to discussion of operation 1210.

Consistent with some embodiments, decryption algorithm F also includes initializing a counter ctr'. In some particular embodiments, this takes the form of, for example, ctr':=ctr+len+2, which is the counter ctr plus len for the number of message blocks plus 2 for the processing of the nonce in operation 2506 and the last message ciphertext block in operation 2510.

Control moves to operation 2524 of initializing counter variable i' with 1. Consistent with some embodiments, decryption algorithm F also includes initializing a variable temp' as equal to KST[ctr'].

A loop is executed that includes operation 2526 of determining if the counter i' is less than or equal to len', which is the number of tag ciphertext blocks. If no, then control exits the loop and proceeds to operation 2532 (below). If yes, then control stays in the loop to execute operation 2528 of computing decrypted tag block M'[i] and then to operation 2530 which updates the counter i'. This loop is analogous to the operations 1214, 1216, and 1218 of method 1200, except that the variable temp' is substituted for temp, temp' is parsed into t'[ ] blocks instead of t[ ] blocks and the variable val' is substituted for val. With those changes in mind, reference therefore is made to that discussion regarding method 1200.

Control moves to operation 2532 which concatenates the decrypted tag blocks M'[1], M'[2], . . . M'[len'] to obtain the complete decrypted tag T (e.g. a CRC). This is different from operation 1220 of method 1200 where the concatenated blocks M[1], M[2], . . . M[len] yielded a concatenation of the message and the tag, as in M∥T. In operation 2500 the ciphertext blocks associated with the tag T are processed separately from the ciphertext blocks associated with the message M.

Control moves to operation 2534 of computing a tag T' (e.g a CRC) on N∥A∥M. This step is at least similar to the operation 1222 of the method 1200. Reference is made to that discussion.

Control moves to operation 2536 of determining if the computed tag T' is equal to the decrypted tag T. If no, then control moves to operation 2542 of outputting an error message and then to stop operation 2544.

If yes, then control moves to operation 2538 of updating the counter ctr. Referencing decryption algorithm F, in some embodiments, operation 2538 is performed by ctr:=ctr+len+2+len'+2, which includes the usual update of ctr plus the number of tag blocks plus 2 for the processing of the nonce and the last tag ciphertext block. Control then moves to operation 2540 which is the outputting of M and ctr. Finally, there is a stop operation 2544.

Referencing FIG. 26, method 2600 provides a method of encryption for encrypt-then-tag mode. In this mode, encryption of a message M and computation of a tag T on the encrypted message is performed first before they are joined to form a final ciphertext C. The discussion of method 2600 will be in tandem with encryption algorithm G

Encryption Algorithm G

| Enc((LUT, KST, ctr), A, M) |
|---|
| 1. If (ctr + len + 2 + len' + 2 ≥ ref_rate) ✗. |
|   a. Refresh Session Key (Execute Key Exchange Protocol.) |
| 2. Compute nonce as N := KST [ctr] †. |
| 3. Parse M[1] ∥ M[2] ∥ ⋯ ∥ M[len] := M. |
| 4. Initialize the temporary variable, temp := N ‡. |
| 5. For i := 1,2, ... , len |
|   a. Parse $t_1 \parallel t_2 \parallel \cdots \parallel t_m$ := temp. |
|   b. Compute val := $t_1 \oplus t_2 \oplus ... \oplus t_m$ ♠. |
|   c. Compute C[i] := temp := LUT[M[i] ⊕ val] ⊕ KST[ctr + i] ✗. |
| 6. Compute C[len] := C[len] ⊕ KST[ctr + len + 1]. |
| 7. Compute ciphertext C := C[1] ∥ C[2] ∥ ⋯ ∥ C[len]. |
| 8. Compute CRC on ciphertext C as T := CRC(N ∥ A ∥ C). |
| 9. Parse M'[1] ∥ M'[2] ∥ ... ∥ M'[len] := T. |
| 10. Initialize the temporary counter, ctr' := ctr + len + 2. |
| 11. Initialize the temporary variable, temp' := KST[ctr']❀. |
| 12. For i' := 1,2, ... , len' |
|   a. Parse $t'_1 \parallel t'_2 \parallel ... \parallel t'_m$ := temp'. |
|   b. Compute val' := $t'_1 \oplus t'_2 \oplus ... \oplus t'_m$♠. |
|   c. Compute C'[i'] := temp' := LUT[M'[i'] ⊕ val'] ⊕ KST[ctr' + i'] ✗. |
| 13. Compute C'[len'] := C'[len'] ⊕ KST[ctr' + len' + 1]. |
| 14. Update counter ctr := ctr + len + 2 + len' + 2. |
| 15. Compute ciphertext C := C ∥ C'[1] ∥ C'[2] ∥ ⋯ ∥ C'[len']. |
| 16. Return C and ctr. |
| ✗ : If counter is initialized as ctr := KST[0] mod $2^b$, then, depending on the implementation, the condition will be: |
|   a. (blk_ctr + len + 2 ≥ ref_rate), or |
|   b. (ctr + len + 2 − KST[0] ≥ ref_rate). |
| † : Nonce can also be randomized as: |
|   g. Compute b := N & 0x01. (For the first value, N := KST[0]) |
|   h. Compute idx := idx + 1. (For the first value, idx := 0) |
|   i. Compute N := $PRNG_{1-b}(r_b \parallel idx)$. |
| ‡ : Variable temp can also be computed as temp := LUT[N]. |
| ❀: temp' can also be initialized as C [len]. This will reduce the cost of invoking one PRNG. |
| ♠ : For some Integer s, variable val can also be computed as: |
|     val := $t_1 \oplus (t_2 \ll s) \oplus \cdots \oplus (t_m \ll s(m - 1))$ |
| ✗ : C[i] can also be computed as: |
|   e. Compute temp := LUT[M[i] ⊕ val]. |
|   f. Compute C[i] := temp ⊕ KST[ctr + i]. |

Encryption algorithm G has a number of changes relative to encryption algorithm A. But first, unchanged are methods 900 and 1000 for key generation for sender and receiver, respectively. Also, the inputs and outputs for encryption algorithm G are the same as for encryption algorithm A. These changes from encryption algorithm A are discussed below in the discussion of the operations of method 2600.

Returning to reference FIG. 26, after a start operation 2602, the control moves to operation 2604 of inputting the encryption key (LUT, KST, ctr), associated data A, and message M to be encrypted.

Control moves to operation 2606 of determining if a block count exceeds the session key refresh rate, ref_rate. Consistent with some embodiments, Encryption algorithm G makes this determination as: If (ctr+len+2+len'+2) is greater than or equal to ref_rate. A difference from encryption algorithm A is that len', the number of the tag blocks plus an additional 2, for processing the nonce and the last block of ciphertext is included in the condition for refreshing the session key.

If operation 2606 evaluates to yes, then control moves to operation 2608 of refreshing the session key. Operation 2608 is unchanged from operation 1108 of method 1100. Therefore, the discussion of operation 1100 is referenced. After the refreshing of the session key, control moves to operation 2610 below.

Returning to operation 2606, if operation 2606 evaluates to no, the control moves to operation 2610 of initializing Nonce N. Operation 2610 is unchanged from operation 1110 of method 1100. Therefore, reference is made to the discussion above of operation 1110.

Control moves to operation 2612 of Parsing M into M[1], M[2], . . . , M[len]. This is different than operation 1114 where the concatenation of M||T is parsed. In method 2600, the message M and the tag (e.g. CRC) are parsed separately.

Control moves to operation 2614 of initializing a counter variable i with 1. For some specific embodiments, encryption algorithm G also initializes temporary variable temp to nonce N.

A loop is executed that includes operation 2616 of determining if the counter i is less than or equal to the number of message blocks len. If no, control exits the loop and proceeds to operation 2622 (below). If yes, then control stays in the loop to execute operation 2618 which encrypts message block M[i] to compute message ciphertext block C[i] and then to operation 2620 which updates the counter i. The loop is repeated with i incremented on each loop until operation 2616 evaluates to no and control exits the loop. This loop is unchanged from operations 1118, 1120, and 1122 of method 1100 of FIG. 11, and reference is made to that discussion.

Control moves to operation 2622 of computing the last message ciphertext block C[len]. This operation is unchanged from operation 1124 of method 1100. Reference is made to that discussion.

Control moves to operation 2624 of concatenating message ciphertext blocks C[1], C[2], . . . C[len] to obtain C, which is a ciphertext of just message M. This is different from operation 1128 of method 1100 where the concatenation of the C[ ] blocks yields a ciphertext of a concatenation of a message M and a tag T, that is M||T. This operation 2624 concludes the encrypting of the message M. The next operations include computing and encrypting a tag T.

Control moves to operation 2626 of computing a tag T (e.g. a CRC) on N||A||C, where C is the message ciphertext computed above. Then in operation 2628, T is parsed into tag blocks (denominated M'[ ]), that is M'[1], M'[2], . . . M'[len'].

Control moves to operation 2630 of initializing a counter variable i' to 1. Encryption algorithm G includes initializing an additional counter ctr':=ctr+len+2, which is the current value of the counter ctr, plus len which is the number of message blocks, plus 2. Encryption algorithm G further includes initializing a temporary variable, temp' to KST [ctr'].

A loop is executed that includes operation 2632 of determining if the counter i' is less than or equal to the number of tag blocks, which is len'. If no, control exits the loop and proceeds to operation 2638 (below). If yes, then control stays in the loop to execute operation 2634 of encrypting tag block M'[i'] to compute tag ciphertext block C'[i']. The loop then continues to operation 2636 which updates the counter i' before repeating the loop. The loop repeats until the counter i' exceeds len', then control moves to operation 2638.

This loop is at least substantially similar to operations 1118, 1120, and 1122 of method 1100, except that the variable temp' replaces temp, temp' is parsed into t'[ ] blocks instead of t[ ] blocks and the variable val' replaces val. Therefore, reference is again made to that discussion of operations 1118, 1120, and 1122.

After control exits the loop, operation 2638 processes the last tag ciphertext block C'[len']. This operation is substantially similar to operation 1124 of method 1100 except that the ciphertext block is C' instead of C, the number of blocks is len' for the number of tag ciphertext blocks instead of len for the number of message blocks, and the counter variable used is ctr' instead of ctr. Reference is made to that discussion of operation 1100.

Control moves to operation 2640 of updating the counter ctr. In some embodiments, in accordance with encryption algorithm G, the update is ctr:=ctr+len+2+len'+2, which in addition to the usual update from operation 1126 includes adding len' which is the number of tag blocks plus an additional 2 for processing of the nonce value and the last tag ciphertext block.

Control moves to operation 2642 of appending C'[1], C'[2], . . . C'[len'], to C to form the final ciphertext C.

Control moves to operation 2644 of outputting C and ctr before moving to a stop operation 2646.

Referencing FIG. 27, method 2700 provides a method of decryption for encrypt-then-tag mode. Method 2700 is directed at verifying and decrypting the ciphertext C created in method 2600. The discussion of method 2700 will be in tandem with decryption algorithm H.

Decryption Algorithm H

| Dec((LUT, KST, ctr), A,C) |
| --- |
| 1. Compute nonce as N := KST[ctr] †. |
| 2. Parse C ‖ C'[1] ‖ C'[2] ‖ ⋯ ‖ C'[len'] := C. |
| 3. Initialize the temporary counter, ctr' := ctr + len + 2 ‡. |
| 4. Compute C'[len'] := C'[len'] ⊕ KST[ctr' + len' + 1]. |
| 5. Initialize the temporary variable, temp' := KST[ctr'] 🐚. |
| 6. For i' := 1,2, ... , len' |
|   a. Parse t'₁ ‖ t'₂ ‖ ⋯ ‖ t'_m := temp'. |
|   b. Compute val' := t'₁ ⊕ t'₂ ⊕ ... ⊕ t'_m ♠. |
|   c. Compute temp' := C'[i'] ⚒. |
|   d. Compute M'[i'] = LUT⁻¹[C'[i'] ⊕ KST[ctr' + i']] ⊕ val' ⚒. |
| 7. Extract T := M'[i'] ‖ M'[2] ‖ ⋯ ‖ M'[len']. |
| 8. Compute CRC on ciphertext C as T' := CRC(N ‖ A ‖ C). |
| 9. If (T ≠ T') |
|   a. Return Error. |
| 10. Parse C[1] ‖ C[2] ‖ ⋯ ‖ C[len] := C. |
| 11. Compute C[len] := C[len] ⊕ KST[ctr + len + 1]. |
| 12. Initialize the temporary variable, temp := N ‡. |
| 13. For i := 1,2, ... , len |
|   a. Parse t₁ ‖ t₂ ‖ ... ‖ t_m := temp. |
|   b. Compute val := t₁ ⊕ t₂ ⊕ ... ⊕ t_m ♠. |

-continued

| Dec((LUT, KST, ctr), A,C) |
|---| c. Compute temp := C[i] ✠.
d. Compute M[i] := LUT$^{-1}$[C[i] ⊕ KST[ctr + i]] ⊕ val ♠.
14. Compute message M := M[1] ‖ M[2] ‖ ⋯ ‖ M[len].
15. Update counter ctr := ctr + len + 2 + len' + 2.
16. Return M and ctr.
† : Nonce can also be randomized as:
    a. Compute b := N & 0x01.    (For the first value, N := KST[0])
    b. Compute idx := idx + 1.    (For the first value, idx := 0)
    c. Compute N := PRNG$_{1-b}$(r$_b$ ‖ idx).
✐: temp' can also be initialized as C[len]. This will reduce the cost of invoking one PRNG.
‡ : Variable temp can also be computed as temp := LUT[N].
♠ : For some Integer s, variable val can also be computed as:
$$val = t_1 \oplus (t_2 \ll s) \oplus \cdots \oplus (t_m \ll s(m-1))$$
✠: M[i] can also be computed as:
    a. Compute temp := C[i] ⊕ KST[ctr + i].
    b. Compute M[i] = LUT$^{-1}$[temp] ⊕ val.

Decryption algorithm H has a number of changes relative to decryption algorithm B. But first, methods 900 and 1000 for key generation for sender and receiver, respectively are unchanged. Also, the inputs and outputs for decryption algorithm H are the same as for decryption algorithm B. The changes relative to decryption algorithm B are discussed below in the discussion of the operations of method 2700.

Returning to reference method 2700, after a start operation 2702, the control moves to operation 2704 of inputting the decryption key (LUT, KST, ctr), associated data A, and ciphertext C to be decrypted.

Control moves to operation 2706 of initializing Nonce N. This operation is unchanged from operation 1206 of method 1200. Reference is made to that discussion.

Control moves to operation 2708 of parsing ciphertext C into message ciphertext C and tag ciphertext blocks C'[1], C'[2], . . . C'[len'], len' is the number of tag ciphertext blocks. That is tag ciphertext C' (encrypted tag) which was previously appended to C is removed and parsed. The result is message ciphertext C and C'[1], C'[2], . . . C'[len'].

Control moves to operation 2710 of processing the last tag ciphertext block, C'[len']. Consistent with some embodiments, decryption algorithm H performs this operation by first initializing a temporary counter ctr':=ctr+len+2, where ctr is the current value of counter and len is the number of message ciphertext blocks. Then the following computation is performed: C'[len']:=C'[len']⊕KST[ctr'+len'+1], len' is the number of tag ciphertext blocks. Thus, the last tag ciphertext block C'[len'] is set to C'[len'] XOR'd with the subexpression KST[ctr'+len'+1]. The KST[ctr'+len'+1] is the target value in the KST associated with a key equal to (ctr'+len'+1). This reverses the computation of the last tag ciphertext block in operation 2638.

Control moves to operation 2712 of initializing a counter variable i' with 1. Consistent with some embodiments, decryption algorithm H also initializes a temp' variable as equal to KST[ctr']. In another embodiment, the variable temp' could be initialized as equal to C[len], that is the last w bits of the message ciphertext C. A difficulty is that according to FIG. 27, ciphertext C is not parsed until operation 2728 (below). There are at least two possible solutions. A first solution is to access the last w bits of C directly, regardless of whether C is parsed or not. It will be recalled that w is the length in bits of the ciphertext blocks (See discussion of w bits relative to FIG. 5). A second solution is to move operation 2728 to occur before operation 2712. Decryption algorithm H also initializes counter variable ctr' as ctr+len+2.

A loop is executed that includes operation 2714 which determines if the counter i' is less than or equal to the number of tag ciphertext blocks len'. If no, then control exits the loop and proceeds to operation 2720 (below). If yes, then control stays in the loop to execute operation 2716 of decrypting tag ciphertext block C'[i'] to compute decrypted tag block M'[i'] and then to operation 2718 of updating the counter i'. The loop is repeated until operation 2714 evaluates to no. This loop is analogous to the operations 1214, 1216, and 1218 of method 1200, except that the variable temp' is substituted for temp, temp' is parsed into t'[ ] blocks instead of t[ ] blocks and the variable val' is substituted for val. With those changes in mind, reference therefore is made to that discussion regarding method 1200.

Control moves to operation 2720 of concatenating the decrypted tag blocks M'[1], M'[2], . . . M'[len'] to obtain the complete tag T. As will be recalled, in operation 2626 of method 2600, the tag T was computed on N‖A‖C, that is partly on the ciphertext. Therefore, the tag T is a tag partly on ciphertext. The foregoing is in contrast to operation 1220 of method 1200 where the concatenated blocks M[1], M[2], . . . M[len] yielded a concatenation of the message and the tag, as in M‖T. And in operation 1220, the tag was on N‖A‖M, partly on the message, not on ciphertext.

Control moves to operation 2722 which computes a tag T' (e.g a CRC) on N‖A‖C.

Control moves to operation 2724 which determines if the computed tag T' is equal to the decrypted tag T. If no, then control moves to operation 2726 of outputting an error message, and then to stop operation 2746.

If the operation 2724 evaluates to yes, then control moves to operation 2728 of parsing message ciphertext C into message ciphertext blocks C[1], C[2], . . . C[len].

Control moves to operation 2730 of processing the last message ciphertext block C[len]. This operation is unchanged from operation 1210 of method 1200 and therefore reference is made to the discussion of operation 1210 above.

Control moves to operation 2732 of initializing counter variable i to 1. Consistent with some embodiments, decryption algorithm H includes initializing a temp variable to be equal to nonce N. This operation is unchanged from that discussed in association with operation 1212 of method 1200. Reference is therefore made to the discussion related to operation 1212 above.

A loop is executed that includes operation 2734 of determining if the counter i is less than or equal to the number of message blocks, len. If no, control exits the loop and proceeds to operation 2740 (below). If yes, then control stays in the loop to execute operation 2736 of decrypting C[i] to compute decrypted message block M[i] and then to operation 2738 of updating the counter i. The loop repeats until operation 2734 evaluates to no. This loop is unchanged from operations 1214, 1216, and 1218 of method 1200 and reference therefore is made to that discussion regarding method 1200.

Upon exiting the above loop, control moves to operation 2740 which concatenates the message blocks M[1], M[2], . . . , M[len] to form the complete decrypted message M. Operation 2740 is different from operation 1220 of method 1200 in that the concatenated message blocks form only message M. In operation 1220, the concatenated blocks form a concatenation of the message M and a tag T, as in M‖T.

Control moves to operation 2742 of updating counter ctr. Consistent with some embodiments, decryption algorithm H updates counter with the following formula: ctr:=ctr+len+2+len'+2. Thus, the ctr update additionally includes adding the number of tag blocks len' plus an additional 2 for the processing of the nonce and the last tag ciphertext block.

Control moves to operation 2744 which outputs M and ctr as the output of method 2700. Control then moves to a stop operation 2746.

Some embodiments are now discussed. In discussing exemplary methods or circuits, exemplary structures that could perform some actions or perform some functions are discussed. The discussion of structures is not intended to be limiting or exhaustive. Those skilled in the art will appreciate that depending on context, other structures could also be used.

In some embodiments, a cryptographic method (e.g. method 2400) is performed in a first chiplet. The cryptographic method includes at least (1) with one or more processing devices, computing a tag on a nonce (e.g. 119), a message (e.g. 117), and other data (e.g. associated data 121), (2) parsing the message into one or more message blocks to create one or more ordered message blocks (e.g. blocks M[0], M[1], etc. of FIG. 5), (3) encrypting the one or more ordered message blocks to obtain one or more ordered message ciphertext blocks, the encryption including at least one or more operations that include at least one or more XOR operations, (4) parsing the tag into one or more tag blocks to create one or more ordered tag blocks, (5) encrypting the one or more ordered tag blocks to obtain one or more ordered tag ciphertext blocks, the encryption including at least one or more operations that include at least one or more XOR operations, (6) concatenating the one or more ordered message ciphertext blocks with the one or more ordered tag ciphertext blocks to obtain final ciphertext, and (7) transmitting the final ciphertext to a second chiplet.

In some further embodiments, the cryptographic method includes at least one of a) computing a CRC on a concatenation that includes at least the nonce, the message, and the other data, or b) computing a hash with a hash function on a concatenation that includes at least a the nonce, the message, and other data.

In some further embodiments, the cryptographic method includes at least wherein the encrypting the one or more ordered message blocks to obtain one or more ordered message ciphertext blocks, the encryption including at least one or more operations that include at least one or more XOR operations includes at least a) obtaining one or more substitute values (e.g. encryption circuit 810 with LUT, encryption circuit 2010 with space-saver circuit 2059 with r0 2017) corresponding to the one or more ordered message blocks, b) obtaining, via a keystream table (KST), one or more target values corresponding to one or more position values, a given position value of the one or more position values being associated with a position of a given message block within the one or more ordered message blocks, c) performing one or more operations that include at least one or more XOR operations to obtain the ordered message ciphertext blocks, the one or more XOR operations performed at least partly with (i) the one or more substitute values and (ii) the one or more target values. In some further particular embodiments, the obtaining one or more substitute values corresponding to the one or more ordered message blocks includes at least one of a) obtaining the one or more substitute values from a dynamic substitution box (e.g. encryption circuit 810) or b) computing the one or more substitute values as needed without accessing a dynamic substitution box (e.g. encryption circuit 2010).

In some further embodiments, the cryptographic method includes at least wherein encrypting the one or more ordered tag blocks to obtain one or more ordered tag ciphertext blocks, the encryption including at least one or more operations that include at least one or more XOR operations includes at least a) obtaining one or more substitute values (e.g. encryption circuit 810 with LUT, encryption circuit 2010 with space-saver circuit 2059 with r0 2017) corresponding to the one or more ordered tag blocks, b) obtaining, via a keystream table (KST), one or more target values corresponding to one or more position values, a given position value of the one or more position values being associated with a position of a given tag block within the one or more ordered tag blocks, and c) performing one or more operations that include at least one or more XOR operations to obtain the one or more ordered tag ciphertext blocks, the one or more XOR operations performed at least partly with (i) the one or more substitute values and (ii) the one or more target values. In some further particular embodiments, the obtaining one or more substitute values corresponding to the one or more ordered tag blocks includes at least one of a) obtaining the one or more substitute values from a dynamic substitution box (e.g. encryption circuit 810), or b) computing the one or more substitute values as needed without accessing a dynamic substitution box (e.g. encryption circuit 2010).

In some further embodiments, the cryptographic method (e.g. method 2500) further includes at least a) receiving a ciphertext from the second chiplet, b) parsing the ciphertext into at least tag ciphertext and message ciphertext, c) decrypting the tag ciphertext to obtain a decrypted tag, the decryption including at least one or more operations that include at least one or more XOR operations; d) decrypting the message ciphertext to obtain a message, the decryption including at least one or more operations that include at least one or more XOR operations, e) computing a tag based on the nonce (e.g. 119), the message (e.g. 117) and the other data (e.g. associated data 121) to obtain a computed tag, f) attempting to verify the message with a comparison of the decrypted tag with the computed tag, g) outputting an error if the verification is unsuccessful, and h) outputting the message if the verification is successful.

In some further particular embodiments, the cryptographic method further includes at least wherein the decrypting the tag ciphertext to obtain a tag, the decryption including at least one or more operations that include at least one or more XOR operations includes at least a) parsing the tag ciphertext into one or more ordered blocks of tag ciphertext, b) obtaining, from an inverse lookup table, one or more original values using one or more substitute values as keys into the inverse lookup table, c) obtaining, via a keystream table (KST), one or more target values corresponding to one or more position values, a given position value of the one or more position values being associated with a position of a given tag ciphertext block within the one or more ordered blocks of tag ciphertext, and d) performing one or more operations that include at least one or more XOR operations to obtain one or more ordered blocks of decrypted tag, the one or more XOR operations being performed with at least (i) the one or more substitute values and (ii) the one or more target values.

In some further particular embodiments, the cryptographic method further includes at least wherein decrypting the message ciphertext to obtain a message, the decryption including at least one or more operations that include at least one or more XOR operations includes at least a) parsing the message ciphertext into one or more ordered blocks of message ciphertext, b) obtaining, from an inverse lookup table, one or more original values using one or more substitute values as keys into the inverse lookup table, c)

obtaining, from a keystream table (KST), one or more target values corresponding to one or more position values, a given position value of the one or more position values being associated with a position of a given message ciphertext block within the one or more ordered blocks of message ciphertext, and d) performing one or more operations that include at least one or more XOR operations to obtain the one or more ordered blocks of message, the one or more XOR operations being performed with at least (i) the one or more substitute values and (ii) the one or more target values.

A cryptographic method (e.g. method 2600) is performed in a first chiplet. The method includes at least (1) receiving a message for encryption, (2) encrypting the message to obtain message ciphertext, the encryption including at least one or more operations that include at least one or more XOR operations, (3) computing a tag on a concatenation that includes at least a nonce (e.g. 119), the message ciphertext (computed above in step 2), and other data (e.g. associated data 121), (4) encrypting the tag to obtain one or more ordered blocks of tag ciphertext, the encryption including at least one or more operations that include at least one or more XOR operations, (5) appending the one or more ordered blocks of tag ciphertext to the message ciphertext to obtain final ciphertext, and (6) transmitting the final ciphertext to a second chiplet.

In some embodiments, the cryptographic method further includes at least wherein the computing a tag on a concatenation that includes at least a nonce, the message ciphertext, and other data includes at least one of a) computing a CRC on a concatenation that includes at least a nonce, the message ciphertext, and other data, or b) computing a hash with a hash function on a concatenation that includes at least a nonce, the message ciphertext, and other data.

In some embodiments, the cryptographic method further includes at least wherein the encrypting the message to obtain message ciphertext, the encryption including at least one or more operations that include at least one or more XOR operations includes at least a) parsing the message to obtain at least one or more ordered message blocks, b) obtaining one or more substitute values (e.g. encryption circuit 810 with LUT, encryption circuit 2010 with space-save circuit 2059 with r0 2017) corresponding to the one or more ordered message blocks, c) obtaining, via a keystream table (KST), one or more target values associated with one or more position values, a given position value of the one or more position values being associated with a position of a given message block within the one or more ordered message blocks, d) performing one or more operations that include at least one or more XOR operations to obtain one or more ordered message ciphertext blocks, the one or more XOR operations being performed with at least (i) the one or more substitute values and (ii) the one or more target values, and e) concatenating the one or more ordered blocks of message ciphertext to obtain the message ciphertext. In some further particular embodiments the cryptographic method further includes at least wherein the obtaining one or more substitute values corresponding to the one or more ordered message blocks includes at least one of a) obtaining the one or more substitute values from a dynamic substitution box (e.g. encryption circuit 810), or b) computing the one or more substitute values as needed without accessing a dynamic substitution box (e.g. encryption circuit 2010).

In some embodiments, the cryptographic method further includes at least wherein encrypting the tag to obtain one or more ordered blocks of tag ciphertext, the encryption including at least one or more operations that include at least one or more XOR operations includes at least a) parsing the tag to obtain at least one or more ordered tag blocks, b) obtaining one or more substitute values (e.g. encryption circuit 810 with LUT, encryption circuit 2010 with space-save circuit 2059 with r0 2017) corresponding to the one or more ordered tag blocks, c) obtaining, via a keystream table (KST), one or more target values corresponding to one or more position values, a given position value of the one or more position values being associated with a position of a tag block within the one or more ordered tag blocks, and d) performing one or more operations that include at least one or more XOR operations to obtain the one or more ordered tag ciphertext blocks, the one or more XOR operations performed at least partly with (i) the one or more substitute values and (ii) the one or more target values. In some further particular embodiments, the cryptographic method further includes at least wherein the obtaining one or more substitute values corresponding to the one or more ordered tag blocks includes at least one of a) obtaining the one or more substitute values from a dynamic substitution box (e.g. encryption circuit 810), or b) computing the one or more substitute values as needed without accessing a dynamic substitution box (e.g. encryption circuit 2010).

In some embodiments, the cryptographic method (e.g. method 2700) further includes at least a) receiving a ciphertext from the second chiplet, the ciphertext being a concatenation of a tag ciphertext and a message ciphertext, wherein the tag ciphertext is encryption of a tag previously computed on a concatenation of the message ciphertext, a nonce (e.g. 119), and other data (e.g. associated data 121), b) parsing the ciphertext into (i) one or more ordered blocks of tag ciphertext and (ii) the message ciphertext, c) decrypting the one or more ordered blocks of tag ciphertext to obtain a decrypted tag, the decryption including at least one or more operations that include at least one or more XOR operations, d) computing a tag based on the message ciphertext, the nonce (e.g. 119), and the other data (e.g. associated data 121) to obtain a computed tag, e) attempting verification of the message ciphertext by comparing the decrypted tag with the computed tag, f) outputting an error if the verification is unsuccessful, and g) if the verification is successful: (i) decrypting the message ciphertext to obtain a message, the decryption including at least one or more operations that include at least one or more XOR operations, and (ii) outputting the message.

In some particular embodiments, the cryptographic method further includes at least wherein the decrypting the one or more ordered blocks of tag ciphertext to obtain a decrypted tag, the decryption including at least one or more operations that include at least one or more XOR operations includes at least a) obtaining, from an inverse lookup table, one or more original values using one or more substitute values as keys into the inverse lookup table, b) obtaining, from a keystream table (KST), one or more target values corresponding to one or more position values, a given position value of the one or more position values being associated with a position of a given tag ciphertext block within the one or more ordered blocks of tag ciphertext, c) performing one or more operations that include at least one or more XOR operations to obtain one or more ordered tag blocks, the one or more XOR operations performed at least partly with at least (i) the one or more original values corresponding to substitute values and (ii) the one or more target values, and d) concatenating the one or more ordered tag blocks to obtain the decrypted tag.

In some particular embodiments, the cryptographic method further includes at least wherein decrypting the message ciphertext to obtain a message, the decryption including at least one or more operations that include at least one or more XOR operations includes at least a) parsing the message ciphertext to obtain one or more ordered message ciphertext blocks; b) obtaining, from an inverse lookup table, one or more original values using one or more substitute values as keys into the inverse lookup table, c) obtaining, from a keystream table (KST), one or more target values corresponding to one or more position values, a given position value of the one or more position values being associated with a position of a given message ciphertext block within the one or more ordered blocks of message ciphertext, d) performing one or more operations that include at least one or more XOR operations to obtain one or more ordered message blocks, the one or more XOR operations performed at least partly with at least (i) the one or more substitute values and (ii) the one or more target values, and e) concatenating the one or more ordered message blocks to obtain the decrypted message.

In some embodiments, a chiplet includes at least (1) a receiving circuitry (e.g. Communication sub-chiplet 113, bus controller 146, communication bus 156) configured for receiving a message for encryption, (2) encryption circuitry configured for encrypting the message to obtain message ciphertext, the encryption including at least one or more operations that include at least one or more XOR operations (e.g. encryption circuit 810), (3) tag circuitry configured for computing a tag on a concatenation that includes at least a nonce, the message ciphertext, and other data (e.g. CRC 122), (4) encryption circuitry configured for encrypting the tag to obtain one or more ordered blocks of tag ciphertext, the encryption including at least one or more operations that include at least one or more XOR operations (e.g. encryption circuit 810), (5) processing circuitry configured for appending the one or more ordered blocks of tag ciphertext to the message ciphertext to obtain final ciphertext (e.g. secure host 104, encryption circuit 810), and (6) transmitting circuitry configured for transmitting the final ciphertext to a second chiplet (e.g. communication sub-chiplet 113, bus controller 146, communication bus 156) (See e.g. method 2600).

In some embodiments the chiplet further includes at least (1) receiving circuitry configured for receiving a ciphertext from the second chiplet (e.g. e.g. Communication sub-chiplet 113, bus controller 146, communication bus 156), the ciphertext being a concatenation of a tag ciphertext and a message ciphertext, wherein the tag ciphertext is ciphertext of a tag previously computed on a concatenation of the message ciphertext, a nonce, and other data, (2) parsing circuitry configured for parsing the ciphertext into (i) one or more ordered blocks of tag ciphertext and (ii) the message ciphertext (e.g. secure host 104, TX circuit 830), (3) decryption circuitry configured for decrypting the one or more ordered blocks of tag ciphertext to obtain a decrypted tag, the decryption including at least one or more operations that include at least one or more XOR operations, (decryption circuit 840), (4) tag circuitry configured for computing a tag based on the message ciphertext, the nonce, and the other data to obtain a computed tag (CRC 122), (5) verification circuitry configured for attempting verification of the message ciphertext by comparing the decrypted tag with the computed tag (e.g. secure host 104), (6) error detecting circuitry configured for outputting a error if the verification is unsuccessful (e.g. secure host 104), and (7) the verification circuitry configured for if the verification is successful (e.g. secure host 1040, causing: (i) decryption circuitry (e.g. decryption circuit 840) configured for decrypting the message ciphertext to obtain a message, the decryption including at least one or more operations that include at least one or more XOR operations, the decryption circuitry configured to be responsive, at least in part to the verification circuitry, and (ii) transmission circuitry (e.g. RX circuit 830) configured for outputting the message, the decryption circuitry configured to be responsive, at least in part to the verification circuitry (See, e.g. method 2700).

It will be understood by those skilled in the art that the terminology used in this specification and in the claims is "open" in the sense that the terminology is open to additional elements not enumerated. For example, the word "includes" should be interpreted to mean "including at least" and so on. Even if "includes at least" is used sometimes and "includes" is used other times, the meaning is the same: includes at least. In addition, articles such as "a" or "the" should be interpreted as not referring to a specific number, such as one, unless explicitly indicated. At times a convention of "at least one of A, B, or C" is used, the intent is that this language includes any combination of A, B, C, including, without limitation, any of A alone, B alone, C alone, A and B, B and C, A and C, all of A, B, and C or any combination of the foregoing, such as for example AABBC, or ABBBCC. The same is indicated by the conventions "one of more of A, B, or C" and "and/or".

In addition, references to circuits, such as for example TX circuit, RX circuit, encryption circuit, decryption circuit, or LUT space-saver circuit, refer to circuitry for causing a chiplet to perform their respective functions. In some embodiments, these circuits are implemented as sub-chiplets, In some embodiments, these circuits have internal logic. In some embodiments, these circuits include a link to secure host for processing and are associated with executable instructions stored in memory. These executable instructions when executed would cause secure host to perform the respective functions. In some embodiments, these circuits instead contain or are configured to access hard-wired logic. And some embodiments contain a combination of executable instructions and hard-wired logic. In some embodiments, these circuits may be part of a processing device, such as a CPU, a processor, a controller, a field-programmable gate array, or hard-wired logic. These circuits may contain memory, may be configured to access stored memory, may be configured to access remote memory, or may not contain or access memory, dependent on their function.

Various functional logic blocks, such as for example, a TRNG engine may, in some embodiments, be implemented as circuits. And the above discussion of circuits would be fully applicable.

Although embodiments have been described in detail, it should be understood that various changes, substitutions, and alterations could be made hereto without departing from the spirit and scope of the invention as defined by the appended claims and equivalents thereof.

We claim:

1. A cryptographic method performed in a first chiplet, the method comprising:
   (1) with one or more processing devices, computing a tag on a nonce, a message, and other data;
   (2) parsing the message into a plurality N of message blocks to create said N plurality of ordered message blocks;
   (3) encrypting the said N plurality of ordered message blocks to obtain said N plurality of ordered message ciphertext blocks, the encryption including at least one or more operations that include at least one or more XOR operations;

(4) parsing the tag into said N plurality of tag blocks to create said N plurality of ordered tag blocks;

(5) encrypting said N ordered tag blocks to obtain said N plurality of ordered tag ciphertext blocks, the encryption including at least one or more operations that include at least one or more XOR operations;

(6) concatenating the said N plurality of ordered message ciphertext blocks followed by said N plurality of ordered tag ciphertext blocks to obtain final ciphertext; and (7) transmitting the final ciphertext to a second chiplet;

wherein the encrypting the said N plurality of ordered message blocks to obtain said N plurality of ordered message ciphertext blocks, the encryption including at least one or more operations that include at least one or more XOR operations comprises:

obtaining one or more substitute values corresponding to the one or more of said N plurality of ordered message blocks;

obtaining, via a keystream table (KST), one or more target values corresponding to one or more position values, a given position value of the one or more position values being associated with a position of a given message block within the one or more ordered message blocks; and performing one or more operations that include at least one or more XOR operations to obtain said N plurality of ordered message ciphertext blocks, the one or more XOR operations performed at least partly with (i) the one or more substitute values and (ii) the one or more target values; and the obtaining one or more substitute values corresponding to the said N plurality of ordered message blocks comprises at least one of:

obtaining the one or more substitute values from a dynamic substitution box; or computing the one or more substitute values as needed without accessing a dynamic substitution box.

2. The cryptographic method of claim 1, wherein computing a tag on a nonce, a message, and other data comprises:

at least one of:

computing a Cyclic Redundancy Code (CRC) on a concatenation that includes at least the nonce, the message, and the other data; or computing a hash with a hash function on a concatenation that includes at least a nonce, the message, and other data.

3. The cryptographic method of claim 1, wherein the encrypting the said N plurality of ordered tag blocks to obtain said N plurality of ordered tag ciphertext blocks, the encryption including at least one or more operations that include at least one or more XOR operations comprises:

obtaining one or more substitute values corresponding to the said N plurality of ordered tag blocks;

obtaining, via a keystream table (KST), one or more target values corresponding to one or more position values, a given position value of the one or more position values being associated with a position of a given tag block within the one or more ordered tag blocks; and performing one or more operations that include at least one or more XOR operations to obtain the said N plurality of ordered tag ciphertext blocks, the one or more XOR operations performed at least partly with (i) the one or more substitute values and (ii) the one or more target values.

4. The cryptographic method of claim 3, wherein the obtaining one or more substitute values corresponding to the said N plurality of ordered tag blocks comprises:

at least one of:

obtaining the one or more substitute values from a dynamic substitution box; or computing the one or more substitute values as needed without accessing a dynamic substitution box.

5. The cryptographic method of claim 1, further comprising:

receiving a ciphertext from the second chiplet;

parsing the ciphertext into at least tag ciphertext and message ciphertext;

decrypting the tag ciphertext to obtain a decrypted tag, the decryption including at least one or more operations that include at least one or more XOR operations;

decrypting the message ciphertext to obtain a message, the decryption including at least one or more operations that include at least one or more XOR operations;

computing a tag based on a nonce, the message and other data to obtain a computed tag;

attempting to verify the message with a comparison of the decrypted tag with the computed tag;

outputting an error if the verification is unsuccessful; and outputting the message if the verification is successful.

6. The cryptographic method of claim 5, wherein the decrypting the tag ciphertext to obtain a tag, the decryption including at least one or more operations that include at least one or more XOR operations comprises:

parsing the tag ciphertext into said N plurality of ordered blocks of tag ciphertext;

obtaining, from an inverse lookup table, one or more original values using one or more substitute values as keys into the inverse lookup table;

obtaining, via a keystream table (KST), one or more target values corresponding to one or more position values, a given position value of the one or more position values being associated with a position of a given tag ciphertext block within the one or more ordered blocks of tag ciphertext; and performing one or more operations that include at least one or more XOR operations to obtain one or more ordered blocks of decrypted tag, the one or more XOR operations being performed with at least (i) the one or more original values corresponding to substitute values and (ii) the one or more target values.

7. The cryptographic method of claim 5, wherein decrypting the message ciphertext to obtain a message, the decryption including at least one or more operations that include at least one or more XOR operations comprises:

parsing the message ciphertext into said N plurality of ordered blocks of message ciphertext;

obtaining, from an inverse lookup table, one or more original values using one or more substitute values as keys into the inverse lookup table;

obtaining, from a keystream table (KST), one or more target values corresponding to one or more position values, a given position value of the one or more position values being associated with a position of a given message ciphertext block within the said N plurality of ordered blocks of message ciphertext; and performing one or more operations that include at least one or more XOR operations to obtain the said N plurality of ordered blocks of message, the one or more XOR operations being performed with at least (i) the one or more original values corresponding to substitute values and (ii) the one or more target values.

8. A cryptographic method performed in a first chiplet, the method comprising:

(1) receiving a message for encryption;

(2) encrypting the message to obtain a plurality N blocks of message ciphertext, the encryption including at least one or more operations that include at least one or more XOR operations;

(3) computing a tag on a concatenation that includes at least a nonce, the message ciphertext, and other data;

(4) encrypting the tag to obtain said N plurality of ordered blocks of tag ciphertext, the encryption including at least one or more operations that include at least one or more XOR operations;

(5) appending the said N plurality of ordered blocks of tag ciphertext to the said N plurality of message ciphertext blocks to obtain final ciphertext; and (6) transmitting the final ciphertext to a second chiplet;

wherein the encrypting the message to obtain message ciphertext, the encryption including at least one or more operations that include at least one or more XOR operations comprises:

parsing the message to obtain said N plurality of ordered message blocks;

obtaining one or more substitute values corresponding to the said N plurality of ordered message blocks;

obtaining, via a keystream table (KST), one or more target values associated with one or more position values, a given position value of the one or more position values being associated with a position of a given message block within the said N plurality of ordered message blocks;

performing one or more operations that include at least one or more XOR operations to obtain said N plurality of ordered message ciphertext blocks, the one or more XOR operations being performed with at least (i) the one or more substitute values and (ii) the one or more target values; and concatenating the said N plurality of ordered blocks of message ciphertext to obtain the message ciphertext; and the obtaining one or more substitute values corresponding to the said N plurality of ordered message blocks comprises at least one of:

obtaining the one or more substitute values from a dynamic substitution box; or computing the one or more substitute values as needed without accessing a dynamic substitution box.

9. The cryptographic method of claim 8, wherein the computing a tag on a concatenation that includes at least a nonce, the message ciphertext, and other data comprises: at least one of:

computing a Cyclic Redundancy Code (CRC) on a concatenation that includes at least a nonce, the message ciphertext, and other data; or computing a hash with a hash function on a concatenation that includes at least a nonce, the message ciphertext, and other data.

10. The cryptographic method of claim 8, wherein encrypting the tag to obtain said N plurality of ordered blocks of tag ciphertext, the encryption including at least one or more operations that include at least one or more XOR operations comprises:

parsing the tag to obtain at least one or more ordered tag blocks;

obtaining one or more substitute values corresponding to the one or more ordered tag blocks;

obtaining, via a keystream table (KST), one or more target values corresponding to one or more position values, a given position value of the one or more position values being associated with a position of a tag block within the one or more ordered tag blocks; and performing one or more operations that include at least one or more XOR operations to obtain the said N plurality of ordered tag ciphertext blocks, the one or more XOR operations performed at least partly with (i) the one or more substitute values and (ii) the one or more target values.

11. The cryptographic method of claim 10, wherein the obtaining one or more substitute values corresponding to the one or more ordered tag blocks comprises at least one of:

obtaining the one or more substitute values from a dynamic substitution box; or computing the one or more substitute values as needed without accessing a dynamic substitution box.

12. The cryptographic method of claim 8, further comprising:

receiving a ciphertext from the second chiplet, the ciphertext being a concatenation of a tag ciphertext and a message ciphertext, wherein the tag ciphertext is ciphertext of a tag previously computed on a concatenation of the message ciphertext, a nonce, and other data;

parsing the ciphertext into (i) a plurality N of ordered blocks of tag ciphertext and (ii) a plurality N blocks of message ciphertext;

decrypting the said N ordered blocks of tag ciphertext to obtain a plurality N of decrypted tags, the decryption including at least one or more operations that include at least one or more XOR operations;

computing each tag block based on a corresponding message ciphertext block, the nonce, and the other data to obtain a respective computed tag;

attempting verification of the message ciphertext by comparing the decrypted tags with the computed tags;

outputting an error if the verification is unsuccessful; and if the verification is successful:

(i) decrypting the message ciphertext to obtain a message, the decryption including at least one or more operations that include at least one or more XOR operations; and (ii) outputting the message.

13. The cryptographic method of claim 12, wherein the decrypting the said N plurality of ordered blocks of tag ciphertext to obtain a decrypted tag, the decryption including at least one or more operations that include at least one or more XOR operations comprises:

obtaining, from an inverse lookup table, one or more original values using one or more substitute values as keys into the inverse lookup table;

obtaining, from a keystream table (KST), one or more target values corresponding to one or more position values, a given position value of the one or more position values being associated with a position of a given tag ciphertext block within the one or more ordered blocks of tag ciphertext;

performing one or more operations that include at least one or more XOR operations to obtain one or more ordered tag blocks, the one or more XOR operations performed at least partly the with at least (i) the one or more original values corresponding to substitute values and (ii) the one or more target values; and concatenating the said N plurality of ordered tag blocks to obtain the decrypted tag.

14. The cryptographic method of claim 12, wherein decrypting the message ciphertext to obtain a message, the decryption including at least one or more operations that include at least one or more XOR operations comprises:

parsing the message ciphertext to obtain said N plurality of ordered message ciphertext blocks;

obtaining, from an inverse lookup table, one or more original values using one or more substitute values as keys into the inverse lookup table;

obtaining, from a keystream table (KST), one or more target values corresponding to one or more position values, a given position value of the one or more position values being associated with a position of a given message ciphertext block within the one or more ordered blocks of message ciphertext;

performing one or more operations that include at least one or more XOR operations to obtain said N plurality of ordered message blocks, the one or more XOR operations performed at least partly with at least (i) the one or more original values corresponding to substitute values and (ii) the one or more target values; and concatenating the one or more ordered message blocks to obtain the message.

15. A chiplet comprising:

(1) a receiving circuitry configured for receiving a message for encryption;

(2) encryption circuitry configured for encrypting the message to obtain a plurality N blocks of message ciphertext, the encryption including at least one or more operations that include at least one or more XOR operations;

(3) tag circuitry configured for computing a tag on a concatenation that includes at least a nonce, the message ciphertext, and other data;

(4) encryption circuitry configured for encrypting the tag to obtain said N plurality of ordered blocks of tag ciphertext, the encryption including at least one or more operations that include at least one or more XOR operations;

(5) processing circuitry configured for appending the said N plurality of ordered blocks of tag ciphertext to said N plurality of message ciphertext blocks to obtain final ciphertext; and (6) transmitting circuitry configured for transmitting the final ciphertext to a second chiplet;

wherein the encrypting the message to obtain message ciphertext, the encryption including at least one or more operations that include at least one or more XOR operations comprises:

parsing the message to obtain said N plurality of ordered message blocks;

obtaining one or more substitute values corresponding to the said N plurality of ordered message blocks;

obtaining, via a keystream table (KST), one or more target values associated with one or more position values, a given position value of the one or more position values being associated with a position of a given message block within the said N plurality of ordered message blocks;

performing one or more operations that include at least one or more XOR operations to obtain said N plurality of ordered message ciphertext blocks, the one or more XOR operations being performed with at least (i) the one or more substitute values and (ii) the one or more target values; and concatenating the said N plurality of ordered blocks of message ciphertext to obtain the message ciphertext; and the obtaining one or more substitute values corresponding to the said N plurality of ordered message blocks comprises at least one of:

obtaining the one or more substitute values from a dynamic substitution box; or computing the one or more substitute values as needed without accessing a dynamic substitution box.

16. The chiplet of claim 15, further comprising:

(1) receiving circuitry configured for receiving a ciphertext from the second chiplet, the ciphertext being a concatenation of a tag ciphertext and a message ciphertext, wherein the tag ciphertext is ciphertext of a tag previously computed on a concatenation of the message ciphertext, a nonce, and other data;

(2) parsing circuitry configured for parsing the ciphertext into (i) a plurality N of ordered blocks of tag ciphertext and (ii) a plurality N of blocks of message ciphertext;

(3) decrypting circuitry configured for decrypting the plurality N of ordered blocks of tag ciphertext to obtain a decrypted tag, the decryption including at least one or more operations that include at least one or more XOR operations;

(4) tag circuitry configured for computing a tag based on the message ciphertext, the nonce, and the other data to obtain a computed tag;

(5) verification circuitry configured for attempting verification of the message ciphertext by comparing the decrypted tag with the computed tag;

(6) error detecting circuitry configured for outputting an error if the verification is unsuccessful; and (7) the verification circuitry configured for if the verification is successful, causing:

(i) decryption circuitry configured for decrypting the message ciphertext to obtain a plaintext message, the decrypting including at least one or more operations that include at least one or more XOR operations, the decryption circuitry configured to be responsive, at least in part to the verification circuitry; and (ii) transmission circuitry configured for outputting the message, the decryption circuitry configured to be responsive, at least in part to the verification circuitry.

* * * * *